US012321557B2

(12) United States Patent
Kim et al.

(10) Patent No.: US 12,321,557 B2
(45) Date of Patent: Jun. 3, 2025

(54) INPUT SENSING PART AND DISPLAY DEVICE INCLUDING THE SAME

(71) Applicant: SAMSUNG DISPLAY CO., LTD., Yongin-si (KR)

(72) Inventors: Gayoung Kim, Yongin-si (KR); Youngmin Park, Yongin-si (KR); Young-Seok Seo, Yongin-si (KR); Sanghyun Lim, Yongin-si (KR); Hyunjee Jeon, Yongin-si (KR); Yujin Choe, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 4 days.

(21) Appl. No.: 18/360,590

(22) Filed: Jul. 27, 2023

(65) Prior Publication Data
US 2024/0160325 A1 May 16, 2024

(30) Foreign Application Priority Data
Nov. 14, 2022 (KR) ........................ 10-2022-0151855

(51) Int. Cl.
G06F 3/044 (2006.01)
G06F 3/041 (2006.01)
G06F 3/046 (2006.01)
H10K 59/40 (2023.01)

(52) U.S. Cl.
CPC ........ G06F 3/0445 (2019.05); G06F 3/04164 (2019.05); G06F 3/0446 (2019.05); G06F 3/0448 (2019.05); G06F 3/046 (2013.01)

(58) Field of Classification Search
None
See application file for complete search history.

(56) References Cited

U.S. PATENT DOCUMENTS

| 9,632,646 | B2 | 4/2017 | Nam et al. | |
|---|---|---|---|---|
| 10,146,336 | B2 | 12/2018 | Lee et al. | |
| 12,039,138 | B1* | 7/2024 | Kim | G06F 3/0443 |
| 2015/0185048 | A1* | 7/2015 | Liu | G06F 3/041 |
| | | | | 345/174 |

(Continued)

FOREIGN PATENT DOCUMENTS

| KR | 10-2178868 | 11/2020 |
|---|---|---|
| KR | 10-2022-0113197 | 8/2022 |

*Primary Examiner* — Patrick N Edouard
*Assistant Examiner* — Peijie Shen
(74) *Attorney, Agent, or Firm* — F. CHAU & ASSOCIATES, LLC

(57) ABSTRACT

An input sensing part includes a first sensing electrode. A second sensing electrode is electrically insulated from the first sensing electrode and crosses the first sensing electrode. A first-1 pen sensing electrode is adjacent to the first sensing electrode, is electrically insulated from the second sensing electrode, and crosses the second sensing electrode. A second-1 pen sensing electrode is adjacent to the second sensing electrode, is electrically insulated from the first sensing electrode and the first-1 pen sensing electrode, and crosses the first sensing electrode and the first-1 pen sensing electrode. A first-2 pen sensing electrode is disposed on a layer that is different from that on which the first sensing electrode and the first-1 pen sensing electrode are disposed, and overlaps a portion of the first sensing electrode, a plan view.

23 Claims, 30 Drawing Sheets

(56) References Cited

U.S. PATENT DOCUMENTS

| | | | |
|---|---|---|---|
| 2015/0227254 A1* | 8/2015 | Kim | G06F 3/0412 |
| | | | 345/174 |
| 2015/0248184 A1* | 9/2015 | Lee | G06F 3/046 |
| | | | 345/173 |
| 2018/0120971 A1* | 5/2018 | Lee | G06F 3/0446 |
| 2018/0246595 A1* | 8/2018 | Chae | G06F 3/046 |
| 2018/0246608 A1* | 8/2018 | Huh | G06F 3/046 |
| 2018/0348906 A1* | 12/2018 | Hwang | G06F 3/0448 |
| 2019/0179461 A1* | 6/2019 | Baek | G06F 3/0446 |
| 2020/0042118 A1* | 2/2020 | Mugiraneza | G06F 3/0446 |
| 2020/0363906 A1* | 11/2020 | Kono | G06F 3/0448 |
| 2021/0064189 A1* | 3/2021 | Yang | G06F 3/0443 |
| 2021/0072864 A1* | 3/2021 | Park | G06F 3/0446 |
| 2021/0173545 A1* | 6/2021 | Kurasawa | G06F 3/0412 |
| 2021/0191575 A1* | 6/2021 | Kim | G06F 3/0418 |
| 2021/0342053 A1* | 11/2021 | Cho | G06F 3/0412 |
| 2022/0050535 A1* | 2/2022 | Lee | A61B 5/022 |
| 2022/0244806 A1* | 8/2022 | Kim | G06F 3/0416 |
| 2023/0067179 A1* | 3/2023 | Kim | G06F 1/1641 |
| 2023/0393672 A1* | 12/2023 | Kim | G06F 3/03545 |
| 2023/0418412 A1* | 12/2023 | Kim | G06F 3/0448 |
| 2024/0061524 A1* | 2/2024 | Lee | G06F 3/0445 |
| 2024/0143098 A1* | 5/2024 | Lim | G06F 1/1618 |
| 2024/0184397 A1* | 6/2024 | Ku | G06F 3/04162 |
| 2024/0211088 A1* | 6/2024 | Kim | G06F 3/03545 |
| 2024/0231532 A1* | 7/2024 | Kim | G06F 3/046 |

* cited by examiner

INPUT SENSING PART AND DISPLAY DEVICE INCLUDING THE SAME

CROSS-REFERENCE TO RELATED APPLICATIONS

This U.S. non-provisional patent application claims priority under 35 U.S.C. § 119 to Korean Patent Application No. 10-2022-0151855, filed on Nov. 14, 2022, the entire contents of which are hereby incorporated by reference.

TECHNICAL FIELD

The present disclosure relates to a display device and, more specifically, to an input sensing part and a display device including the same.

DISCUSSION OF THE RELATED ART

Electronic equipment that are capable of providing an image to a user, such as smartphones, digital cameras, laptop computers, navigation systems, and smart televisions, generally include a display device for displaying an image.

The display device includes a display panel that displays an image, a touch panel disposed on the display panel to sense a user's touch, and a digitizer disposed below the display panel to sense a touch of a pen (e.g., an electronic stylus). The digitizer may sense a touch of the pen in an electromagnetic manner, in an electromagnetic resonance manner, or by some other suitable means.

The digitizer may include a plurality of coils. When the user moves a pen on the display device, the pen may be driven by an AC signal to generate vibrating magnetic fields, and the vibrating magnetic fields may induce a signal within the coils. A position of the pen may be sense through the signal induced within the coil. The digitizer may sense the position of the pen by sensing an electromagnetic change generated by the approach of the pen.

Since two separate input devices, such as the touch panel and the digitizer, are used, a thickness of the display device may increase.

SUMMARY

An input sensing part includes a first sensing electrode. A second sensing electrode is electrically insulated from the first sensing electrode and crosses the first sensing electrode. A first-1 pen sensing electrode is adjacent to the first sensing electrode, is electrically insulated from the second sensing electrode, and crosses the second sensing electrode. A second-1 pen sensing electrode is adjacent to the second sensing electrode, is electrically insulated from both the first sensing electrode and the first-1 pen sensing electrode, and crosses the first sensing electrode and the first-1 pen sensing electrode. A first-2 pen sensing electrode is disposed on a layer that is different from that on which the first sensing electrode and the first-1 pen sensing electrode are disposed, and overlapping at least a portion of the first sensing electrode, in a plan view.

An input sensing part includes a first sensing electrode. A second sensing electrode is electrically insulated from the first sensing electrode and crosses the first sensing electrode. A first-1 pen sensing electrode is adjacent to the first sensing electrode, is electrically insulated from the second sensing electrode, and crosses the second sensing electrode. A second-1 pen sensing electrode is adjacent to the second sensing electrode, is electrically insulated from both the first sensing electrode and the first-1 pen sensing electrode, and crosses the first sensing electrode and the first-1 pen sensing electrode. A first-2 pen sensing electrode is disposed on a layer that is different from that on which the first sensing electrode and the first-1 pen sensing electrode are disposed, and overlaps at least a portion of the first sensing electrode, in a plan view. A second-2 pen sensing electrode is disposed on a layer that is different from that on which a portion of the second sensing electrode and a portion of the second-1 pen sensing electrode are disposed, and overlaps at least a portion of the second sensing electrode, in the plan view.

IA display device includes a display panel and an input sensing part disposed on the display panel. The input sensing part includes a first sensing electrode, a second sensing electrode electrically insulated from the first sensing electrode and crossing the first sensing electrode, a first-1 pen sensing electrode adjacent to the first sensing electrode, electrically insulated from the second sensing electrode, and crossing the second sensing electrode, a second-1 pen sensing electrode adjacent to the second sensing electrode and electrically insulated from both the first sensing electrode and the first-1 pen sensing electrode, and crossing the first sensing electrode and the first-1 pen sensing electrode, and a first-2 pen sensing electrode disposed on a layer that is different from that on which the first sensing electrode and the first-1 pen sensing electrode are disposed and overlapping at least a portion of the first sensing electrode.

A display device includes a first sensing electrode extending in a first direction. A first-1 pen sensing electrode is electrically insulated from the first sensing electrode, extends in the first direction, and is disposed on a same layer as the first sensing electrode. A first-2 pen sensing electrode is disposed on a layer that is different from that on which the first sensing electrode and the first-1 pen sensing electrode are disposed, and electrically connected to the first-1 pen sensing electrode. In a plan view, the first-2 pen sensing electrode overlaps at least a portion of the first sensing electrode.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
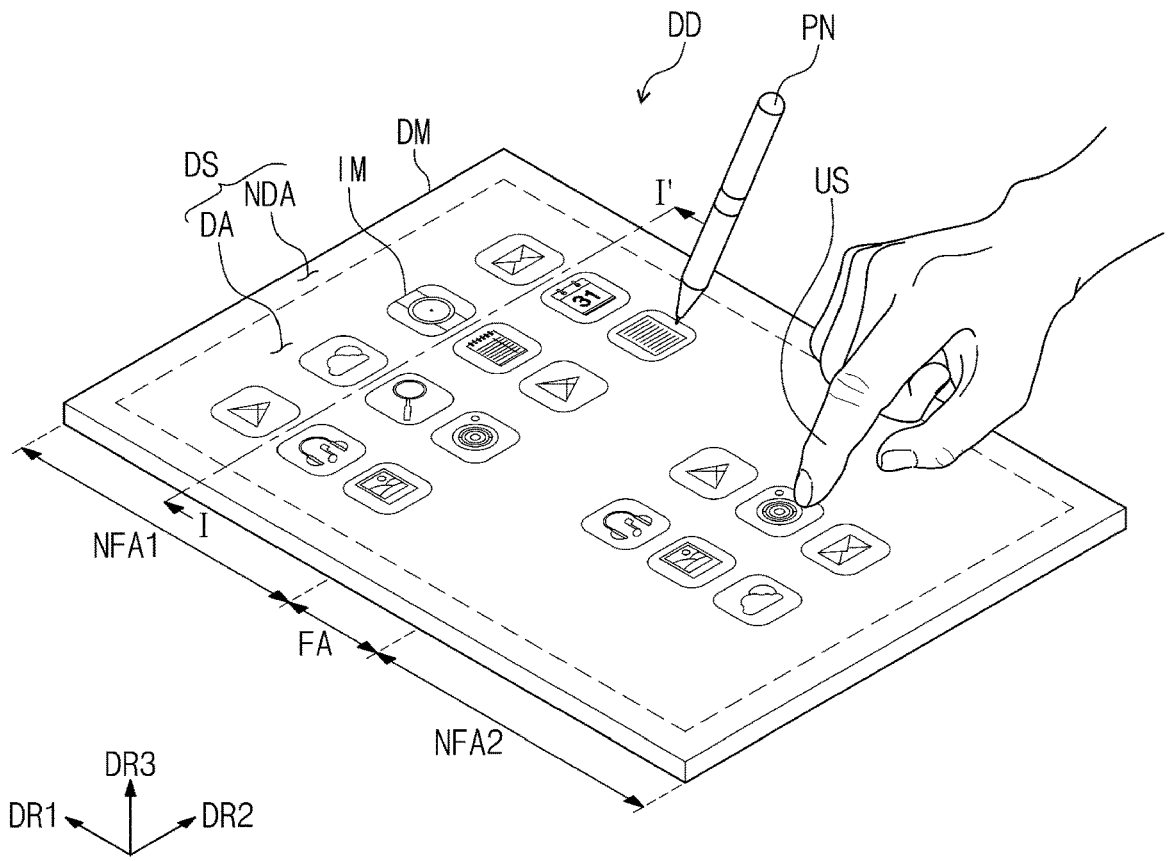
FIG. 1 is a perspective view of a display device according to an embodiment of the inventive concept.

In this specification, it will be understood that when one component (or area, layer, portion) is referred to as being "on", "connected to", or "coupled to" another component, it can be directly disposed/connected/coupled on/to the one component, or an intervening third component may also be present.

Like reference numerals may refer to like elements throughout the specification and the drawings. While each drawing may represent one or more particular embodiments of the present disclosure, drawn to scale, such that the relative lengths, thicknesses, ratios, dimensions, and angles can be inferred therefrom, it is to be understood that the present invention is not necessarily limited to the relative lengths, thicknesses, ratios, dimensions, and angles shown. Changes to these values may be made within the spirit and scope of the present disclosure, for example, to allow for manufacturing limitations and the like.

It will be understood that although the terms such as 'first' and 'second' are used herein to describe various elements, these elements should not necessarily be limited by these terms. These terms are used to distinguish one component from other components. For example, a first element referred to as a first element in an embodiment can be referred to as a second element in another embodiment without departing from the scope of the present disclosure. The terms of a singular form may include plural forms unless referred to the contrary.

Also, "under", "below", "above", "upper", and the like may be used for explaining relation association of components illustrated in the drawings. The terms may be a relative concept and described based on directions expressed in the drawings.

The meaning of 'include' or 'comprise' specifies a property, a fixed number, a process, an operation, an element, a component or a combination thereof, but does not exclude other properties, fixed numbers, processes, operations, elements, components or combinations thereof.

Hereinafter, embodiments of the inventive concept will be described with reference to the accompanying drawings.

Figure 2:
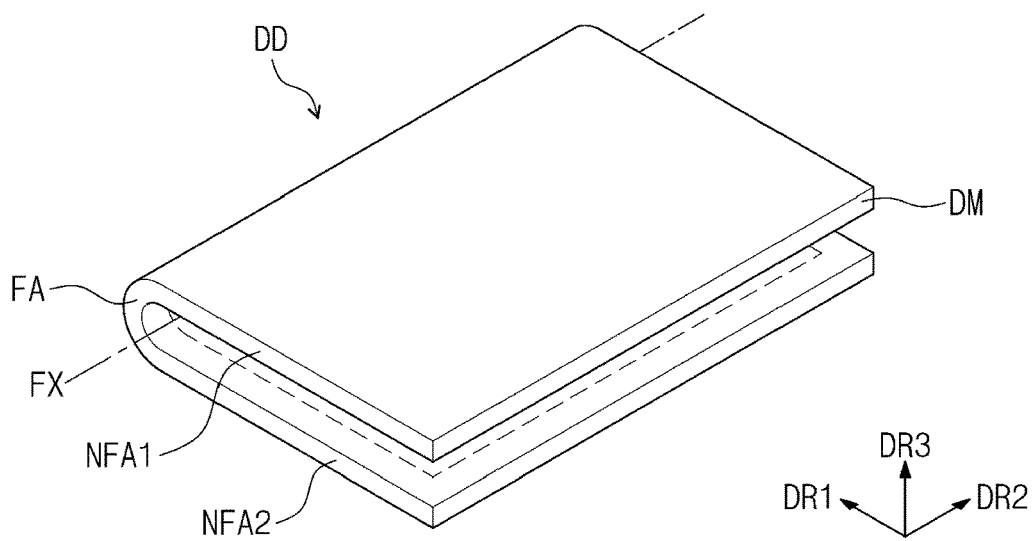
FIG. 2 is a perspective view illustrating a folded state of the display device of FIG. 1.

FIG. 1 is a perspective view of a display device according to an embodiment of the inventive concept. FIG. 2 is a perspective view illustrating a folded state of the display device of FIG. 1.

Referring to FIG. 1, a display device DD, according to an embodiment of the inventive concept, may include a display module DM and a pen PN disposed on the display module DM. The display module DM may have a rectangular shape having a pair of long sides extending in a first direction DR1 and a pair of short sides extending in a second direction DR2 crossing the first direction DR1. However, the embodiment of the inventive concept is not necessarily limited thereto. For example, the display module DM may have various shapes such as a circular shape, a polygonal shape, and the like. The display module DM may be a flexible display device.

Hereinafter, a direction that substantially perpendicularly crosses a plane defined by the first direction DR1 and the second direction DR2 is defined as a third direction DR3. Also, in this specification, the term "viewed from the plane" or "in a plan view" may be defined as a state when viewed in the third direction DR3.

The display module DM may include a folding area FA and a plurality of non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The folding area FA, the first non-folding area NFA1, and the second non-folding area NFA2 may be arranged in the first direction DR1.

A top surface of the display module DM may be defined as a display surface DS and may have a plane defined by the first direction DR1 and the second direction DR2. Images IM generated from the display module DM may be provided to a user through the display surface DS.

The display surface DS may include a display area DA and a non-display area NDA at least partially surrounding the display area DA. An image may be displayed on the display area DA, but might not be displayed on the non-display area NDA. The non-display area NDA may surround the display area DA and define an edge of the display module DM, which is printed with a predetermined color.

The display module DM may sense input applied from the outside of the display module DM. For example, the display module DM may sense a first input by a touch of an user US and a second input by a pen PN.

Referring to FIG. 2, the display device DD may be a folding-type (foldable) display device DD that is capable of being folded and/or unfolded to a noticeable extent without cracking or otherwise sustaining damage thereto. For example, the folding area FA may be bent with respect to a folding axis FX parallel to the second direction DR2, and thus, the display module DM may be folded. The folding axis may be defined as a short axis parallel to the short sides of the display module DM. However, the embodiment is not necessarily limited thereto. For example, the folding axis FX may be defined as a long axis parallel to the long sides of the display module DM, and the display module DM may be folded based on the folding axis FX defined as the long axis.

When folding the display module DM, the first non-folding area NFA1 and the second non-folding areas NFA2 may face each other, and the display module DM may be in-folded to prevent the display surface DS from being exposed to the outside. However, the embodiment is not necessarily limited thereto, and the display module DM may be out-folded so that the display surface DS of the display module is exposed to the outside and remain visible when in the folded state.

Although the folding display device DD has been described as an example, the embodiment is not necessarily limited thereto, and in an embodiment of the inventive concept, the display device DD may be a flat panel display device maintained in a flat state.

Figure 3:
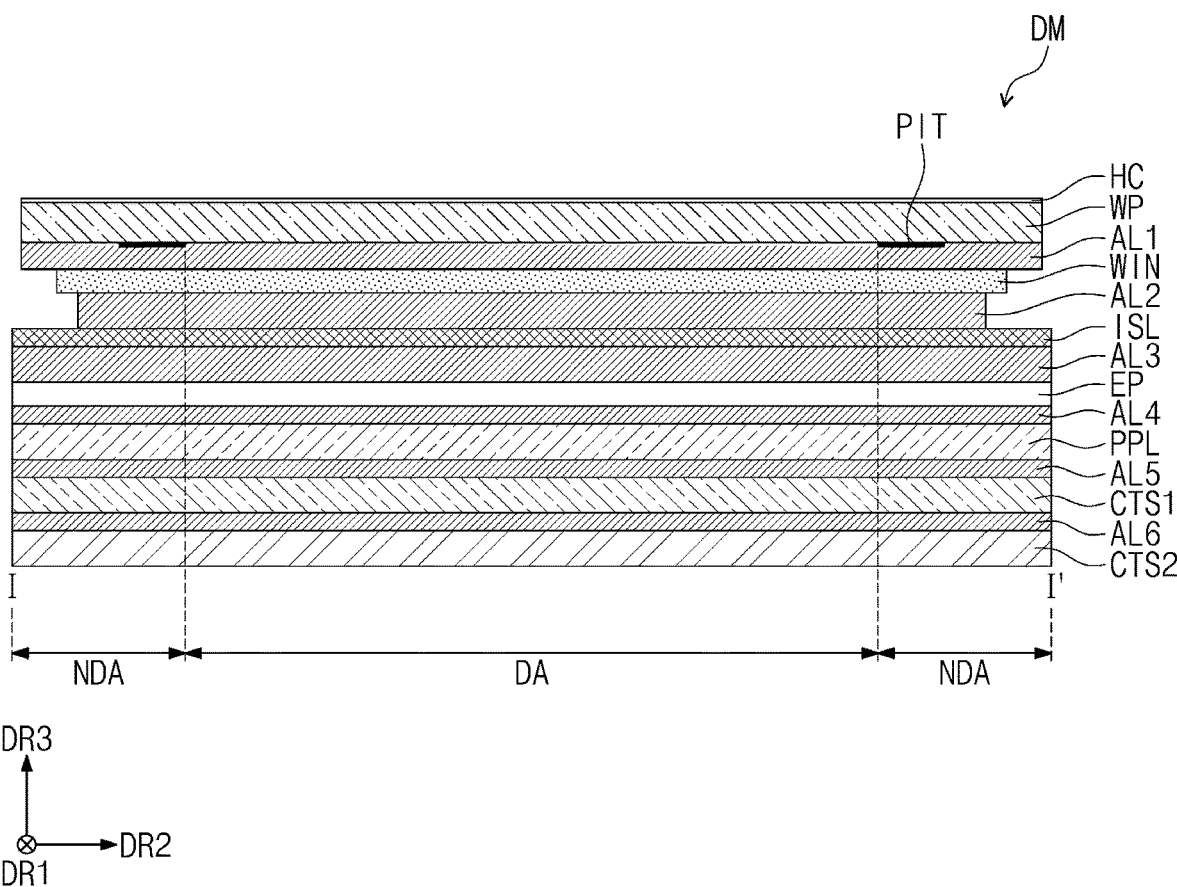
FIG. 3 is a cross-sectional view taken along line I-I' of FIG. 1.

FIG. 3 is a cross-sectional view taken along line I-I' of FIG. 1.

Referring to FIG. 3, the display module DM may include an electronic panel EP, an impact absorption layer ISL, a panel protective layer PPL, a first conductive sheet CTS1, a second conductive sheet CTS2, a window WIN, a window protective layer WP, a hard coating layer HC, and first to sixth adhesive layers AL1 to AL6.

The electronic panel EP may display an image, sense the above-described first and second inputs, and reduce reflectance of external light. The electronic panel EP may include a display panel, an input sensing part, and an antireflection layer, and constituents of the electronic panel EP will be described with reference to FIG. 4 below.

The impact absorption layer ISL may be disposed on the electronic panel EP. The impact absorption layer ISL may be configured to protect the electronic panel EP by absorbing an external impact applied from the upper side of the display device DD toward the electronic panel EP. The impact absorption layer ISL may be manufactured in the form of a stretched film.

The impact absorption layer ISL may include a flexible plastic material. The flexible plastic material may be defined as a synthetic resin film. For example, the impact absorption layer ISL may include a flexible plastic material such as polyimide (PI) or polyethylene terephthalte (PET).

The panel protective layer PPL may be disposed under the electronic panel EP. The panel protective layer PPL may be configured to protect a lower portion of the electronic panel EP. The panel protective layer PPL may include a flexible plastic material. For example, the panel protective layer PPL may include polyethylene terephthalate (PET).

The first conductive sheet CTS1 may be disposed under the panel protective layer PPL. The second conductive sheet CTS2 may be disposed under the first conductive sheet CTS1. Each of the first conductive sheet CTS1 and the second conductive sheet CTS2 may include a metal.

The first conductive sheet CTS1 may include a ferromagnetic material. For example, the first conductive sheet CTS1 may be defined as a ferrite sheet including ferrite. The second conductive sheet CTS2 may include a diamagnetic material. For example, the second conductive sheet CTS2 may be defined as a copper sheet containing copper. The first and second conductive sheets CTS1 and CTS2 may shield an external magnetic field from being applied to the electronic panel EP under the display module DM.

The window WIN may be disposed on the impact absorption layer ISL. The window WIN may be configured to protect the electronic panel EP from external scratches. The window WIN may have optically transparent properties (e.g., may be transparent to visible light). The window WIN may include glass. However, the embodiment of the inventive concept is not necessarily limited thereto, and the window WIN may include a synthetic resin film.

The window WIN may has a single-layer or multi-layer structure. For example, the window WIN may include a plurality of plastic films bonded to each other by using an adhesive or include a glass substrate and a plastic film, which are bonded to each other by using an adhesive.

The window protective layer WP may be disposed on the window WIN. The window protective layer WP may include a flexible plastic material such as polyimide or polyethylene terephthalate. The hard coating layer HC may be disposed on a top surface of the window protective layer WP.

A printing layer PIT may be disposed on a bottom surface of the window protective layer WP. The printing layer PIT may have a black color, but the color of the printing layer PIT is not necessarily limited thereto. The printing layer PIT may be adjacent to an edge of the window protective layer WP. The printing layer PIT may overlap the non-display area NDA.

The first adhesive layer AL1 may be disposed between the window protective layer WP and the window WIN. The window protective layer WP and the window WIN may be bonded to each other by the first adhesive layer AL1. The first adhesive layer AL1 may cover the printing layer PIT.

The second adhesive layer AL2 may be disposed between the window WIN and the impact absorption layer ISL. The window WIN and the impact absorption layer ISL may be bonded to each other by the second adhesive layer AL2.

The third adhesive layer AL3 may be disposed between the impact absorption layer ISL and the electronic panel EP. The impact absorption layer ISL and the electronic panel EP may be bonded to each other by the third adhesive layer AL3.

A fourth adhesive layer AL4 may be disposed between the electronic panel EP and the panel protective layer PPL. The electronic panel EP and the panel protective layer PPL may be bonded to each other by the fourth adhesive layer AL4.

A fifth adhesive layer AL5 may be disposed between the panel protective layer PPL and the first conductive sheet CTS1. The panel protective layer PPL and the first conductive sheet CTS1 may be bonded to each other by the fifth adhesive layer AL5.

A sixth adhesive layer AL6 may be disposed between the first conductive sheet CTS1 and the second conductive sheet CTS2. The first conductive sheet CTS1 and the second conductive sheet CTS2 may be bonded to each other by the sixth adhesive layer AL6.

Each of the first to sixth adhesive layers AL1 and AL6 may include a pressure sensitive adhesive (PSA) or an optically clear adhesive (OCA), but the type of adhesive is not necessarily limited thereto.

Figure 4:
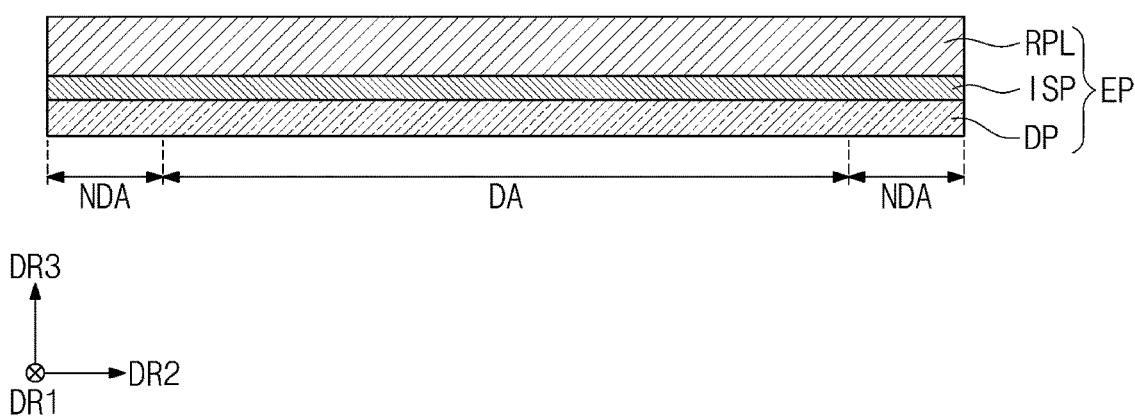
FIG. 4 is a cross-sectional view illustrating an electronic panel having a configuration of that of FIG. 3.

FIG. 4 is a cross-sectional view illustrating the electronic panel having a configuration of an electronic panel of FIG. 3.

For example, FIG. 4 illustrates a cross-sectional view of the electronic panel EP when viewed in the first direction DR1.

Referring to FIG. 4, the electronic panel EP may include a display panel DP, an input sensing part ISP disposed on the display panel DP, and an anti-reflection layer RPL disposed on the input sensing part ISP. The display panel DP may be a flexible display panel. For example, the display panel DP may include a flexible substrate and a plurality of elements disposed on the flexible substrate.

The display panel DP, according to an embodiment of the inventive concept, may be an emission type display panel, but is not necessarily limited thereto. For example, the display panel DP may be an organic light emitting diode (OLED) display panel or an inorganic light emitting display panel. An emission layer of the organic light emitting display panel may include an organic light emitting material. An emission layer of the inorganic light emitting display panel may include a quantum dot, a quantum rod, and the like. Hereinafter, the display panel DP is described as an organic light emitting diode display panel.

The input sensing part ISP may include a plurality of sensing electrodes (hereinafter, illustrated in FIG. 8) for sensing the above-described first input in a capacitive manner. The input sensing part ISP may include a plurality of pen sensing electrodes (hereinafter, illustrated in FIG. 8) for sensing the above-described second input using an electromagnetic method (or an electromagnetic resonance method). The input sensing part ISP may be directly disposed on the display panel DP when the electronic panel EP is manufactured.

When an external magnetic field is applied to the input sensing part ISP under the electronic panel EP, a sensing operation of the second input of the input sensing part ISP might not be normally performed. The above-described first and second conductive sheets CTS1 and CTS2 may shield the external magnetic field so as not to be applied to the input sensing part ISP from a lower side of the electronic panel EP.

The anti-reflection layer RPL may be disposed on the input sensing part ISP. The anti-reflection layer RPL may be directly disposed on the input sensing part ISP when the electronic panel EP is manufactured. The anti-reflection layer RPL may be defined as an external light anti-reflection film. The anti-reflection layer RPL may reduce reflectance of external light incident from the display device DD onto the display panel DP.

For example, the input sensing part ISP may be directly disposed on the display panel DP, and the anti-reflection layer RPL may be directly disposed on the input sensing part ISP, but the embodiment of the inventive concept is not necessarily limited thereto. For example, the input sensing part ISP may be separately manufactured and attached to the display panel DP using an adhesive layer, and the antireflection layer RPL may be separately manufactured and attached to the input sensing part ISP using an adhesive layer.

Figure 5:
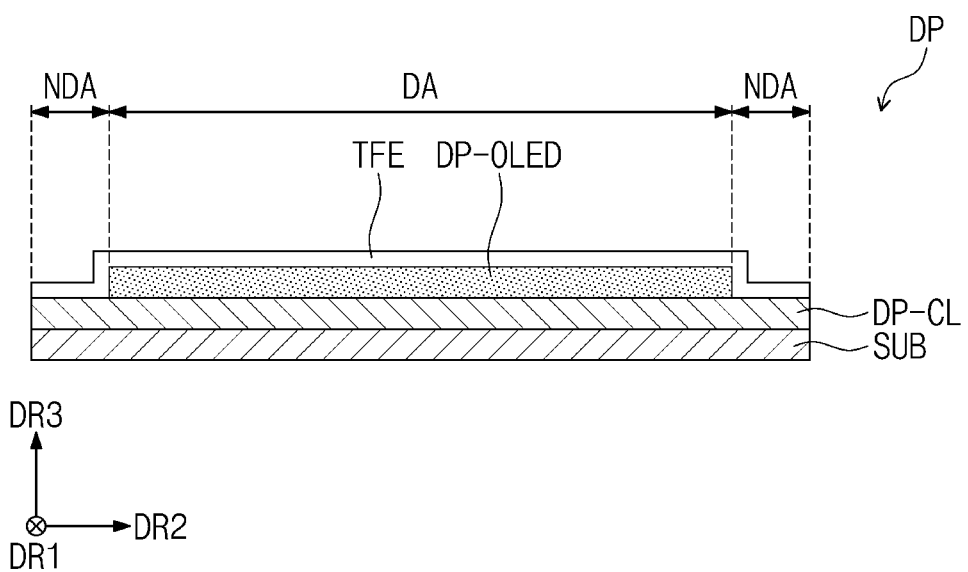
FIG. 5 is a cross-sectional view illustrating a configuration of a display panel of FIG. 4.

FIG. 5 is a cross-sectional view illustrating a configuration of the display panel of FIG. 4.

For example, FIG. 5 illustrates a cross-sectional view of the display panel DP when viewed in the first direction DR1.

Referring to FIG. 5, the display panel DP may include a substrate SUB, a circuit element layer DP-CL disposed on the substrate SUB, and a display element layer DP-OLED disposed on the circuit element layer DP-CL, and a thin film encapsulation layer TFE disposed on the display element layer DP-OLED.

The substrate SUB may include a display area DA and a non-display area NDA at least partially surrounding the display area DA. The substrate SUB may include a flexible plastic material such as polyimide (PI). The display element layer DP-OLED may be disposed on the display area DA.

A plurality of pixels may be disposed on the display area DA. Each of the pixels may include a light emitting element electrically connected to a transistor disposed on the circuit element layer DP-CL and disposed on the display element layer DP-OLED.

Figure 6:
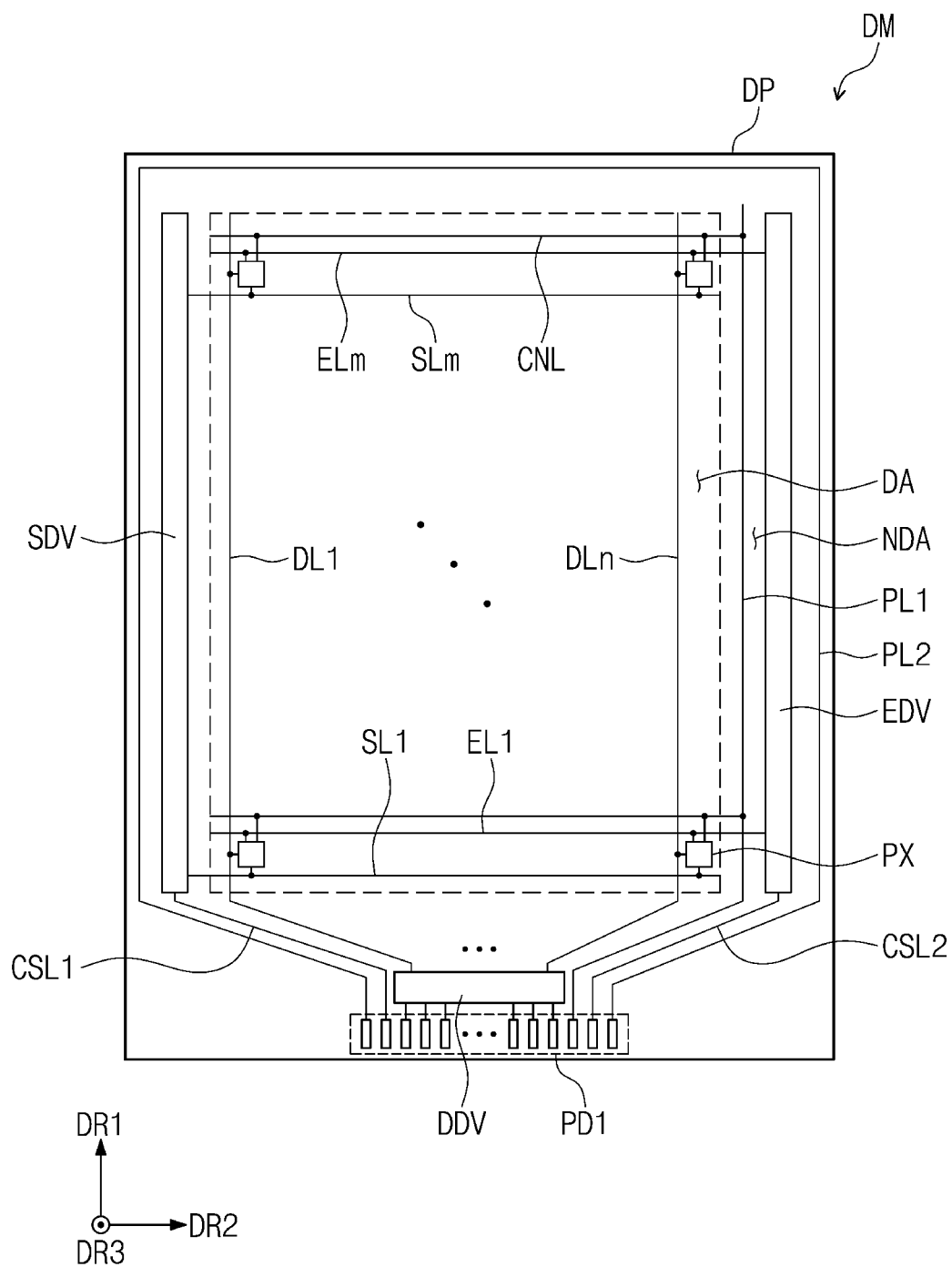
FIG. 6 is a plan view illustrating the display panel of FIG. 5.

The thin film encapsulation layer TFE may be disposed on the circuit element layer DP-CL and may cover the display element layer DP-OLED. The thin film encapsulation layer TEF may include inorganic layers and an organic layer between the inorganic layers. The inorganic layers may be configured to protect the pixels from moisture and/or oxygen. The organic layer may be configured to protect the pixels from foreign substances such as dust particles. FIG. 6 is a plan view of the display panel of FIG. 5.

Referring to FIG. 6, the display module DM may include a display panel DP, a scan driver SDV, a data driver DDV, a light emission driver EDV, and a plurality of first pads PD1.

The display panel DP may have a rectangular shape having a pair of long sides extending in the first direction DR1 and a pair of short sides extending in the second direction DR2, but the shape of the display panel DP is not necessarily limited thereto. The display panel DP may include a display area DA and a non-display area NDA at least partially surrounding the display area DA.

The display panel DP may include a plurality of pixels PX, a plurality of scan lines SL1 to SLm, a plurality of data lines DL1 to DLn, a plurality of emission lines ELI to Elm, first and second control lines CSL1 and CSL2, first and second power lines PL1 and PL2, and connection lines CNL. Here, m and n are positive integers.

The pixels PX may be disposed on the display area DA. The scan driver SDV and the data driver DDV may be disposed on the non-display areas that are adjacent to the long sides of the display panel DP, respectively. The data driver DDV may be disposed on the non-display area NDA adjacent to one short side of the pair of short sides of the display panel DP. In a plan view, the data driver DDV may be adjacent to a lower end of the display panel DP.

The scan lines SL1 to SLm may extend in the second direction DR2 and be electrically connected to the pixels PX and the scan driver SDV. The data lines DL1 to DLn may extend in the first direction DR1 and be electrically connected to the pixels PX and the data driver DDV. The emission lines ELI to Elm may extend in the second direction DR2 and be electrically connected to the pixels PX and the light emission driver EDV.

The first power line PL1 may extend in the first direction DR1 and be disposed on the non-display area NDA. The first power line PL1 may be disposed between the display area DA and the light emission driver EDV.

The connection lines CNL may extend in the second direction DR2 and may be arranged in the first direction DR1 so as to be electrically connected to the first power line PL1 and the pixels PX. The first voltage may be applied to the pixels PX through the first power line PL1 and the connection lines CNL, which are electrically connected to each other.

The second power line PL2 may be disposed on the non-display area NDA and may extend along the long sides of the display panel DP and another short side of the display panel DP on which the data driver DDV is not disposed. The second power line PL2 may be disposed outside the scan driver SDV and the light emission driver EDV.

the second power line PL2 may extend toward the display area DA and be electrically connected to the pixels PX. A second voltage having a level less than that of the first voltage may be applied to the pixels PX through the second power line PL2.

The first control line CSL1 may be electrically connected to the scan driver SDV, and the first control line CSL1 may extend toward the lower end of the display panel DP. The second control line CSL2 may be electrically connected to the light emission driver EDV, and the second control line CSL2 may extend toward the lower end of the display panel DP. The data driver DDV may be disposed between the first control line CSL1 and the second control line CSL2.

The first pads PD1 may be disposed on the non-display area NDA adjacent to a lower end of the display panel DP and may be closer to the lower end of the display panel DP than the data driver DDV. The data driver DDV, the first power line PL1, the second power line PL2, the first control line CSL1, and the second control line CSL2 may be electrically connected to the first pads PD. The data lines DL1 to DLn may be electrically connected to the data driver DDV, and the data driver DDV may be electrically connected to the first pads PD, which correspond to the data lines DL1 to DLn.

The display device DD may further include a timing controller to control operations of the scan driver SDV, the data driver DDV, and the light emission driver EDV and a voltage generator to generate first and second voltages. The timing controller and the voltage generator may be electrically connected to the first pads PD1 through the printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The light emission driver EDV may generate a plurality of emission signals, and the emission signals may be applied to the pixels PX through the emission lines El1 to ELm.

The pixels PX may receive the data voltages in response to the scan signals. The pixels PX may emit light having luminance corresponding the data voltages in response to the emission signals to display an image.

Figure 7:
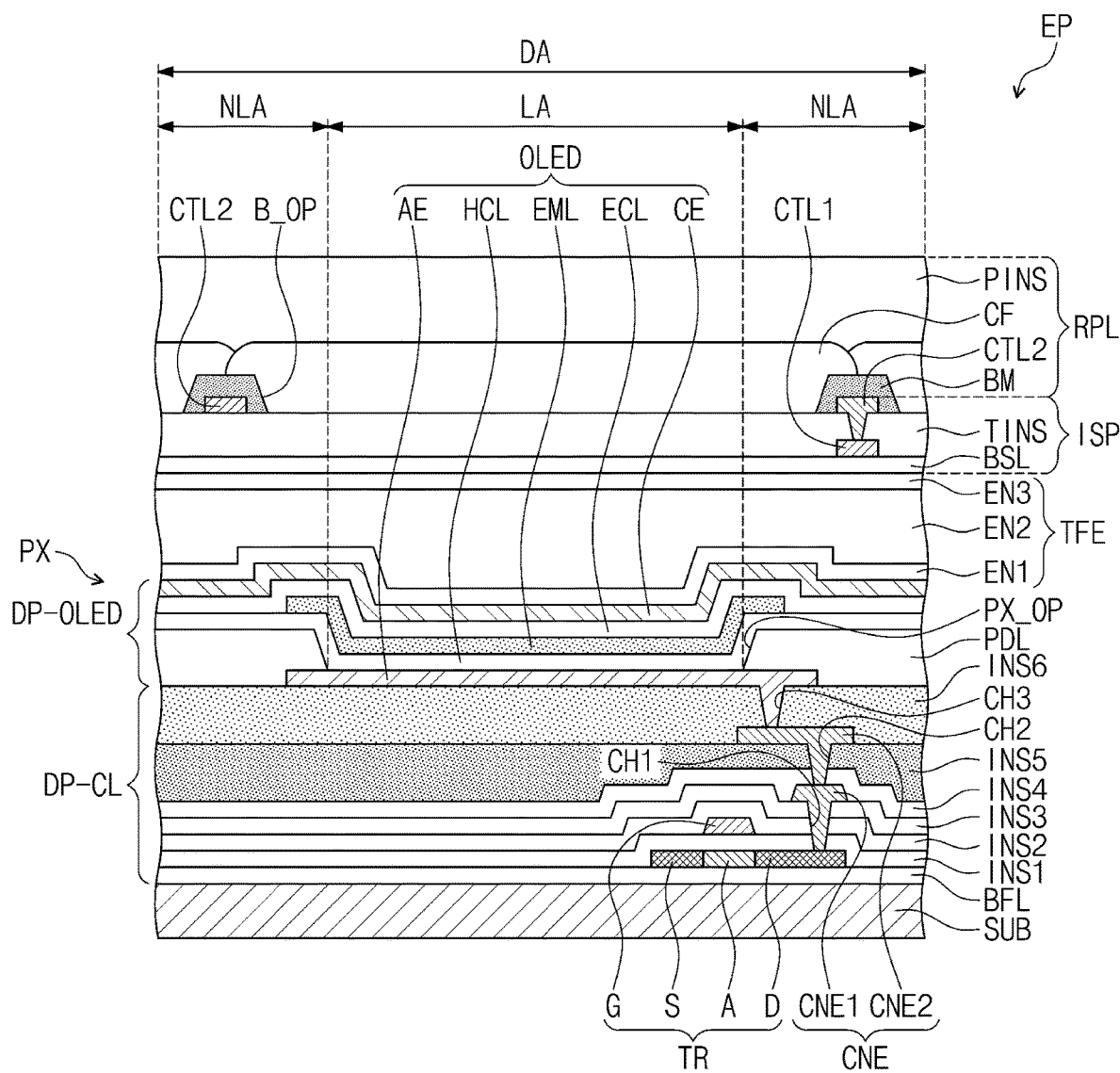
FIG. 7 is a cross-sectional view illustrating an example of one pixel of the electronic panel of FIG. 6.

FIG. 7 is a view illustrating an example of a cross-section of the electronic panel corresponding to one pixel of FIG. 6.

Referring to FIG. 7, the pixel PX may include a transistor TR and a light emitting element OLED. The light emitting element OLED may include a first electrode AE (or anode), a second electrode CE (or cathode), a hole control layer HCL, an electron control layer ECL, and an emission layer EML.

The transistor TR and the light emitting element OLED may be disposed on the substrate SUB. For example, one transistor TR is illustrated, but the pixel PX may include a plurality of transistors and at least one capacitor, which drive the light emitting element OLED.

The display area DA may include an emission area LA corresponding to each of the pixels PX and a non-emission area NLA at least partially surrounding the emission area LA. The light emitting element OLED may be disposed on the emission area LA.

A buffer layer BFL may be disposed on the substrate SUB, and the buffer layer BFL may be an inorganic layer. A semiconductor pattern may be disposed on the buffer layer BFL. The semiconductor pattern may include polysilicon, amorphous silicon, and/or metal oxide.

The semiconductor pattern may be doped with an N-type dopant or a P-type dopant. The semiconductor pattern may include a highly doped region and a lowly doped region. The highly doped region may have conductivity that is greater than that of the lowly doped region to serve as a source electrode and a drain electrode of the transistor TR. The lowly doped region may correspond to an active (or channel) of the transistor.

A source S, an active A, and a drain D of the transistor TR may be formed from the semiconductor pattern. An first insulating layer INS1 may be disposed on the semiconductor pattern. The gate G of the transistor TR may be disposed on the first insulating layer INS1. A second insulating layer INS2 may be disposed on the gate G. A third insulating layer INS3 may be disposed on the second insulating layer INS2.

The connection electrode CNE may include a first connection electrode CNE1 and a second connection electrode CNE2 to connect the transistor TR to the light emitting element OLED. The first connection electrode CNE1 may be disposed on the third insulating layer INS3 and be electrically connected to the drain D through a first contact hole CH1 defined in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be electrically connected to the first connection electrode CNE1 through the second contact hole CH2 defined in the fourth and fifth insulating layers INS4 and INS5.

A sixth insulating layer INS6 may be disposed on the second connection electrode CNE2. A layer provided from the buffer layer BFL to the sixth insulating layer INS6 may be defined as the circuit element layer DP-CL. Each of the first insulating layer INS1 to the sixth insulating layer INS6 may be an inorganic layer or an organic layer.

The first electrode AE may be disposed on the sixth insulating layer INS6. The first electrode AE may be electrically connected to the second connection electrode CNE2 through a third contact hole CH3 defined in the sixth insulating layer INS6. A pixel defining layer PDL, in which an opening for exposing a predetermined portion of the first electrode AE is defined, may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The emission layer EML may be disposed on the hole control layer HCL. The emission layer EML may be disposed on an area corresponding to the opening PX_OP. The emission layer EML may include an organic material and/or an inorganic material. The emission layer EML may emit one of red light, green light, and blue light.

The electronic control layer ECL may be disposed on the hole control layer HCL and may cover the emission layer EML. The charge control layer OL may include an electron transport layer and an electron injection layer. A hole control layer HCL and an electron control layer ECL may be commonly disposed on the emission area LA and the non-emission area NLA.

The second electrode CE may be disposed on the electronic control layer ECL. The second electrode CE may be commonly disposed in the pixels PX. The layer on which the light emitting element OLED is disposed may be defined as the display element layer DP-OLED.

The thin film encapsulation layer TFE may be disposed on the second electrode CE and may cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

Each of the first and third encapsulation layers EN1 and EN3 may include an inorganic insulating layer and may be configured to protect the pixel PX against moisture/oxygen. The second encapsulation layer EN2 may include an organic insulating layer and may be configured to protect the pixel PX against foreign substances such as dust particles.

A first voltage may be applied to the first electrode AE through the transistor TR, and a second voltage having a level lower than that of the first voltage may be applied to the second electrode CE. Holes and electrons injected into the light emitting layer EML may be coupled to each other to form exciton. While the exciton may be transitioned to a ground state, the light emitting element OLED may emit light.

The input sensing part ISP may be disposed on the thin film encapsulation layer TFE. The input sensing part ISP may be manufactured directly on a top surface of the thin film encapsulation layer TFE.

A base layer BSL may be disposed on the thin film encapsulation layer TFE. The base layer BSL may include an inorganic insulating layer. At least one inorganic insulating layer may be provided on the thin film encapsulation layer TFE as the base layer BSL.

The input sensing part ISP may include a first conductive pattern CTL1 and a second conductive pattern CTL2 disposed on the first conductive pattern CTL1. The first conductive pattern CTL1 may be disposed on the base layer BSL. An insulating layer TINS may be disposed on the base layer BSL and may cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-emission area NLA. The first and second conductive patterns CTL1 and CTL2 may be disposed on the non-emission area NLA between the emission areas LA and may have a mesh shape.

The first and second conductive patterns CTL1 and CTL2 may form sensing electrodes and pen sensing electrodes of the above-described input sensing part ISP. For example, the mesh-shaped first and second conductive patterns CTL1 and CTL2 may be separated from each other in a predetermined area to form the sensing electrodes and the pen sensing electrodes. A portion of the second conductive pattern CTL2 may be electrically connected to the first conductive pattern CTL1.

An anti-reflection layer RPL may be disposed on the second conductive pattern CTL2. The anti-reflection layer RPL may include a black matrix BM and a plurality of color filters CF. The black matrix BM may overlap the non-emission area NLA, and the color filters CF may overlap the emission areas LA, respectively.

The black matrix BM may be disposed on the insulating layer TINS and may cover the second conductive pattern CTL2. An opening B_OP overlapping the emission area LA and the opening PX_OP may be defined in the black matrix BM. The black matrix BM may absorb and block light. A width of the opening B_OP may be greater than a width of the opening PX_OP.

The color filters CF may be disposed on the insulating layer TINS and the black matrix BM. The color filters CF may be respectively disposed in the openings B_OP. A planarization insulating layer PINS may be disposed on the color filters CF. The planarization insulating layer PINS may provide a flat (e.g., planar) top surface. The planarization insulating layer PINS may include an organic insulating layer.

When the external light traveling toward the display panel DP is reflected from the display panel DP and provided again to an external user, the user may visually recognize the external light, like a mirror. To prevent this phenomenon, for example, the anti-reflection layer RPL may include a plurality of color filters CF displaying the same color as the pixels PX of the display panel DP. The color filters CF may filter external light with the same colors as the pixels PX. In this case, the external light might not be visually recognized by the user.

Figure 8:
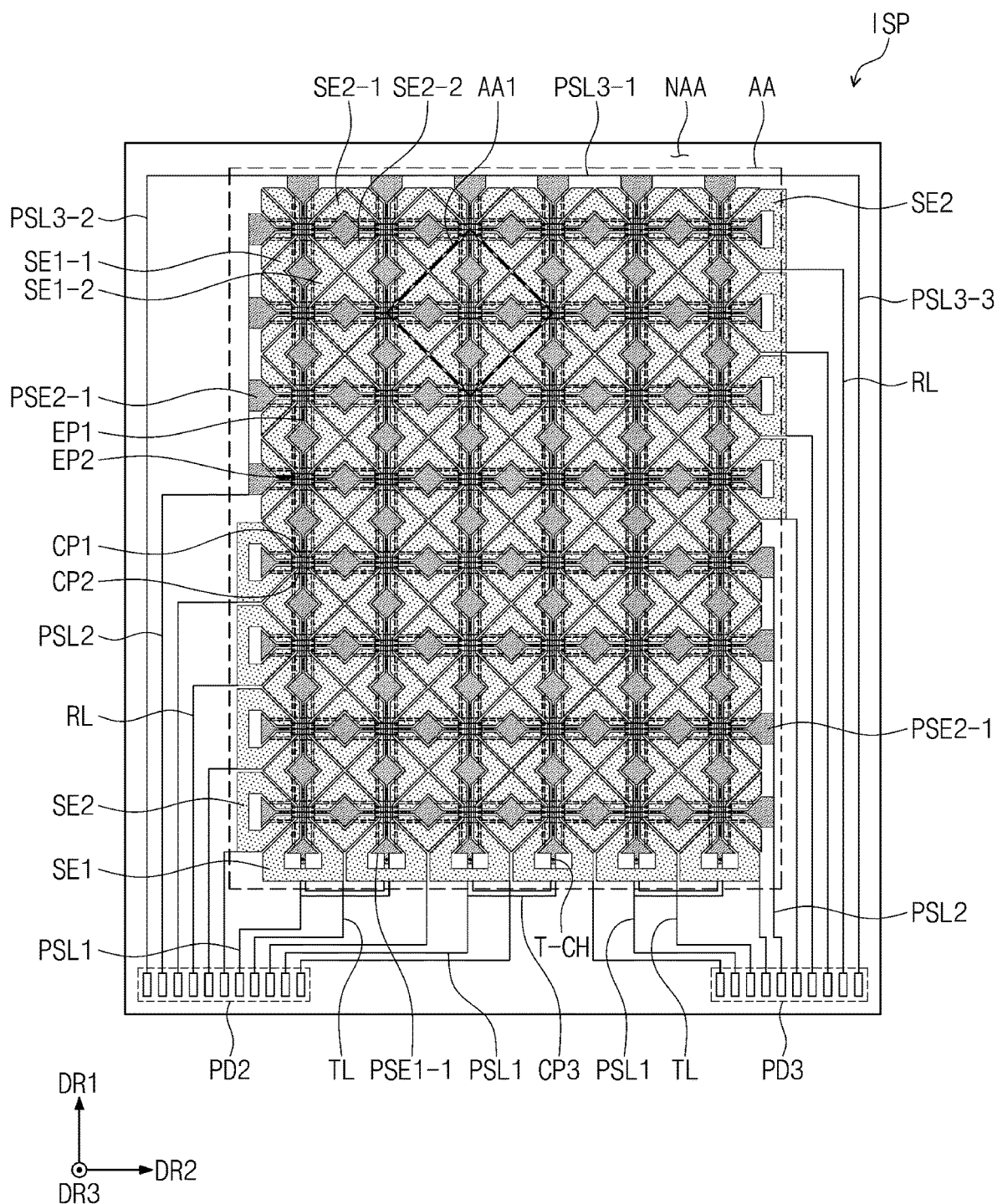
FIG. 8 is a plan view illustrating an input sensing part of FIG. 4.
Figure 9:
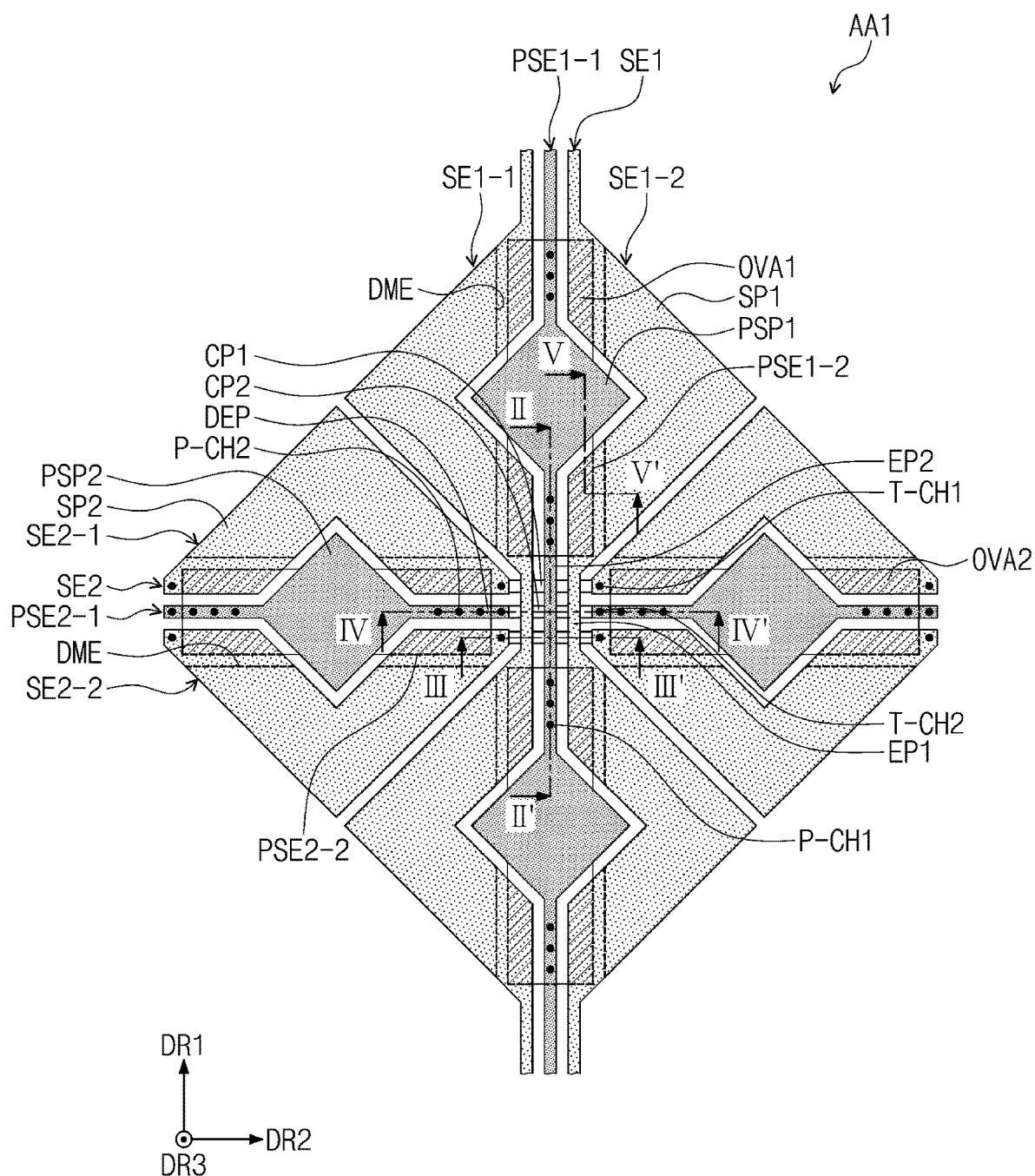
FIG. 9 is an enlarged view illustrating a first area AA1 of FIG. 8.
Figure 10:
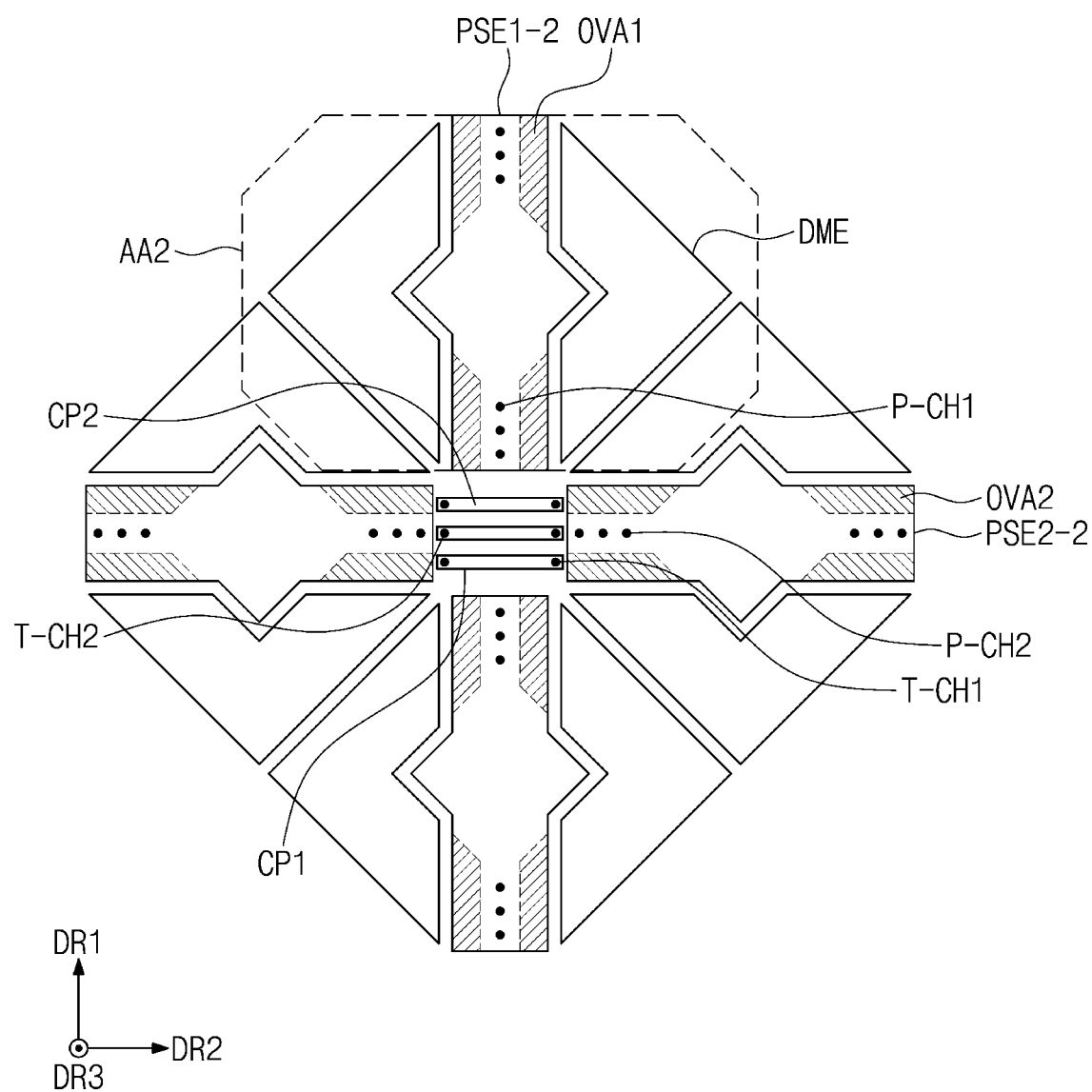
FIG. 10 is a plan view illustrating a first-2 pen sensing electrode, a second-2 pen sensing electrode, a dummy electrode, and first and second connection patterns, which are illustrated in FIG. 9.

FIG. 8 is a plan view illustrating the input sensing part of FIG. 4. FIG. 9 is an enlarged view illustrating a first area AA1 of FIG. 8. FIG. 10 is a view illustrating a first-2 pen sensing electrode, a second-2 pen sensing electrode, a dummy electrode, and first and second connection patterns, which are illustrated in FIG. 9.

Referring to FIG. 8, the input sensing part ISP may have a rectangular shape having a pair of long sides in a first direction DR1 and a pair of short sides in a second direction DR2 crossing the first direction DR1.

The input sensing part ISP may include a plurality of sensing electrodes SE1 and SE2, a plurality of sensing lines TL and RL, a plurality of first-1 and second-1 pen sensing electrodes PSE1-1 and PSE2-1, a plurality of pen sensing lines PSL1, PSL2, and PSL3-1 to PSL3-3, and a plurality of second and third pads PD2 and PD3. The sensing electrodes SE1 and SE2, the sensing lines TL and RL, the first-1 and second-1 pen sensing electrodes PSE1-1 and PSE2-1, the pen sensing lines PSL1, PSL2, and PSL3-1 to PSL3-3, and the second and third pads PD2 and PD3 may be disposed on the above-described thin film encapsulation layer TFE.

A planar area of the input sensing part ISP may include an active area AA and a non-active area NAA at least partially surrounding the active area AA. When viewed in the plan view, the active area AA may overlap the display area DA, and the non-active area NAA may overlap the non-display area NDA.

The sensing electrodes SE1 and SE2 may be disposed on the active area AA, and the second and third pads PD2 and PD3 may be disposed on the non-active area NAA. The second pads PD2 and the third pads PD3 may be adjacent to a lower end of the input sensing part ISP when viewed from the plan view.

For example, the second pads PD2 may be disposed adjacent to a left side of the input sensing part ISP, and the third pads PD3 may be disposed adjacent to a right side of the input sensing part ISP. When viewed from the plan view, the first pads PD1 illustrated in FIG. 6 may be disposed between the second pads PD2 and the third pads PD3.

The sensing electrodes SE1 and SE2 includes a plurality of first sensing electrodes SE1 extending in the first direction DR1 and arranged in the second direction DR2 and a plurality of second sensing electrodes SE2 extending in the second direction DR2 and arranged in the first direction DR1. The second sensing electrodes SE2 may be electrically insulated from the first sensing electrodes SE1 and may cross each other. The first and second sensing electrodes SE1 and SE2 may be used to sense the above-described first input.

The sensing lines TL and RL may be electrically connected to ends of the first and second sensing electrodes SE1 and SE2 and extend on the inactive area NAA so as to be electrically connected to the second and third pads PD2 and PD3. The sensing lines TL and RL may include a plurality of first sensing lines TL electrically connected to the first sensing electrodes SE1 and a plurality of second sensing lines RL electrically connected to the second sensing electrodes SE2.

For example, when viewed from the plan view, the first sensing lines TL may be disposed on the non-active area NAA adjacent to a lower side of the active area AA. Also, when viewed from the plan view, the second sensing lines RL may be disposed on the non-active area NAA adjacent to left and right sides of the active area AA.

The first sensing lines TL may be electrically connected to lower ends of the first sensing electrodes SE1. The first sensing lines TL may extend to the non-active area NAA and be electrically connected to the corresponding second and third pads PD2 and PD3.

The input sensing part ISP may be divided into a left portion and a right portion based on a center thereof in the second direction DR2. The first sensing lines TL electrically connected to the first sensing electrodes SE1 disposed at the left portion may be electrically connected to the corresponding second pads PD2. The first sensing lines TL electrically connected to the first sensing electrodes SE1 disposed on the right portion may be electrically connected to the corresponding third pads PD3.

The second sensing lines RL may be electrically connected to left ends or right ends of the second sensing electrodes SE2. The second sensing lines RL may extend to the non-active area NAA and be electrically connected to the corresponding second and third pads PD2 and PD3.

The input sensing part ISP may be divided into a lower portion and an upper portion based on a center thereof in the first direction DR1. The second sensing lines RL disposed at the lower portion of the input sensing part ISP may be electrically connected to the left ends of the second sensing electrodes SE2 disposed at the lower portion of the input sensing part ISP. The second sensing lines RL disposed at the upper portion of the input sensing part ISP may be electrically connected to the right ends of the second sensing electrodes SE2 disposed at the upper portion of the input sensing part ISP.

The second sensing lines RL disposed at the lower portion of the input sensing part ISP may be disposed on the non-active area NAA adjacent to the left side of the active area AA. The second sensing lines RL disposed at the lower portion the input sensing part ISP may extend toward the lower end of the input sensing part ISP and be electrically connected to the corresponding second pads PD2.

The second sensing lines RL disposed at the upper portion of the input sensing part ISP may be disposed on the non-active area NAA adjacent to the right side of the active area AA. The second sensing lines RL disposed at the upper portion of the input sensing part ISP may extend toward the lower end of the input sensing part ISP and be electrically connected to the corresponding third pads PD3.

Each of the first sensing electrodes SE1 may include a first-1 sensing electrode SE1-1 and a first-2 sensing electrode SE1-2 extending in the first direction DR1 and spaced apart from each other in the second direction DR2. The first-1 sensing electrode SE1-1 and the first-2 sensing electrode SE1-2 may have shapes symmetrical to each other in the second direction DR2.

In each of the first sensing electrodes SE1, a lower end of the first-1 sensing electrode SE1-1 and a lower end of the first-2 sensing electrode SE1-2 may be integrated with each other so as to be electrically connected to the corresponding first sensing line TL of the first sensing lines TL. In each of the first sensing electrodes SE1, an upper end of the first-1 sensing electrode SE1-1 and an upper end of the first-2 sensing electrode SE1-2 may be separated from each other so as not to be electrically connected to each other.

Each of the second sensing electrodes SE2 may include a second-1 sensing electrode SE2-1 and a second-2 sensing electrode SE2-2 extending in the second direction DR2 and spaced apart from each other in the first direction DR1. The second-1 sensing electrode SE2-1 and the second-2 sensing electrode SE2-2 may have symmetrical shapes in the first direction DR1.

In each of the second sensing electrodes SE2 disposed at the lower portion of the input sensing part ISP, a left end of the second-1 sensing electrode SE2-1 and a left end of the second-2nd sensing electrode SE2-2 may be integrated with each other so as to be electrically connected to the corresponding second sensing line RL of the second sensing lines RL. In each of the second sensing electrodes SE2 disposed at the lower portion of the input sensing part ISP, a right end of the second-1 sensing electrode SE2-1 and a right end of the second-2nd sensing electrode SE2-2 may be separated from each other so as not to be electrically connected to each other.

In each of the second sensing electrodes SE2 disposed at the upper portion of the input sensing part ISP, a right end of the second-1 sensing electrode SE2-1 and a right end of the second-2 sensing electrode SE2-2 may be integrated with each other so as to be electrically connected to the corresponding second sensing line RL of the second sensing lines RL. In each of the second sensing electrodes SE2 disposed at the upper portion the input sensing part ISP, a left end of the second-1 sensing electrode SE2-1 and a left end of the second-2 sensing electrode SE2-2 may be separated from each other so as not to be electrically connected to each other.

The first-1 and second-1 pen sensing electrodes PSE1-1 and PSE2-1 may be disposed on the active area AA. The pen sensing lines PSL1, PSL2, and PSL3-1 to PSL3-3 may be electrically connected to the first-1 and second-1 pen sensing electrodes PSE1-1 and PSE2-1, may extend to the inactive area, and may be electrically connected to the corresponding second and third pads PD2 and PD3.

A sensing IC for controlling the input sensing part ISP may be electrically connected to the second and third pads PD2 and PD3 through a printed circuit board.

The plurality of first-1 pen sensing electrodes PSE1-1 may extend in the first direction DR1 and be arranged in the second direction DR2. The plurality of the second-1 pen sensing electrodes PSE2-1 may extend in the second direction DR2 and be arranged in the first direction DR1. The first-1 and second-1 pen sensing electrodes PSE1-1 and PSE2-1 may be used to sense the above-described second input.

The first-1 pen sensing electrodes PSE1-1 may be adjacent to the first sensing electrodes SE1, respectively. The first-1 pen sensing electrodes PSE1-1 may be electrically insulated from and spaced apart from the first sensing electrodes SE1. The second-1 pen sensing electrodes PSE2-1 may be adjacent to the second sensing electrodes SE2, respectively. The second-1 pen sensing electrodes PSE2-1 may be electrically insulated from and spaced apart from the second sensing electrodes SE2.

The first-1 pen sensing electrodes PSE1-1 may extend to be electrically insulated from and to cross the second sensing electrodes SE2. The second-1 pen sensing electrodes PSE2-1 may extend to be electrically insulated from and to cross the first-1 pen sensing electrodes PSE1-1. The second-1 pen sensing electrodes PSE2-1 may extend to be electrically insulated from and to cross the first sensing electrodes SE1.

Each of the first-1 pen sensing electrodes PSE1-1 may be disposed between the first-1 sensing electrode SE1-1 and the first-2 sensing electrode SE1-2 of the corresponding first sensing electrode SE1 of the first sensing electrodes SE1. Each of the second-1 pen sensing electrodes PSE2-1 may be disposed between the second-1 sensing electrode SE2-1 and the second-2 sensing electrode SE2-2 of the corresponding second sensing electrode SE2 of the second sensing electrodes SE2.

The first-1 pen sensing electrodes PSE1-1 may be disposed on the same layer as the first sensing electrodes SE1. The second-1 pen sensing electrodes PSE2-1 may be disposed on the same layer as the second sensing electrodes SE2. Thus, the first-1 and second-1 pen sensing electrodes PSE1-1 and PSE2-1 may be disposed on the same layer as the first and second sensing electrodes SE1 and SE2.

Upper ends of the first-1 pen sensing electrodes PSE1-1 may be electrically connected to each other. Lower ends of the first-1 pen sensing electrodes PSE1-1 may be electrically connected in a pair to each other. Left ends of the second-1 pen sensing electrodes PSE2-1 disposed on the upper portion of the input sensing part ISP may be electrically connected to each other. Right ends of the second-1 pen sensing electrodes PSE2-1 disposed on the lower portion of the input sensing part ISP may be electrically connected to each other.

Right ends of the second-1 pen sensing electrodes PSE2-1 disposed on the upper portion of the input sensing part ISP might not be separated from each other so as not to be electrically connected to each other. Left ends of the second-1 pen sensing electrodes PSE2-1 disposed on the lower portion of the input sensing part ISP might not be separated from each other so as not to be electrically connected to each other.

The pen sensing lines PSL1, PSL2, and PSL3-1 to PSL3-3 may include a plurality of first pen sensing lines PSL1, a plurality of second pen sensing lines PSL2, and a plurality of third-1, third-2 and third-3 pen sensing lines PSL3-1, PSL3-2, and PSL3-3. The first pen sensing lines PSL1 and the third-1, third-2, and third-3 pen sensing lines PSL3-1, PSL3-2, and PSL3-3 may be electrically connected to the first-1 pen sensing electrodes PSE1-1. The second pen sensing lines PSL2 may be electrically connected to the second-1 pen sensing electrodes PSE2-1.

The pair of first-1 pen sensing electrodes PSE1-1 of which the lower ends are electrically connected to each other may be electrically connected to the corresponding first pen sensing line PSL1 of the first pen sensing lines PSL1. The upper ends of the first-1 pen sensing electrodes PSE1-1 may be electrically connected to the third-1 pen sensing line PSL3-1 extending in the second direction DR2.

The third-2 pen sensing line PSL3-2 and the third-3 pen sensing line PSL3-3 may extend from both ends of the third-1 pen sensing line PSL3-1 in the first direction DR1. The third-2 pen sensing line PSL3-2 may be disposed at the left side of the input sensing part ISP, extend toward the lower end of the input sensing part ISP, and be electrically connected to the corresponding second pad PD2. The third-3 pen sensing line PSL3-3 may be disposed on the right side of the input sensing part ISP, extend toward the lower end of the input sensing part ISP, and be electrically connected to the corresponding third pad PD3.

The left ends of the second-1 pen sensing electrodes PSE2-1 disposed on the upper portion of the input sensing part ISP may be electrically connected to the corresponding second pen sensing lines PSL2 of the second pen sensing lines PSL2. The second pen sensing line PSL2 electrically connected to the second-1 pen sensing electrodes PSE2-1 disposed on the upper portion of the input sensing part ISP may be disposed on the left side of the input sensing part ISP so as to be electrically connected to the corresponding second pad PD2.

The right ends of the second-1 pen sensing electrodes PSE2-1 disposed on the lower portion of the input sensing part ISP may be electrically connected to the corresponding second pen sensing lines PSL2 of the second pen sensing lines PSL2. The second pen sensing line PSL2 electrically connected to the second-1 pen sensing electrodes PSE2-1 disposed on the lower portion of the input sensing part ISP may be disposed at the right side of the input sensing part ISP so as to be electrically connected to the corresponding third pad PD3.

For example, the input sensing part ISP may be driven in time division to be driven in a first sensing section and a second sensing section. The first sensing section and the second sensing section may be repeated. In the first sensing section, the first and second sensing electrodes SE1 and SE2 may be driven to sense a touch of the user US. In the second sensing section, a touch of the pen PN may be sensed by the first-1 and second-1 pen sensing electrodes PSE1-1 and PSE2-1. An operation of sensing the touch of the pen PN will be described in detail below.

Since the touch of the user US and the touch of the pen PN are performed by the same input sensing part ISP, two input devices such as a touch panel and a digitizer might not be used to reduce a thickness of the display device DD.

For example, although six first-1 pen sensing electrodes PSE1-1 and eight second-1 pen sensing electrodes PSE2-1 are illustrated, but in practice, the input sensing part ISP may include more first-1 pen sensing electrodes PSE1-1 and second-1 pen sensing electrodes PSE2-1.

Referring to FIGS. 8 and 9, each of the first-1 and first-2 sensing electrodes SE1-1 and SE1-2 may include a plurality of first sensing parts SP1 arranged in a first direction DR1 and a plurality of first extension patterns EP1 disposed between the first sensing parts SP1 and may extend from the first sensing parts SP1 in the first direction DR1.

Each of the first sensing parts SP1 may have a bent shape. For example, the first sensing parts SP1 of the first-1 sensing electrode SE1-1 and the first sensing parts SP1 of the first-2 sensing electrode SE1-2 may be bent toward the outside.

In each of the first-1 and first-2 sensing electrodes SE1-1 and SE1-2, the first extension patterns EP1 may be integrated with the first sensing parts SP1. Each of the extension patterns EP may be disposed between two first sensing parts SP1 adjacent to each other in the first direction DR1 and may extend from the two first sensing part SP1.

Each of the second-1 and second-2 sensing electrodes SE2-1 and SE2-2 may include a plurality of second sensing parts SP2 arranged in the second direction DR2 and a plurality of first connection patterns CP1 disposed between the plurality of second sensing parts SP2 to connect the second sensing parts SP2.

Each of The second sensing parts SP2 may have a bent shape. For example, the second sensing parts SP2 of the second-1 sensing electrode SE2-1 and the second sensing parts SP2 of the second-2 sensing electrode SE2-2 may be bent toward the outside.

The first connection patterns CP1 may extend in the second direction DR2 and be electrically connected to the second sensing parts SP2. The second sensing parts SP2 may be electrically connected to each other through the first connection patterns CP1. When viewed in the plan view, the first connection patterns CP1 may cross the first extension patterns EP1. The first connection patterns CP1 may be electrically insulated from the first extension patterns EP1.

Each of the first connection patterns CP1 may be disposed between two second sensing parts SP2 adjacent to each other in the second direction DR2 to connect the two second sensing parts SP2. An insulating layer may be disposed between the first connection patterns CP1 and the second sensing parts SP2, and the first connection patterns CP1 may be electrically connected to the second sensing parts SP2 through first contact holes T-CH1 defined in the insulating layer.

The first sensing parts SP1 and the second sensing parts SP2 might not overlap each other and be spaced apart from each other so as to be alternately arranged with respect to each other. Each of the first sensing parts SP1 and the second sensing parts SP2 may have electrostatic capacity.

The first and second sensing parts SP1 and SP2 and the first extension patterns EP1 may be disposed on the same layer. The first connection patterns CP1 may be disposed on a layer that is different from that on which the first and second sensing parts SP1 and SP2 and the first extension patterns EP1 are disposed. The first connection patterns CP1 may be disposed below the first and second sensing parts SP1 and SP2 and the first extension patterns EP1.

Each of the first-1 pen sensing electrodes PSE1-1 may include a plurality of first pen sensing parts PSP1 arranged in the first direction DR1 and a plurality of second extension patterns EP2 extending from the first pen sensing parts PSP1 in the first direction DR1.

Each of the first pen sensing parts PSP1 may have a diamond shape, but the shape of each of the first pen sensing parts PSP1 is not necessarily limited thereto. The second extension patterns EP2 may be integrated with the first pen sensing parts PSP1. Each of the second extension patterns EP2 may be disposed between two first pen sensing parts PSP1 adjacent to each other in the first direction DR1 and may extend from the two first pen sensing parts PSP1.

Each of the second-1 pen sensing electrodes PSE2-1 may include a plurality of second pen sensing parts PSP2 arranged in the second direction DR2 and a plurality of second connection patterns CP2 connecting the second pen sensing parts PSP2.

Each of the second pen sensing parts PSP2 may have a diamond shape, but the shape of each of the second pen sensing parts PSP2 is not necessarily limited thereto. The second connection patterns CP2 may extend in the second direction DR2, be disposed between the second pen sensing parts PSP2, and be electrically connected to the second pen sensing parts PSP2. The second pen sensing parts PSP2 may be electrically connected to each other through the second connection patterns CP2.

Each of the second connection patterns CP2 may be disposed between two second pen sensing parts PSP2 adjacent to each other in the second direction DR2 to connect the two second pen sensing parts PSP2. An insulating layer is disposed between the second connection patterns CP2 and the second pen sensing parts PSP2, and the second connection patterns CP2 may be electrically connected to the second pen sensing parts through a second contact holes T-CH2 defined in the insulating layer.

Each of the second-1 pen sensing electrodes PSE2-1 may include dummy extensions DEP extending from the second pen sensing parts PSP2 in the second direction. The second connection patterns CP2 may be electrically connected to the dummy extensions DEP through the second contact holes T-CH2.

When viewed in the plan view, the first and second extension patterns EP1 and EP2 may extend to cross the first and second connection patterns CP1 and CP2. The first and second extension patterns EP1 and EP2 may be electrically insulated from the first and second connection patterns CP1 and CP2.

The first pen sensing parts PSP1, the second pen sensing parts PSP2, and the second extension patterns EP2 may be disposed on the same layer as the first and second sensing parts SP1 and SP2 and the first extension patterns EP1. The second connection patterns CP2 may be disposed on the same layer as the first connection patterns CP1. Thus, the first and second connection patterns CP1 and CP2 may be disposed below the first and second sensing parts SP1 and SP2, the first and second pen sensing parts PSP1 and PSP2, and the first and second extension patterns EP1 and EP2.

The lower ends of the pair of first-1 pen sensing electrodes PSE1-1 may be electrically connected by the corresponding third connection pattern CP3 of the third connection patterns CP3 illustrated in FIG. 8. The third connection patterns CP3 may be disposed on the same layer as the first and second connection patterns CP1 and CP2. For example, the third connection patterns CP3 may be disposed below the first-1 pen sensing electrodes PSE1-1.

In FIG. 8, the first sensing lines TL and the third connection patterns CP3 may be electrically insulated from each other and may extend to cross each other. For example, the first sensing lines TL may be disposed on the same layer as the first sensing parts SP1 adjacent to the lower side of the active area AA and may extend from the first sensing parts SP1.

The third connection patterns CP3 may be disposed below the first sensing lines TL and extend to cross the first sensing lines TL. An insulating layer may be disposed between the third connection patterns CP3 and the first sensing lines TL. The first pen sensing lines PSL1 may be disposed on the same layer as the third connection patterns CP3 and may extend from the third connection patterns CP3. An insulating layer may be disposed between the first sensing lines TL and the first pen sensing lines PSL1.

Referring to FIG. 8, the input sensing part ISP may have a rectangular shape with a pair of long sides extending in the first direction DR1 and a pair of short sides extending in the second direction DR2. Thus, the first sensing electrodes SE1 may be longer than the second sensing electrodes SE2. In addition, the first-1 pen sensing electrodes PSE1-1 may be longer than the second-1 pen sensing electrodes PSE2-1.

Resistance may be proportional to a length of the conductor. The resistance depending on the length of the conductor may be defined as line resistance. Thus, line resistance of the first sensing electrodes SE1 may be greater than line resistance of the second sensing electrodes SE2. In addition, line resistance of the first-1 pen sensing electrodes PSE1-1 may be greater than line resistance of the second-1 pen sensing electrodes PSE2-1.

The first and second connection patterns CP1 and CP2 may be defined as bridges. When the conductors are electrically connected by the bridges disposed on a layer that is different from that on which the conductors are disposed, resistance of each of electrodes provided as the conductors and bridges may increase.

In an embodiment of the inventive concept, the connection patterns may be used for the first sensing electrodes SE1 and the first-1 pen sensing electrodes PSE1-1, and the extension patterns may be used for the second sensing electrodes SE2 and the second-1 pen sensing electrodes PSE2-1. For example, the connection patterns disposed below the first sensing parts SP1 and the first pen sensing parts PSP1 may connect the first sensing parts SP1 to the first pen sensing parts PSP1. In addition, the extension patterns integrated with the second sensing parts SP2 and the second pen sensing parts PSP2 may extend from the second sensing parts SP2 and the second pen sensing parts PSP2.

When the connection patterns are used for the first sensing electrodes SE1 and the first-1 pen sensing electrodes PSE1-1, which are provided to be longer and thus have higher line resistance, line resistance of the first sensing electrodes SE1 and the first-1 pen sensing electrodes PSE1-1 may increase. Thus, in the embodiment of the inventive concept, the first and second connection patterns CP1 and CP2 may be used for the second sensing electrodes SE2 and the second-1 pen sensing electrodes PSE2-1, each of which has a smaller length and relatively low line resistance.

Referring to FIGS. 8 and 9, the input sensing part ISP may include a plurality of first-2 pen sensing electrodes PSE1-2, a plurality of second-2 pen sensing electrodes PSE2-2, and a plurality of dummy electrodes DME. For example, the first-2 pen sensing electrodes, the second-2 pen sensing electrodes PSE2-2, and the dummy electrodes DME overlapping the first and second sensing electrodes SE1 and SE2 and the first-1 and the second-1 pen sensing electrodes PSE1-1 and PSE2-1 are illustrated as dotted lines in FIG. 9.

Referring to FIGS. 9 and 10, the first-2 pen sensing electrodes PSE1-2 may be disposed on a layer that is different from that on which the first-1 pen sensing electrode PSE1-1 is disposed. For example, the first-2 pen sensing electrodes PSE1-2 may be disposed under the first-1 pen sensing electrode PSE1-1. The first-2 pen sensing electrodes PSE1-2 may be disposed on a layer that is different from that on which the first sensing electrode SE1 is disposed. For example, the first-2 pen sensing electrodes PSE1-2 may be disposed below the first sensing electrode SE1.

The first-2 pen sensing electrodes PSE1-2 may be disposed below the first sensing parts SP1, the first pen sensing parts PSP1, and the first and second extension patterns EP1 and EP2. The first-2 pen sensing electrodes PSE1-2 may be disposed on the same layer as the first and second connection patterns CP1 and CP2.

When viewed in the plan view, the first-2 pen sensing electrodes PSE1-2 may overlap a portion of the first-1 pen sensing electrode PSE1-1 and a portion of the first sensing electrode SE1. For example, when viewed in the plan view, the first-2 pen sensing electrodes PSE1-2 may overlap the first pen sensing parts PSP1, respectively. The first-2 pen sensing electrodes PSE1-2 may overlap portions of the second extension patterns EP2. The first-2 pen sensing electrodes PSE1-2 may overlap portions of the first sensing parts SP1.

An area of each of the first-2 pen sensing electrodes PSE1-2 overlapping the first sensing parts SP1 shown in FIG. 9 may be illustrated as an example and may be adjusted variously. For example, when viewed in the plan view, the first-2 pen sensing electrodes PSE1-2 may overlap the whole of the first sensing parts SP1.

The first-2 pen sensing electrodes PSE1-2 may be electrically connected to the first-1 pen sensing electrode PSE1-1 through the first contact holes P-CH1. The first contact holes P-CH1 may be defined in an insulating layer disposed between the first-1 pen sensing electrode PSE1-1 and the first-2 pen sensing electrode PSE1-2. When viewed in the plan view, the first contact holes P-CH1 may overlap the second extension patterns EP2.

The second-2 pen sensing electrodes PSE2-2 may be disposed on a layer that is different from that on which the second-1 pen sensing electrode PSE2-1 is disposed. For example, the second-2 pen sensing electrodes PSE2-2 may be disposed below the second pen sensing parts PSP2 of the second-1 pen sensing electrode PSE2-1. The second-2 pen sensing electrodes PSE2-2 may be disposed on a layer that is different from on which the second sensing electrode SE2 is disposed. For example, the second-2 pen sensing electrodes PSE2-2 may be disposed below the second sensing parts SP2 of the second sensing electrode SE2.

The second-2 pen sensing electrodes PSE2-2 may be disposed below the first and second sensing parts SP1 and SP2, the first and second pen sensing parts PSP1 and PSP2, and the first and second extension patterns EP1 and EP2. The second-2 pen sensing electrodes PSE2-2 may be disposed on the same layer as the first-2 pen sensing electrodes PSE1-2 and the first and second connection patterns CP1 and CP2.

When viewed in the plan view, the second-2 pen sensing electrodes PSE2-2 may overlap portions of the second-1 pen sensing electrode PSE2-1 and portions of the second sensing electrode SE2. For example, when viewed in the plan view, the second-2 pen sensing electrodes PSE2-2 may overlap the second pen sensing parts PSP2, respectively. The second-2 pen sensing electrodes PSE2-2 may overlap portions of the dummy extensions DEP. The second-2 pen sensing electrodes PSE2-2 may overlap portions of the second sensing parts SP2.

An area of each of the second-2 pen sensing electrodes PSE2-2 overlapping the second sensing parts SP2 shown in FIG. 9 may be illustrated as an example and may be adjusted variously. For example, when viewed in the plan view, the second-2 pen sensing electrodes PSE2-2 may overlap the whole of the second sensing parts SP2 except for the portions electrically connected to the second connection patterns CP2.

The second-2 pen sensing electrodes PSE2-2 may be electrically connected to the second-1 pen sensing electrode PSE2-1 through the second contact holes P-CH2. The second contact holes P-CH2 may be defined in an insulating layer disposed between the second-1 pen sensing electrode PSE2-1 and the second-2 pen sensing electrode PSE2-2. When viewed in the plan view, the second contact holes P-CH2 may overlap the dummy extensions DEP.

When viewed in the plan view, portions of the first-2 pen sensing electrodes PSE1-2 overlapping the first sensing electrode SE1 may be defined as first overlapping portions OVAL The first overlapping portions OVA1 may be defined as portions of the first-2 pen sensing electrodes PSE1-2 overlapping the first sensing portions SP1.

When viewed in the plan view, portions of the second-2 pen sensing electrodes PSE2-2 overlapping the second sensing electrode SE2 may be defined as second overlapping portions OVA2. The second overlapping parts OVA2 may be defined as portions of the second-2 pen sensing electrodes PSE2-2 overlapping the second sensing parts SP2. For example, the first overlapping portions OVA1 may have the same area as the second overlapping portions OVA2.

The dummy electrodes DME may at least partially surround the first-2 pen sensing electrodes PSE1-2. In addition, the dummy electrodes DME may at least partially surround the second-2 pen sensing electrodes PSE2-2. The dummy electrodes DME may be disposed on the same layer as the first and second connection patterns CP1 and CP2 and the first-2 and second-2 pen sensing electrodes PSE1-2 and PSE2-2.

The dummy electrodes DME may overlap a portion of the first sensing electrode SE1 and a portion of the second sensing electrode SE2. For example, the dummy electrodes DME may overlap portions of the first sensing parts SP1 and portions of the second sensing parts SP2.

When the dummy electrodes DME are not disposed at least partially surrounding the first-2 and second-2 pen sensing electrodes PSE1-2 and PSE2-2, shapes of the first-2 and second-2 pen sensing electrodes PSE1-2 and PSE2-2 may be visually recognized to the outside (e.g., may be seen by a user). For example, when separate patterns are not disposed at least partially surrounding the first-2 and second-2 pen sensing electrodes PSE1-2 and PSE2-2, but only the first-2 and second-2 pen sensing electrodes PSE1-2 and PSE2-2 are disposed, the shapes of the first-2 and second-2 pen sensing electrodes PSE1-2 and PSE2-2 may be well visually recognized from the outside.

However, in an embodiment of the inventive concept, when the dummy electrodes DME are additionally disposed adjacent to the first-2 and second-2 pen sensing electrodes PSE1-2 and PSE2-2, the first-2 and second-2 pen sensing electrodes PSE1-2 and PSE2-2 might not be well visually recognized from the outside.

Figure 11:
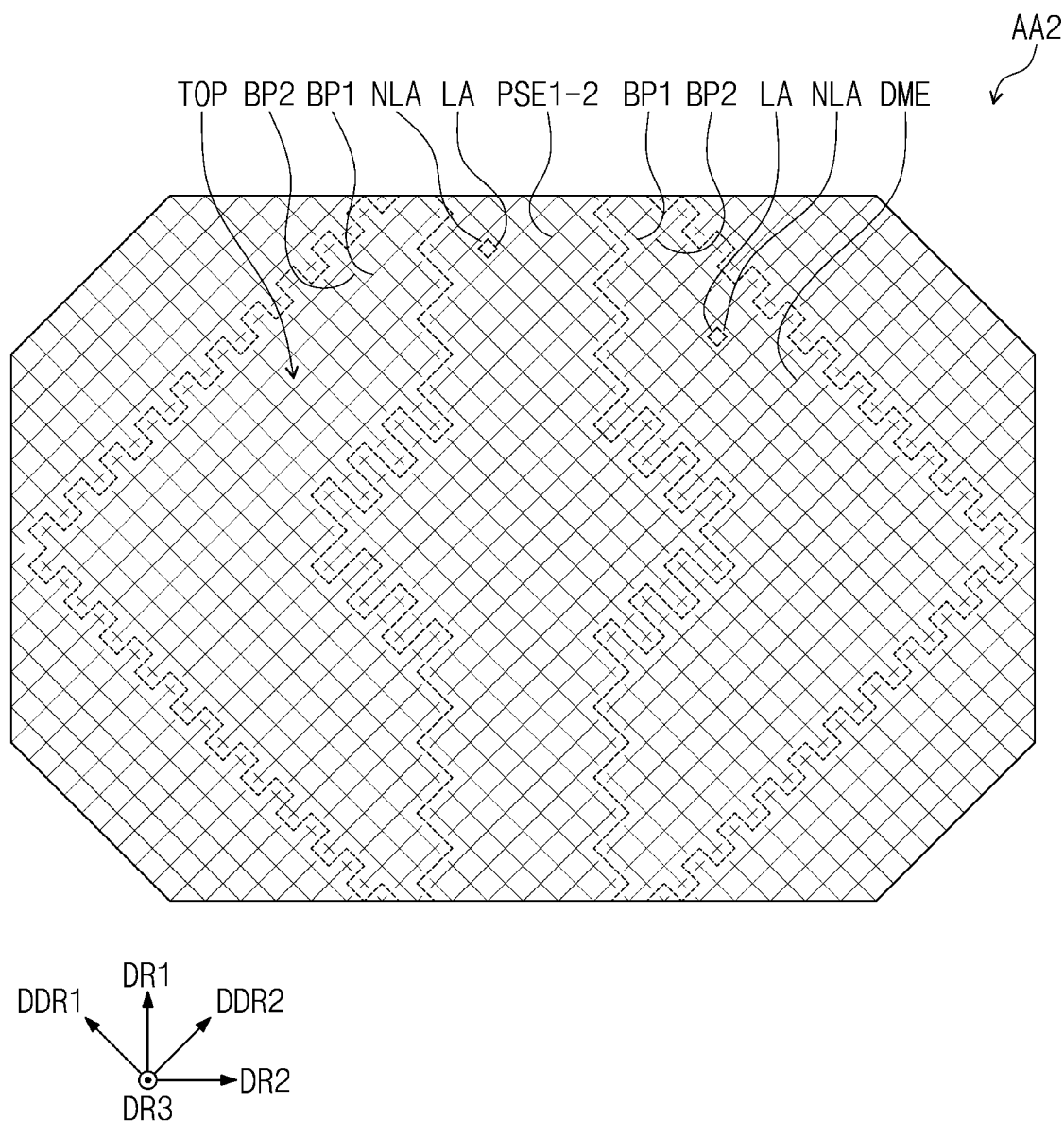
FIG. 11 is a plan view illustrating detailed shapes of the first-2 pen sensing electrode and the dummy electrode, which are illustrated on a second area AA2 of FIG. 10.

FIG. 11 is a view illustrating detailed shapes of the first-2 pen sensing electrode and the dummy electrode, which are illustrated on a second area AA2 of FIG. 10.

Referring to FIGS. 9, 10, and 11, in an embodiment of the inventive concept, each of the electrodes of the input sensing part ISP may have a mesh shape. For example, each of the first-2 pen sensing electrode PSE1-2 and the dummy electrodes DME adjacent to the first-2 pen sensing electrode PSE1-2 may have a mesh shape.

If the dummy electrodes DME are omitted, the first-2 pen sensing electrodes PSE1-2 may be more well visually recognized. However, since the dummy electrodes DME having the similar pattern are disposed adjacent to the first-2 pen sensing electrode PSE1-2, the first-2 pen sensing electrode PSE1-2 and the dummy electrodes DME may overall look like the mesh pattern. For example, the shape of the first-2 pen sensing electrode PSE1-2 might not be clearly visibly recognized to the outside.

For example, although the mesh shape of the first-2 pen sensing electrodes PSE1-2 and the dummy electrodes DME are illustrated, all the first and second sensing electrodes SE1 and SE2, the first and second sensing electrodes SE1 and SE2, the first-1 and first-2 pen sensing electrodes PSE1-1 and PSE1-2, the first-2 and second-2 pen sensing electrodes PSE1-2 and PSE2-2, and the dummy electrodes DME may have the mesh shape illustrated in FIG. 11.

Each of the first-2 pen sensing electrode PSE1-2 and the dummy electrodes DME may include a plurality of first branch portions BP1 extending in a first diagonal direction DDR1 and a plurality of second branch parts BP2 extending in a second diagonal direction DDR2.

The first diagonal direction DDR1 may be defined as a direction crossing the first and second directions DR1 and DR2 on a plane defined by the first and second directions DR1 and DR2. The second diagonal direction DDR2 may be defined as a direction crossing the first diagonal direction DDR1 and the first and second directions DR1 and DR2 on the plane defined by the first and second directions DR1 and DR2.

The first and second branch portions BP1 and BP2 may cross each other and be integrated with each other. The mesh shape of the first-2 pen sensing electrodes PSE1-2 and the dummy electrodes DME may be defined by the first and second branch portions BP1 and BP2.

Diamond-shaped openings T-OP may be defined by the first and second branch portions BP1 and BP2. The emission areas LA of the above-described pixels PX may be respectively disposed on the openings T-OP. Thus, the first and second branch portions BP1 and BP2 may overlap the non-emission area NLA. For example, the first and second sensing electrodes SE1 and SE2, the first-1 and first-2 pen sensing electrodes PSE1-1 and PSE1-2, the first-2 and second-2 pen sensing electrodes PSE1-2 and PSE2-2, and the dummy electrodes DME may overlap the non-emission area NLA.

Since the first and second branch portions BP1 and BP2 are disposed on the non-emission area NLA, light generated from the light emitting elements OLED of the pixels PX may be normally emitted without being affected by the first and second sensing electrodes SE1 and SE2, the first-1 and first-2 pen sensing electrodes PSE1-1 and PSE1-2, the first-2 and second-2 pen sensing electrodes PSE1-2 and PSE2-2, and the dummy electrode DME.

A boundary between the first-2 pen sensing electrode PSE1-2 and the dummy electrodes DME may be provided in the form of a zigzag pattern. For example, the boundary between the first-2 pen sensing electrodes PSE1-2 and the dummy electrodes DME is shown as a dotted line. The dotted line may be a virtual dotted line that indicates the boundary as an area on which the electrodes are not disposed. For example, the mesh shape of the electrodes at least partially surrounding the dummy electrodes DME is additionally shown.

The first and second branch portions BP1 and BP2 of the first-2 pen sensing electrodes PSE1-2 and the first and second branch portions BP1 and BP2 of the dummy electrodes DME may be electrically connected in the form of the zigzag pattern such as a dotted line. For example, edges of the first-2 pen sensing electrodes PSE1-2 adjacent to the dummy electrodes DME may have a zigzag pattern. In addition, edges of the dummy electrodes DME may have a zigzag pattern.

For example, although the boundary between the first-2 pen sensing electrode PSE1-2 and the dummy electrodes DME is shown, boundaries between the first and second sensing electrodes SE1 and SE2, the first-1 and first-2 pen sensing electrodes PSE1-1 and PSE1-2, the first-2 and second-2 pen sensing electrodes PSE1-2 and PSE2-2, and the dummy electrodes DME may be provided in the form of a zigzag pattern as illustrated in FIG. 11.

If the boundary between the first-2 pen sensing electrode PSE1-2 and the dummy electrodes DME is provided in a straight line, the user may more easily visually recognize the boundary between the first-2 pen sensing electrode PSE1-2 and the dummy electrode DME. However, when the boundary between the first-2 pen sensing electrode PSE1-2 and the dummy electrodes DME is not provided in the straight line, but provided in the form of zigzag pattern, the boundary between the first-2 pen sensing electrode PSE1-2 and the dummy electrodes DME might not be visually recognized.

For example, when the boundary between the first-2 pen sensing electrode PSE1-2 and the dummy electrodes DME is provided in the form of the zigzag pattern, but is not provided in the straight line, the boundary between the first-2 pen sensing electrode PSE1-2 and the dummy electrodes DME may have various patterns.

Figure 12:
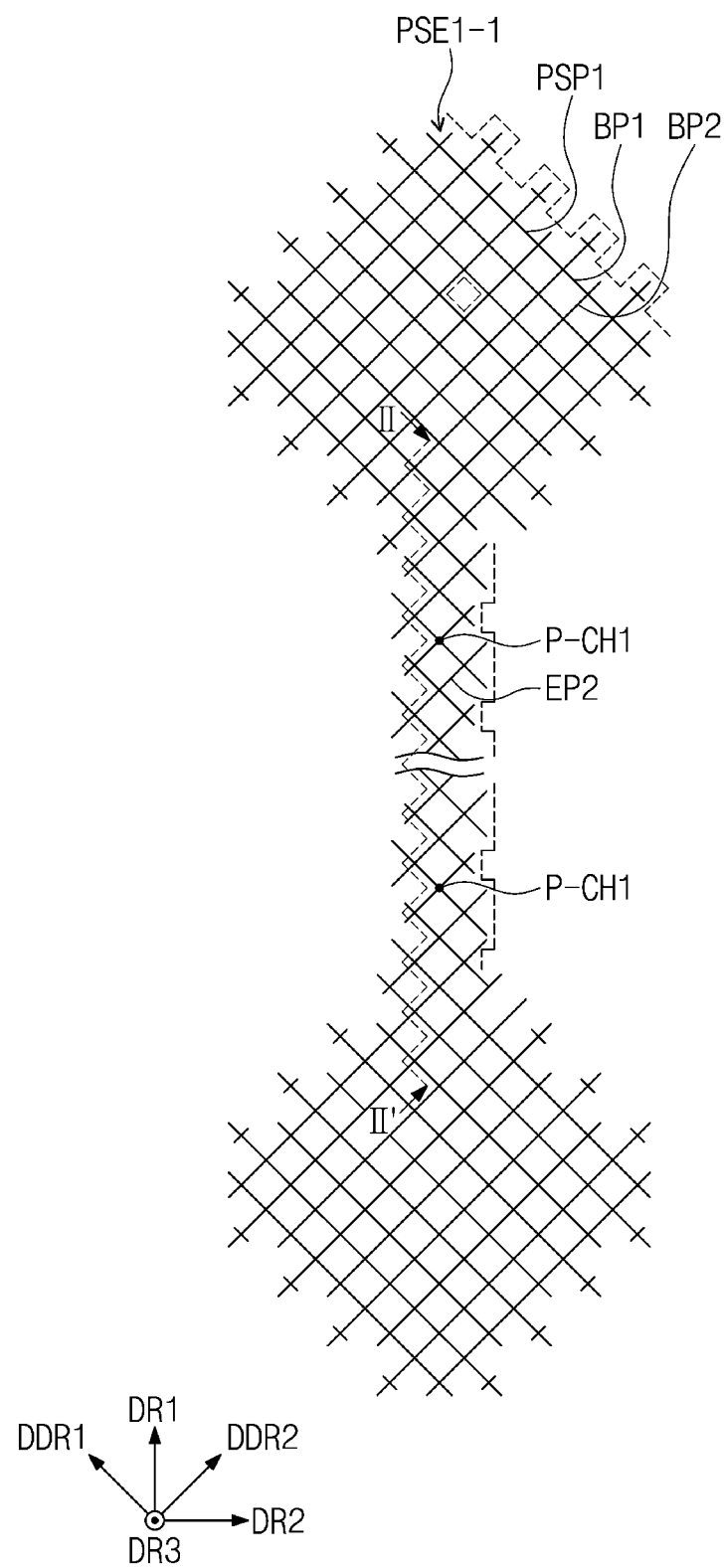
FIG. 12 is a plan view illustrating a mesh shape of a first pen sensing electrode of FIG. 9.

FIG. 12 is a view illustrating the mesh shape of the first pen sensing electrode of FIG. 9.

Referring to FIGS. 9 and 12, the first pen sensing electrode PSE1 may have the same mesh shape as the first-2 pen sensing electrodes PSE1-2 and the dummy electrodes DME. The first pen sensing electrode PSE1 may include first and second branch portions BP1 and BP2 extending in the first and second diagonal directions DDR1 and DDR2. In addition, an edge of the first pen sensing electrode PSE1 may be provided to have a zigzag pattern as shown by dotted lines.

The line II-IT illustrated in FIG. 9 may correspond to the line II-IT in the mesh shape illustrated in FIG. 12. For example, the line II-IT may extend along the mesh line. In order to show the line II-IT, the line II-IT is illustrated adjacent to the mesh line, but the line II-IT may be a cut line that overlaps the mesh line. Thus, hereinafter, the drawing of the cross-section taken along line II-IT may be a cross-section of the electrodes provided as the mesh line.

The lines III-IIT, IV-IV', and V-V' illustrated in FIG. 9 may be cut lines overlapping the mesh line.

Figure 13:
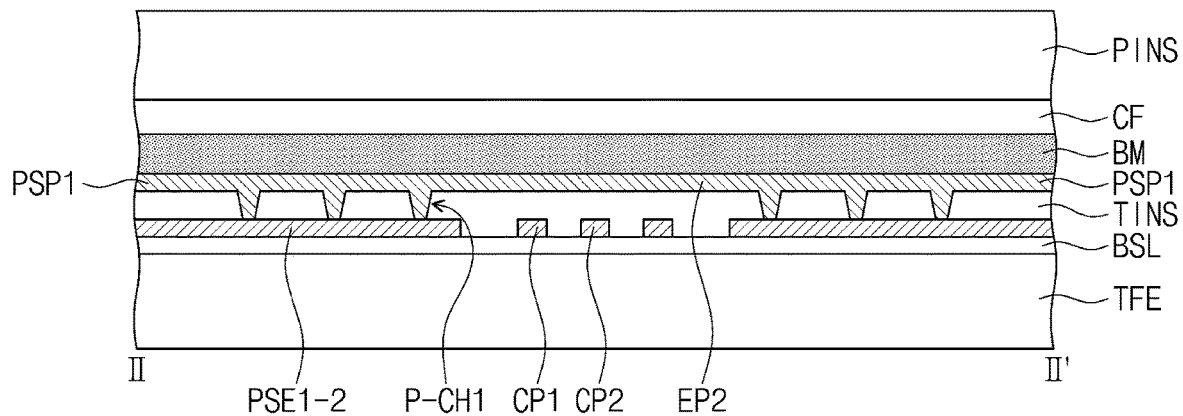
FIG. 13 is a cross-sectional view taken along line II-II of FIGS. 9 and 12.

FIG. 13 is a cross-sectional view taken along line II-IF of FIGS. 9 and 12.

Referring to FIG. 13, a base layer BSL may be disposed on a thin film encapsulation layer TFE, and the first and second connection patterns CP1 and CP2 may be disposed on the base layer BSL. The first-2 pen sensing electrodes PSE1-2 may be disposed on the base layer BSL. The first and second connection patterns CP1 and CP2 may be disposed between the first-2 pen sensing electrodes PSE1-2. The first and second connection patterns CP1 and CP2 and the first-2 pen sensing electrodes PSE1-2 may be formed by the above-described first conductive pattern CTL1.

An insulating layer TINS may be disposed on the base layer BSL and may cover the first and second connection patterns CP1 and CP2 and the first-2 pen sensing electrodes PSE1-2. The second extension pattern CTL2 may be disposed on the insulating layer TINS. The first pen sensing parts PSP1 integrated with the second extension pattern EP2 may also be disposed on the insulating layer TINS. The first pen sensing parts PSP1 and the second extension pattern EP2 may be formed by the above-described second conductive pattern CTL2.

The first pen sensing parts PSP1 may be electrically connected to the first-2 pen sensing electrodes PSE1-2 through the first contact holes P-CH1 defined in the insulating layer TINS. Therefore, the first-2 pen sensing electrodes PSE1-2 may be electrically connected to the first-1 pen sensing electrode PSE1-1 through the first contact holes P-CH1 defined in the insulating layer TINS.

A black matrix BM may be disposed on the insulating layer TINS and may cover the first pen sensing parts PSP1 and the second extension pattern EP2. A color filter CF may be disposed on the black matrix BM, and a planarization insulating layer PINS may be disposed on the color filter CF.

Figure 14:
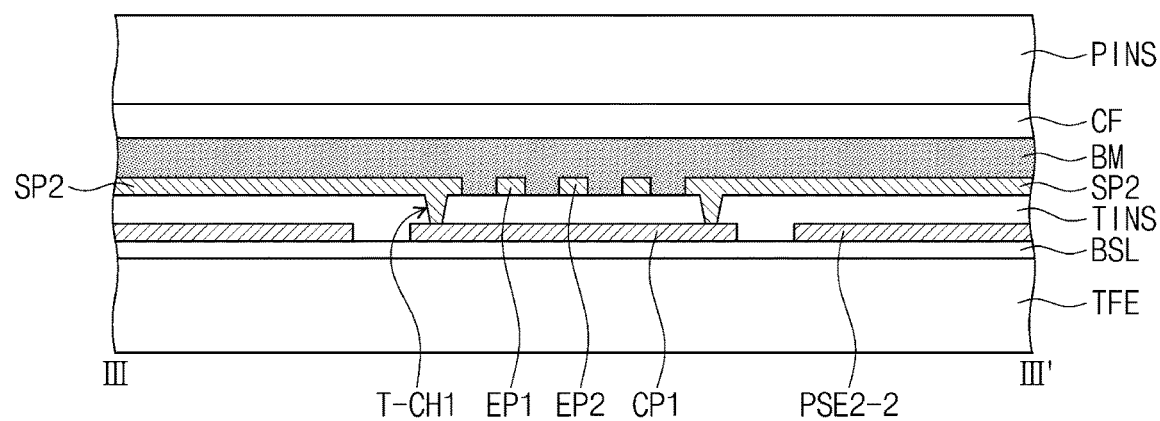
FIG. 14 is a cross-sectional view taken along line III-III of FIG. 9.

FIG. 14 is a cross-sectional view taken along line III-III' of FIG. 9.

Referring to FIG. 14, the first connection pattern CP1 and the second-2 pen sensing electrodes PSE2-2 may be disposed on the base layer BSL. The first connection pattern CP1 may be disposed between the second-2 pen sensing electrodes PSE2-2. The second-2 pen sensing electrodes PSE2-2 may be formed by the above-described first conductive pattern CTL1.

An insulating layer TINS may be disposed on the base layer BSL and may cover the first connection pattern CP1 and the second-2 pen sensing electrodes PSE2-2. The first and second extension patterns EP1 and EP2 and the second sensing parts SP2 may be disposed on the insulating layer TINS. The first and second extension patterns EP1 and EP2 may be disposed between the second sensing parts SP2.

The first extension patterns EP1 and the second sensing parts SP2 may be formed by the above-described second conductive pattern CTL2. The first sensing parts SP1 integrated with the first extension patterns EP1 may also be disposed on the insulating layer TINS.

The second sensing parts SP2 may be electrically connected to the first connection pattern CP1 through the first contact holes T-CH1 defined in the insulating layer TINS. The second sensing parts SP2 may be electrically connected by the first connection pattern CP1.

The black matrix BM may be disposed on the insulating layer TINS and may cover the first and second extension patterns EP1 and EP2 and the second sensing parts SP2, and the color filter CF and the planarization insulating layer PINS may be sequentially disposed.

Figure 15:
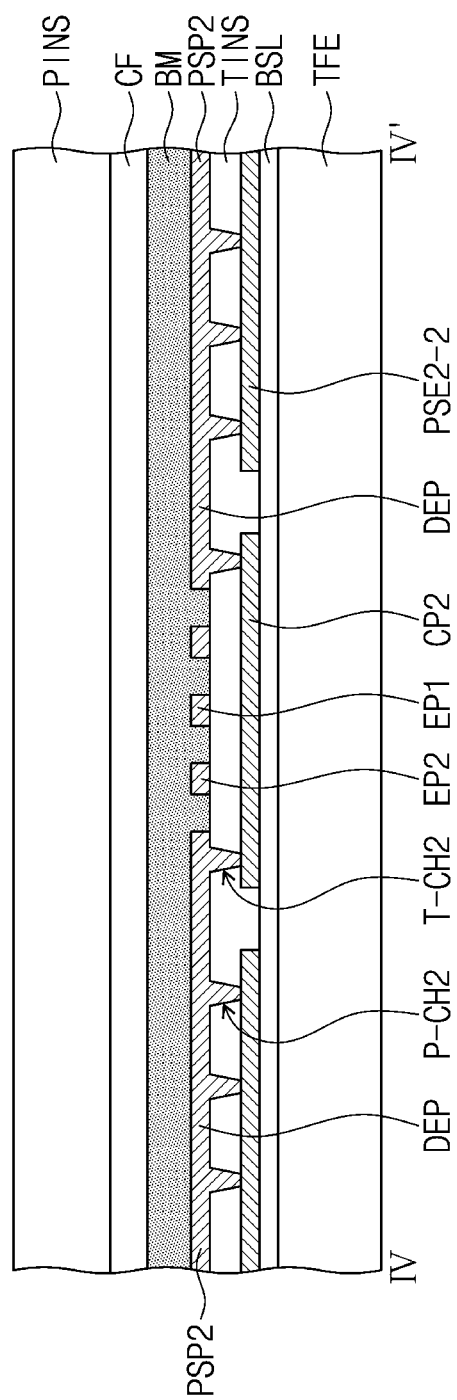
FIG. 15 is a cross-sectional view taken along line IV-IV of FIG. 9.

FIG. 15 is a cross-sectional view taken along line IV-IV' illustrated in FIG. 9.

Referring to FIG. 15, the second connection pattern CP2 and the second-2 pen sensing electrodes PSE2-2 may be disposed on the base layer BSL. The second connection pattern CP2 may be disposed between the second-2 pen sensing electrodes PSE2-2.

An insulating layer TINS may be disposed on the base layer BSL and may cover the second connection pattern CP2 and the second-2 pen sensing electrodes PSE2-2. The first and second extension patterns EP1 and EP2, the second pen sensing parts PSP2, and the dummy extensions DEP may be disposed on the insulating layer TINS. The first and second extension patterns EP1 and EP2 may be disposed between the second pen sensing parts PSP2. For example, the first and second extension patterns EP1 and EP2 may be disposed between the dummy extensions DEP.

The second pen sensing parts PSP2 and the dummy extensions DEP may be formed by the above-described second conductive pattern CTL2. The second pen sensing parts PSP2 may be electrically connected to the second connection pattern CP2 through the second contact holes T-CH2 defined in the insulating layer TINS. The second pen sensing parts PSP2 may be electrically connected by the second connection pattern CP2.

The second pen sensing parts PSP2 may be electrically connected to the second-2 pen sensing electrodes PSE2-2 through the second contact holes P-CH2 defined in the insulating layer TINS. Thus, the second-2 pen sensing electrodes PSE2-2 may be electrically connected to the second-1 pen sensing electrode PSE2-1 through the second contact holes P-CH2 defined in the insulating layer TINS.

The black matrix BM may be disposed on the insulating layer TINS and may cover the first and second extension patterns EP1 and EP2, the second pen sensing parts PSP2, and the dummy extensions DEP.

Figure 16:
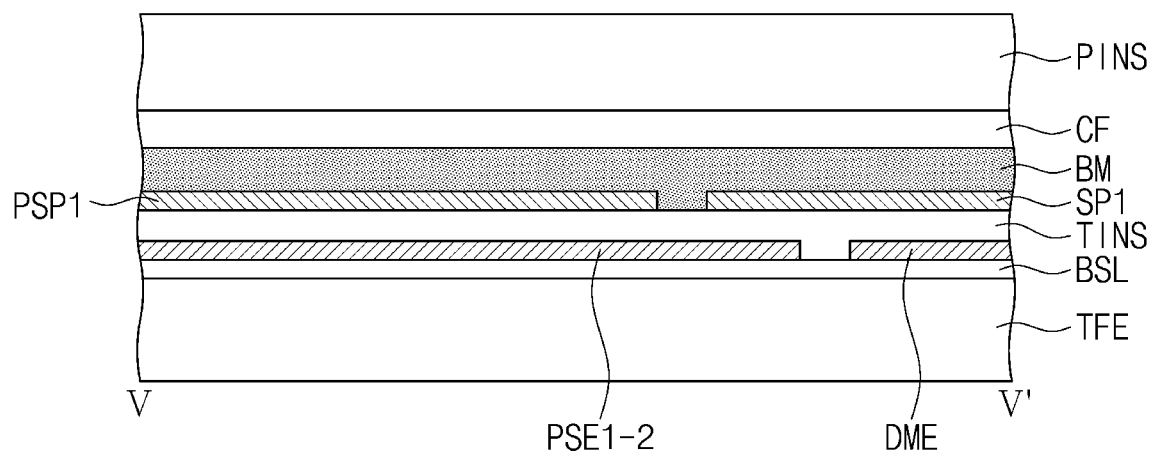
FIG. 16 is a cross-sectional view taken along line V-V' illustrated in FIG. 9.

FIG. 16 is a cross-sectional view taken along line V-V' illustrated in FIG. 9.

Referring to FIG. 16, the first-2 pen sensing electrode PSE1-2 and the dummy electrode DME may be disposed on the base layer BSL. An insulating layer TINS may be disposed on the base layer BSL and may cover the first-2 pen sensing electrodes PSE1-2 and the dummy electrode DME. The first pen sensing part PSP1 and the first sensing part SP1 may be disposed on the insulating layer TINS.

When viewed in the plan view, the first-2 pen sensing electrodes PSE1-2 may overlap the first pen sensing part PSP1. When viewed in the plan view, the first-2 pen sensing electrode PSE1-2 may overlap a portion of the first sensing part SP1.

Cross-sectional structures of the second-2 pen sensing electrode PSE2-2, the dummy electrode DME, the second pen sensing part PSP2, and the second sensing part SP2 may be substantially the same as those illustrated in FIG. 16.

The black matrix BM may be disposed on the first pen sensing part PSP1 and the insulating layer TINS and may cover the first sensing part SP1.

Figure 17A:
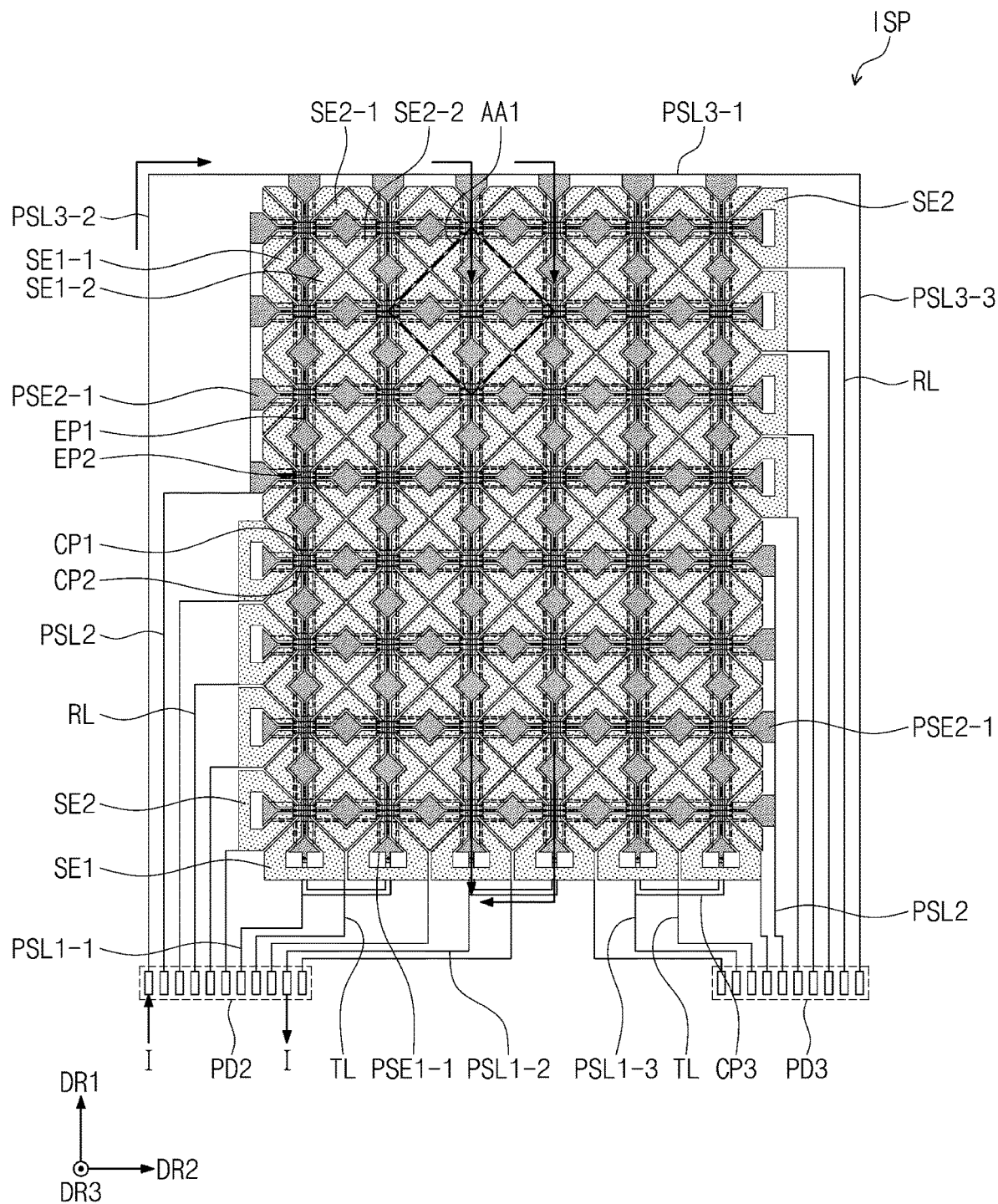
FIGS. 17A to 17C are plan views illustrating pen sensing electrodes of FIG. 8.
Figure 17B:
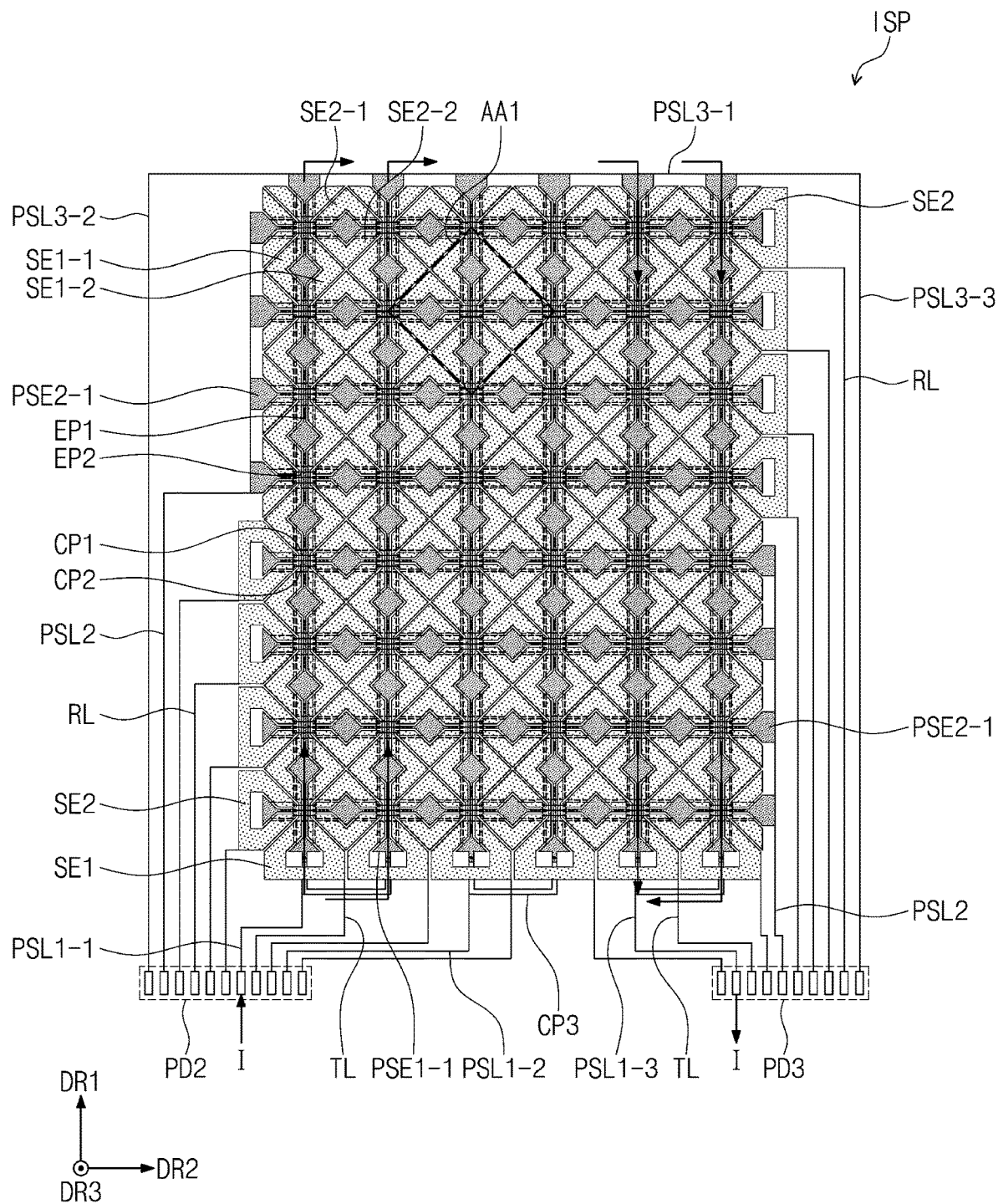
Figure 17C:
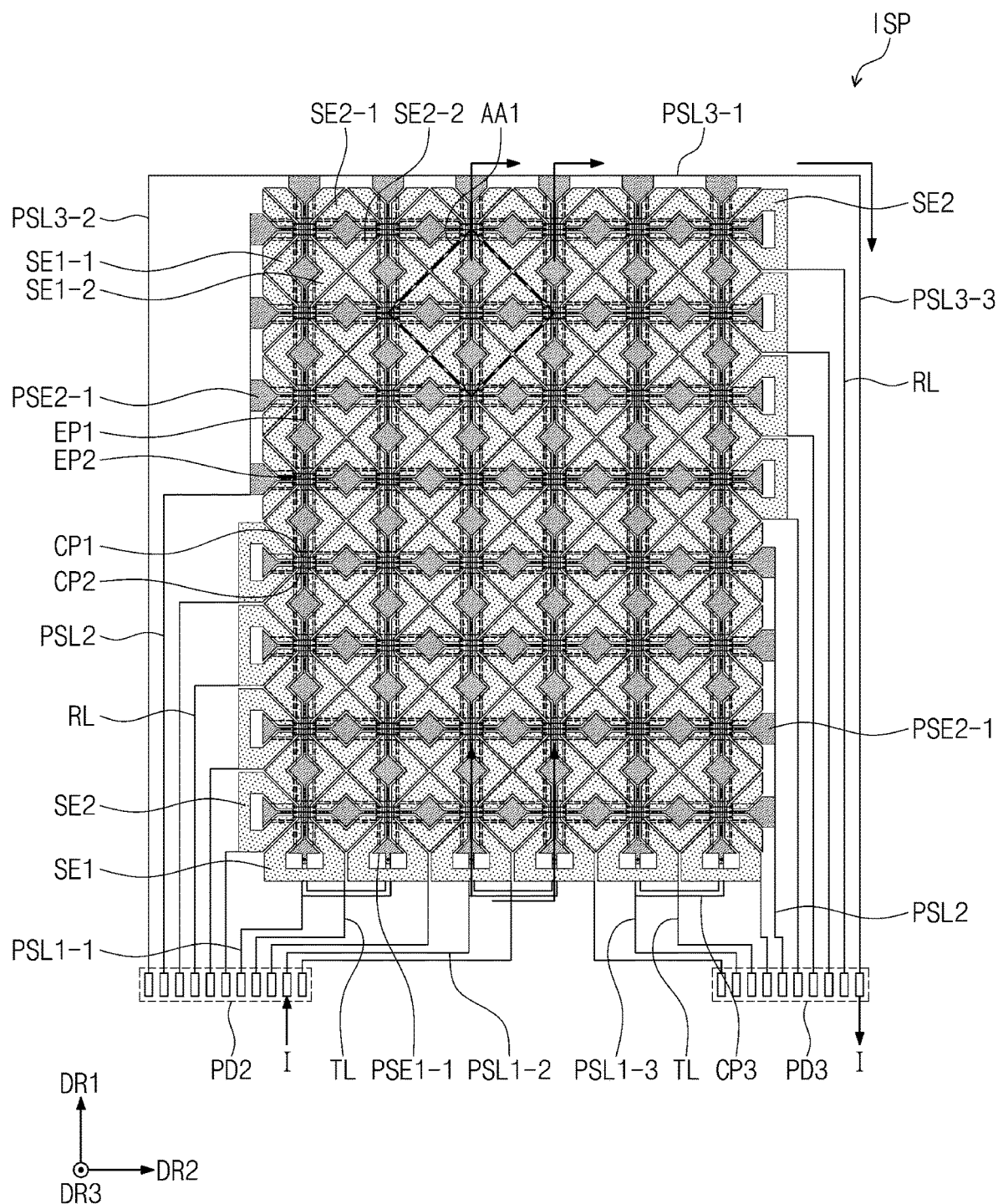
Figure 18:
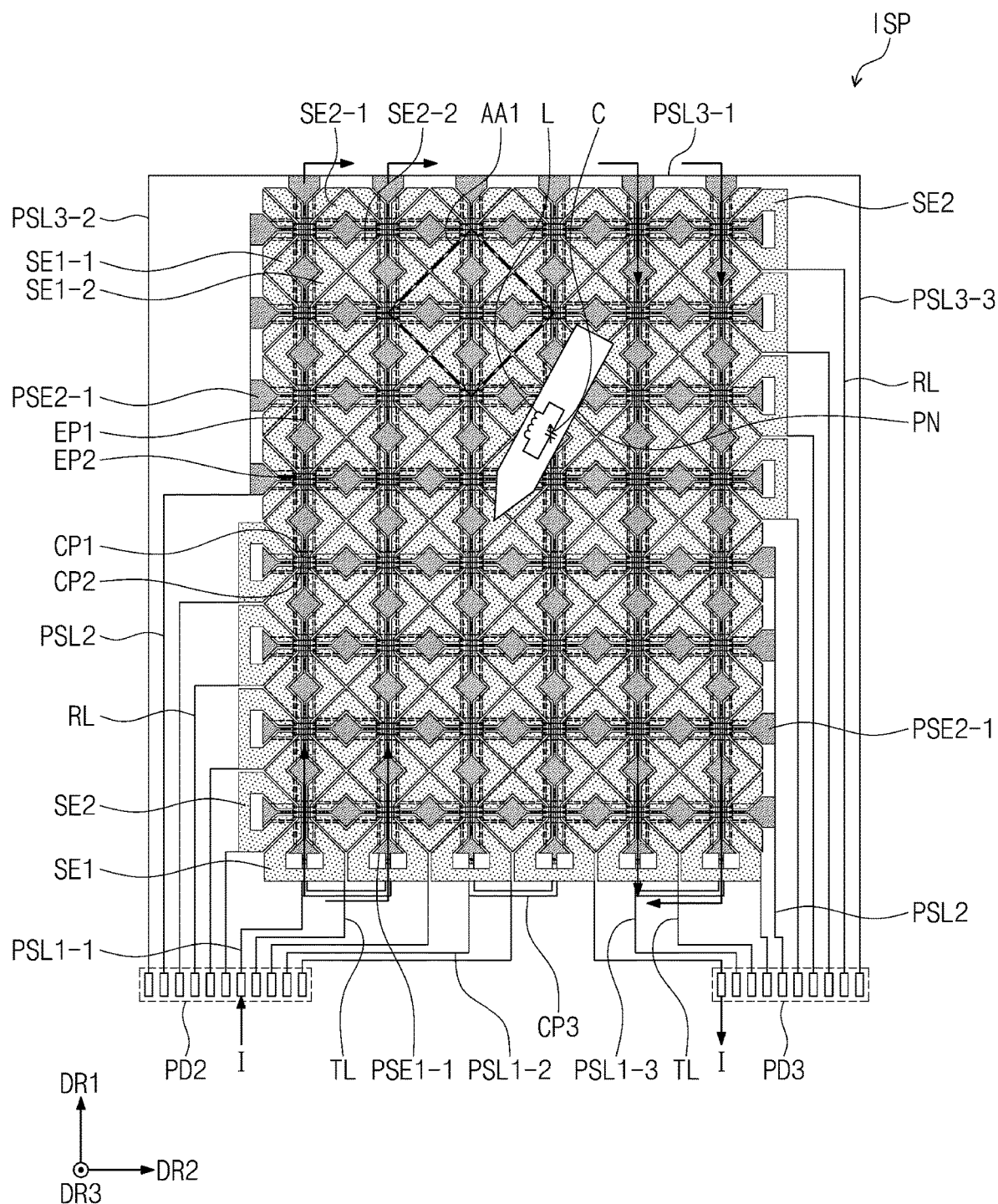
FIG. 18 is a plan view illustrating a charging operation of a pen disposed on the input sensing part.

FIGS. 17A to 17C are views illustrating the pen sensing electrodes of FIG. 8. FIG. 18 is a view illustrating a charging operation of the pen disposed on the input sensing part.

For example, in FIGS. 17A to 17C and FIG. 18, an edge between the active area AA and the non-active area NAA of the input sensing part ISP is omitted. Hereinafter, in FIGS. 17A to 17C and 18, first pen sensing lines PSL1 are divided into first-1, first-2, and first-3 pen sensing lines PSL1-1, PSL1-2, and PSL1-3 in order from left to right.

Referring to FIG. 17A, the above-described second sensing section may include a charging section and a pen sensing section following the charging section. In the charging section, the first-1, first-2, and first-3 pen sensing lines PSL1-1, PSL1-2, and PSL1-3, the first-1 pen sensing electrodes PSE1-1, and the third-1, third-2, and third-3 pen sensing lines PSL3-1, PSL3-2, and PSL3-3 may be sequentially driven to form a coil.

For example, the second and third pads PD2 and PD3 may be electrically connected to a driving circuit of the sensing IC. The driving circuit may apply a driving signal to the first-1, first-2, and first-3 pen sensing lines PSL1-1, PSL1-2, and PSL1-3, and the third-1, third-2, and third-3 pen sensing lines PSL3-1, PSL3-2, and PSL3-3 in a predetermined sequence.

In a first section of the charging section, the driving circuit may be electrically connected to the second pad PD2, to which the third-2 pen sensing line PSL3-2 is electrically connected, and the second pad PD2, to which the first-2 pen sensing line PSL1-2 is electrically connected. The driving circuit may apply driving current I to the third-2 pen sensing line PSL3-2. The driving current I may flow through the third-2 pen sensing line PSL3-2, the first-1 pen sensing electrodes PSE1-1 electrically connected to the first-2 pen sensing line PSL1-2, and the first-2 pen sensing line PSL1-2.

Thus, the third-2 pen sensing line PSL3-2, the first-1 pen sensing electrodes PSE1-1 electrically connected to the first-2 pen sensing line PSL1-2, and the first-2 pen sensing line PSL1-2 may be provided in the form of the coil, and the driving current I may flow through the third-2 pen sensing line PSL3-2, the first-1 pen sensing electrodes PSE1-1 electrically connected to the first-2 pen sensing line PSL1-2, and the first-2 pen sensing line PSL1-2.

Referring to FIG. 17B, in a second section following the first section of the charging section, the driving circuit may be electrically connected to the second pad PD2, to which the first-1 pen sensing line PSL1-1 is electrically connected, and the third pad PD3, to which the first-3 pen sensing line PSL1-3 is electrically connected. The driving circuit may apply the driving current I to the first-1 pen sensing line PSL1-1. The driving current I may flow through the first-1 pen sensing line PSL1-1, the first-1 pen sensing electrodes PSE1-1 electrically connected to the first-1 pen sensing line PSL1-1, the first-1 pen sensing line PSE1-1 electrically connected to the first-3 pen sensing line PSL1-3, and the first-3 pen sensing line PSL1-3.

Thus, the first-1 pen sensing line PSL1-1, the first-1 pen sensing electrodes PSE1-1 electrically connected to the first-1 pen sensing line PSL1-1, the first-1 pen sensing line PSE1-1 electrically connected to the first-3 pen sensing line PSL1-3, and the first-3 pen sensing line PSL1-3 may be provided in the form of the coil, and the driving current I may flow through the first-1 pen sensing line PSL1-1, the first-1 pen sensing electrodes PSE1-1 electrically connected to the first-1 pen sensing line PSL1-1, the first-1 pen sensing line PSE1-1 electrically connected to the first-3 pen sensing line PSL1-3, and the first-3 pen sensing line PSL1-3.

Referring to FIG. 17C, in a third section following the second section of the charging section, the driving circuit may be electrically connected to the second pad PD2, to which the first-2 pen sensing line PSL1-2 is electrically connected, and the third pad PD3, to which the third-3 pen sensing line PSL3-3 is electrically connected. The driving circuit may apply the driving current I to the first-2 pen sensing line PSL1-2. The driving current I may flow through the first-2 pen sensing line PSL1-2, the first-1 pen sensing electrodes PSE1-1 electrically connected to the first-2 pen sensing line PSL1-2, and the third-3 pen sensing line PSL3-3.

Thus, the first-2 pen sensing line PSL1-2, the first-1 pen sensing electrodes PSE1-1 electrically connected to the first-2 pen sensing line PSL1-2, and the third-3 pen sensing line PSL3-3 may be provided in the form of the coil, and the driving current I may flow through the first-2 pen sensing line PSL1-2, the first-1 pen sensing electrodes PSE1-1 electrically connected to the first-2 pen sensing line PSL1-2, and the third-3 pen sensing line PSL3-3.

The sequence described above is description as an example, and the driving sequence might not necessarily be limited thereto. For example, in the first section, the driving current I may flow through the third-2 pen sensing line PSL3-2, the first-1 pen sensing electrodes PSE1-1 electrically connected to the first-1 pen sensing line PSL1-1, and the first-1 pen sensing line PSL1-1.

In addition, in the second section, the driving current I may flow through the first-1 pen sensing line PSL1-1, the first-1 pen sensing electrodes PSE1-1 electrically connected to the first-1 pen sensing line PSL1-1, the first-1 pen sensing electrodes PSE1-1 electrically connected to the first-2 pen sensing line PSL1-2, and the first-2 pen sensing line PSL1-2. Thereafter, the driving current I may flow through the first-1 pen sensing electrodes PSE1-1 and the third-3 pen sensing line PSL3-3 in a similar sequence.

Referring to FIG. 18, as described in FIGS. 17A to 17C, the driving current I may flow through the first-1, first-2, and 1-3 pen sensing lines PSL1-1, PSL1-2, and PSL1-3, the first-1 pen sensing electrodes PSE1-1, and the third-1, third-2, and third-3 pen sensing lines PSL3-1, PSL3-2, and PSL3-3, and the pen PN may be disposed on the input sensing part ISP.

The pen PN may include an inductor L and a capacitor C electrically connected to the inductor L. An LC resonance circuit may be formed by the inductor L and the capacitor C. The capacitor C may be a variable capacitor having variable capacitance. The pen PN may be disposed on the display module DM, and the capacitor C may be charged in the charging section.

For example, the pen PN may be disposed between the first-1 pen sensing electrodes PSE1-1 electrically connected to the first-1 pen sensing line PSL1-1 and the first-1 pen sensing electrodes PSE1-1 electrically connected to the first-3 pen sensing line PSL1-3.

In this case, magnetic flux may be generated by the driving current I that flow through the first-1 pen sensing line PSL1-1, the first-1 pen sensing electrodes PSE1-1 electrically connected to the first-1 pen sensing line PSL1-1, the first-1 pen sensing electrodes PSE1-1 electrically connected to the line PSL1-3, and the first-3 pen sensing line PSL1-3. The magnetic flux may be introduced into a ferrite core surrounded by the coil of the inductor L. Here, induced current may be generated in the coil of the inductor L. Charges may be charged in the capacitor C by the induced current.

In the charging section, a constant voltage may be applied to the second pen sensing electrodes P-SE2 through the second pen sensing lines PSL2.

Figure 19:
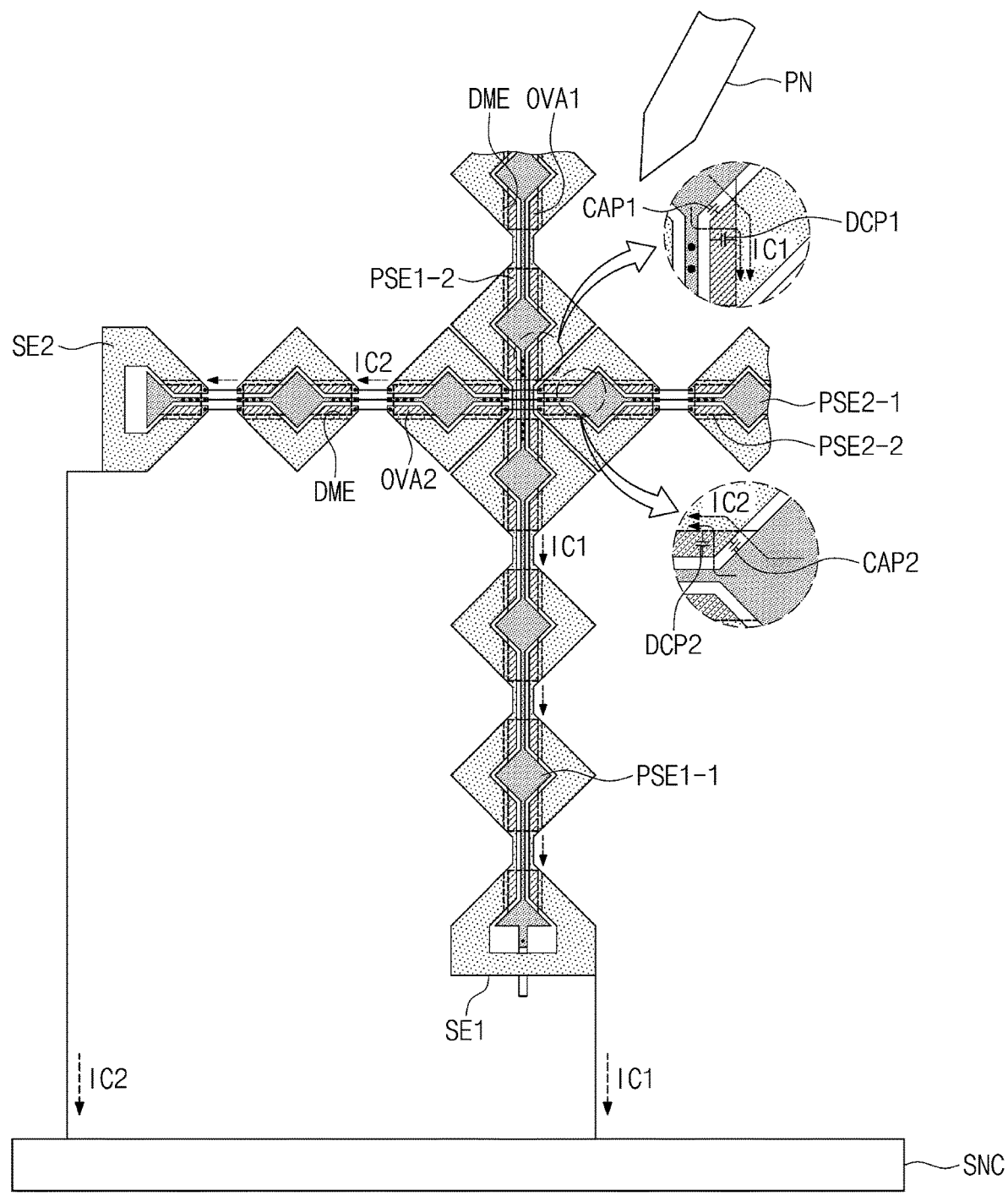
FIG. 19 is a plan view illustrating a sensing operation with respect to a touch of the pen of FIG. 18.
Figure 20:
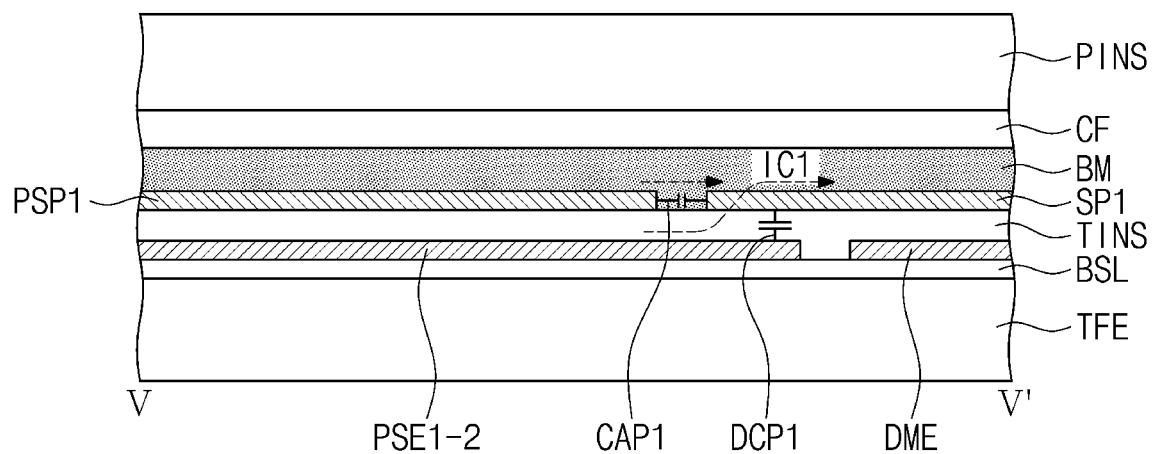
FIG. 20 is a cross-sectional view illustrating a capacitor disposed between the first-2 pen sensing electrode and the first sensing part in the cross-sectional view of FIG. 16.

FIG. 19 is a view illustrating a sensing operation with respect to the touch of the pen of FIG. 18. FIG. 20 is a view illustrating a capacitor disposed between the first-2 pen sensing electrode and the first sensing part in the cross-sectional view of FIG. 16.

For convenience of description, for example, FIG. 19 illustrates a portion of one first-1 pen sensing electrode PSE1-1 and a portion of one the second-1 pen sensing electrode PSE2-1, through which the induced current generated by the pen PN flows. In addition, the first sensing electrode SE1 adjacent to the first-1 pen sensing electrode PSE1-1 and the second sensing electrode SE2 adjacent to the second-1 pen sensing electrode PSE2-1 are illustrated together with the pen sensing electrode PSE1-1 and the second-1 pen sensing electrode PSE2-1. The first-2 and second-2 pen sensing electrodes PSE1-2 and PSE2-2 and the dummy electrodes DME are indicated by dotted lines.

Referring to FIGS. 19 and 20, the sensing circuit SNC of the sensing IC may be electrically connected to the first and second sensing electrodes SE1 and SE2 in the pen sensing section following the charging section. In the pen sensing section, a constant voltage may be applied to the first-1 pen sensing electrodes PSE1-1 and the second-1 pen sensing electrodes PSE2-1.

The LC resonance circuit of the pen PN may generate magnetic flux while consuming the charged charges. Induced current may be generated in the first-1 pen sensing electrode PSE1-1 and the second-1 pen sensing electrode PSE2-1 by the magnetic flux. The pen may generate a vibrating magnetic field, and the induced current may be generated in the first-1 and first-2 pen sensing electrodes PSE1-1 and PSE1-2 by the vibrating magnetic field.

First induced current IC1 generated by the first-1 pen sensing electrode PSE1-1 may be provided to the first sensing electrode SE1 by the first capacitor CAP1 provided by the first-1 pen sensing electrode PSE1-1 and the first sensing electrode SE1 and then be provided to the sensing circuit SNC.

A first dummy capacitor DCP1 may be provided by the first-2 pen sensing electrode PSE1-2 and the first sensing electrode SE1, which overlap each other. The first dummy capacitor DCP1 may be disposed on the first overlapping portion OVA1. The first induced current IC1 may be provided to the first sensing electrode SE1 by the first dummy capacitor DCP1 additionally provided by the first-2 pen sensing electrode PSE1-2 and the first sensing electrode SE1 and then be provided to the sensing circuit SNC.

Second induced current IC2 generated by the second-1 pen sensing electrode PSE2-1 may be provided to the second sensing electrode SE2 by the second capacitor CAP2 provided by the second-1 pen sensing electrode PSE2-1 and the second sensing electrode SE2 and then be provided to the sensing circuit SNC.

A second dummy capacitor DCP2 may be provided by the second-2 pen sensing electrode PSE2-2 and the second sensing electrode SE2, which overlap each other. The second dummy capacitor DCP2 may be disposed on the second overlapping portion OVA2. The second induced current IC2 may be provided to the second sensing electrode SE2 by the second dummy capacitor DCP2 additionally provided by the second-2 pen sensing electrode PSE2-2 and the second sensing electrode SE2 and then be provided to the sensing circuit SNC.

The first induced current IC1 may be provided to the sensing circuit SNC by the first dummy capacitor DCP1 as well as the first capacitor CAP1. The second induced current IC2 may be provided to the sensing circuit SNC by the second dummy capacitor DCP2 as well as the second capacitor CAP2.

The sensing circuit SNC may sense a position of the pen PN by sensing the first induced current IC1 and the second induced current IC2, which are provided through the first and second sensing electrodes SE1 and SE2. For example, the touch of the pen PN may be sensed by the first-1 and second-1 pen sensing electrodes PSE1-1 and PSE2-1 and the first and second sensing electrodes SE1 and SE2.

In an embodiment of the inventive concept, the first and second induced currents IC1 and IC2 may be provided to the first and second induced current IC1 and IC2 by the first and second dummy capacitors DCP1 and DCP2 as well as the first and second capacitors CAP1 and CAP2. The first and second induced currents IC1 and IC2 may be defined as sensing signals. A magnitude of the sensing signal may be defined as magnitudes of the first and second induced current IC1 and IC2.

When the first and second induced currents IC1 and IC2 are provided to the first and second sensing electrodes SE1 and SE2 using only the first and second capacitors CAP1 and CAP2, the sensing signal may be reduced depending on the above-described line resistance.

In an embodiment of the inventive concept, the first and second induced current IC1 and IC2 may be transmitted additionally by the first and second dummy capacitors DCP1 and DCP2 as well as the first and second capacitors CAP1 and CAP2 to prevent the sensing signal from being reduced. Therefore, the sensing signal may be more easily provided to the sensing circuit SNC to increase sensing sensitivity for the pen PN.

Figure 21:
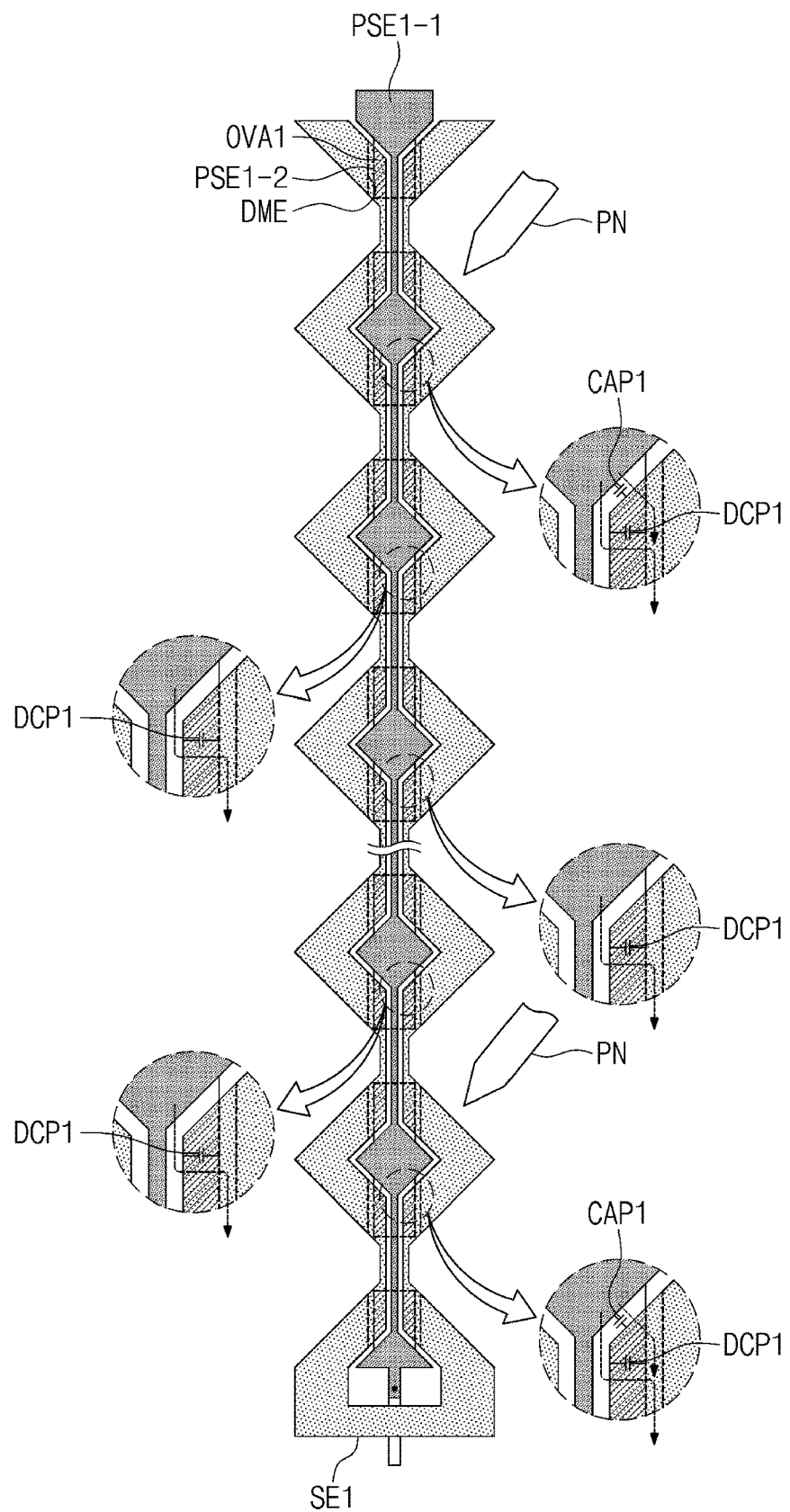
FIG. 21 is a plan view illustrating sensing operations at various positions of the pen of FIG. 18.

FIG. 21 is a view illustrating sensing operations at various positions of the pen of FIG. 18.

FIG. 21 illustrates one first-1 pen sensing electrode PSE1-1, a first sensing electrode SE1 adjacent to the first-1 pen sensing electrode PSE1-1, and first-2 pen sensing electrodes PSE1-2 as an example.

Referring to FIG. 21, the first sensing electrode SE1 may be electrically connected to the sensing circuit SNC. The line resistance to the first sensing electrode SE1 may increase as a distance from the sensing circuit SNC increases. Thus, the magnitude of the sensing signal may decrease as the distance from the sensing circuit SNC increases. The magnitude of the sensing signal may be defined as the magnitude of the induced current.

When the pen PN is disposed adjacent to the sensing circuit SNC, the first induced current IC1 may be provided to the first sensing electrode SE1 through the first dummy capacitor DCP1 adjacent to the sensing circuit SNC and then provided to the sensing circuit SNC. Since the line resistance of the portion adjacent to the sensing circuit SNC is low, the first induced current IC1 generated at the portion adjacent to the sensing circuit SNC may be normally provided to the sensing circuit SNC.

As a portion at which the pen PN is far from the sensing circuit SNC, for example, the pen PN may be disposed adjacent to an upper end of the first-1 pen sensing electrode PSE1-1. When the pen PN is disposed adjacent to the upper end of the first-1 pen sensing electrode PSE1-1, the first induced current IC1 may be provided to the first sensing electrode SE1 by the plurality of dummy capacitors DCP1 provided by the first-2 sensing electrodes PSE1-2. The first induced current IC1 may be provided to the first sensing electrode SE1 by more first dummy capacitors DCP1 as the distance from the sensing circuit SNC increases.

In this case, since the first induced current IC1 is provided to the first sensing electrode SE1 by more first dummy capacitors DCP1, a reduction rate of the sensing signal depending on the line resistance may be reduced even if the line resistance is high. Therefore, even if the pen PN touches a portion far from the sensing circuit SNC, the sensing signal may be more easily provided to the sensing circuit SNC to increase sensing sensitivity for the pen PN.

For example, the first-1 and first-2 pen sensing electrodes PSE1-1 and PSE1-2 have been described, but the second-1 and second-2 pen sensing electrodes PSE2-1 and PSE2-2 may similarly operate.

Figure 22:
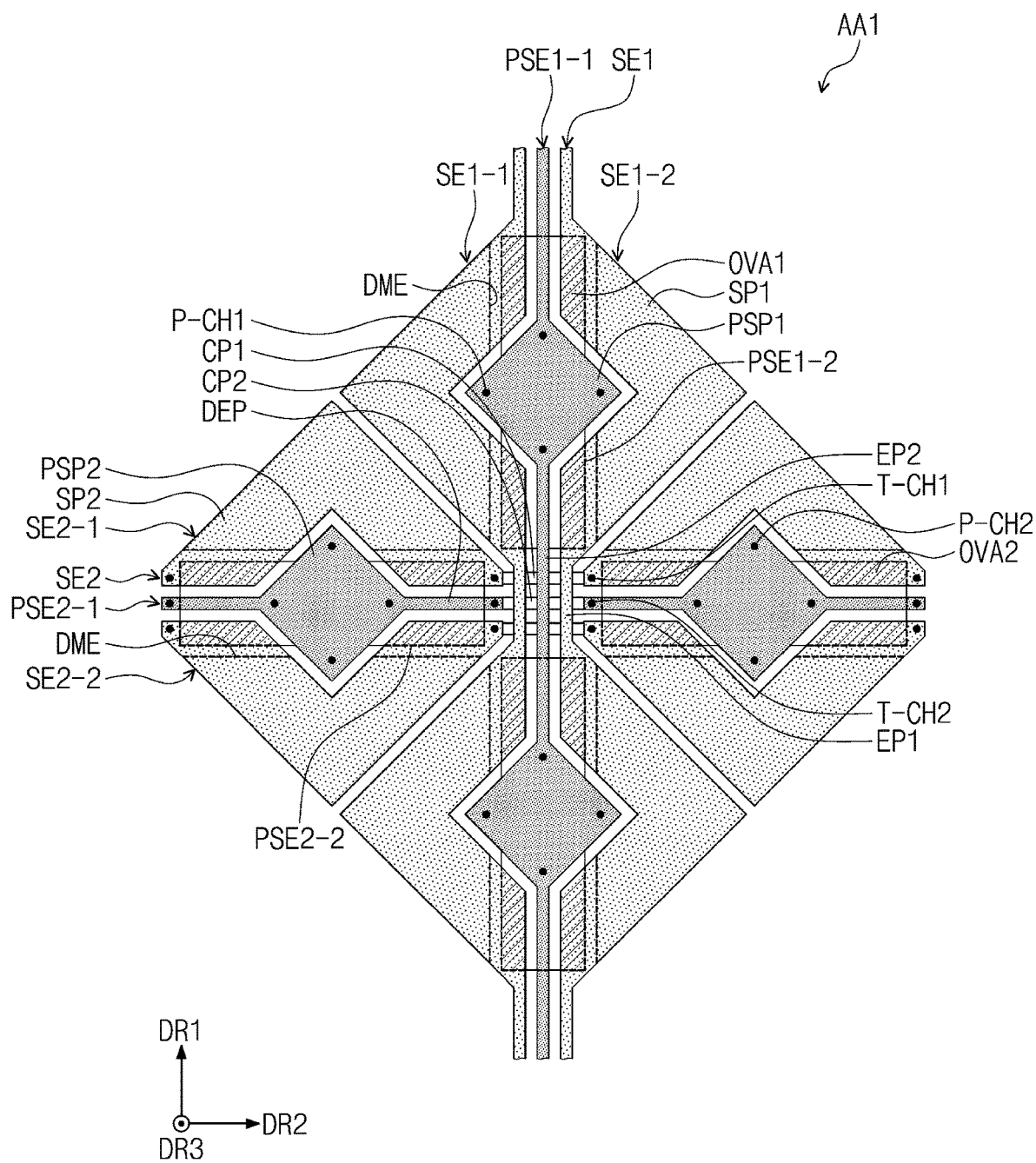
FIG. 22 is a plan view illustrating connection configuration between first-1 and first-2 pen sensing electrodes and second-1 and second-2 pen sensing electrodes according to an embodiment of the inventive concept.

FIG. 22 is a view illustrating connection configuration between first-1 and first-2 pen sensing electrodes and second-1 and second-2 pen sensing electrodes according to an embodiment of the inventive concept.

For example, FIG. 22 illustrates a plan view corresponding to FIG. 9. Hereinafter, the configuration illustrated in FIG. 22 will be described, focusing on configurations different from the configuration illustrated in FIG. 9.

Referring to FIG. 22, in FIG. 9, the first contact holes P-CH1 overlap the second extension pattern EP2, but in FIG. 22, each of first contact holes P-CH1 may overlap first pen sensing parts PSP1, each of which has a diamond shape. A first-1 pen sensing electrode PSE1-1 may be electrically connected to first-2 pen sensing electrodes PSE1-2 through the first contact holes P-CH1 overlapping the first pen sensing parts PSP1.

Since the first contact holes P-CH1 overlap the diamond-shape first pen sensing parts PSP1 having a larger area, the first contact holes P-CH1 may be defined more easily.

In FIG. 9, the second contact holes P-CH2 are illustrated to overlap the dummy extension DEP, but in FIG. 22, second contact holes P-CH2 may overlap second pen sensing parts PSP2, each of which has a diamond shape. A second-1 pen sensing electrode PSE2-1 may be electrically connected to second-2 pen sensing electrodes PSE2-2 through the second contact holes P-CH2 overlapping the second pen sensing parts PSP2.

Since the second contact holes P-CH2 overlap the diamond-shaped second pen sensing parts PSP2 having a larger area, the second contact holes P-CH2 may be defined more easily.

FIGS. 23 to 26 are views illustrating cross-sectional structures of electrodes of an input sensing part according to an embodiment of the inventive concept.

FIGS. 23 to 26 illustrate cross-sectional views corresponding to those of FIGS. 13 to 16.

Figure 23:
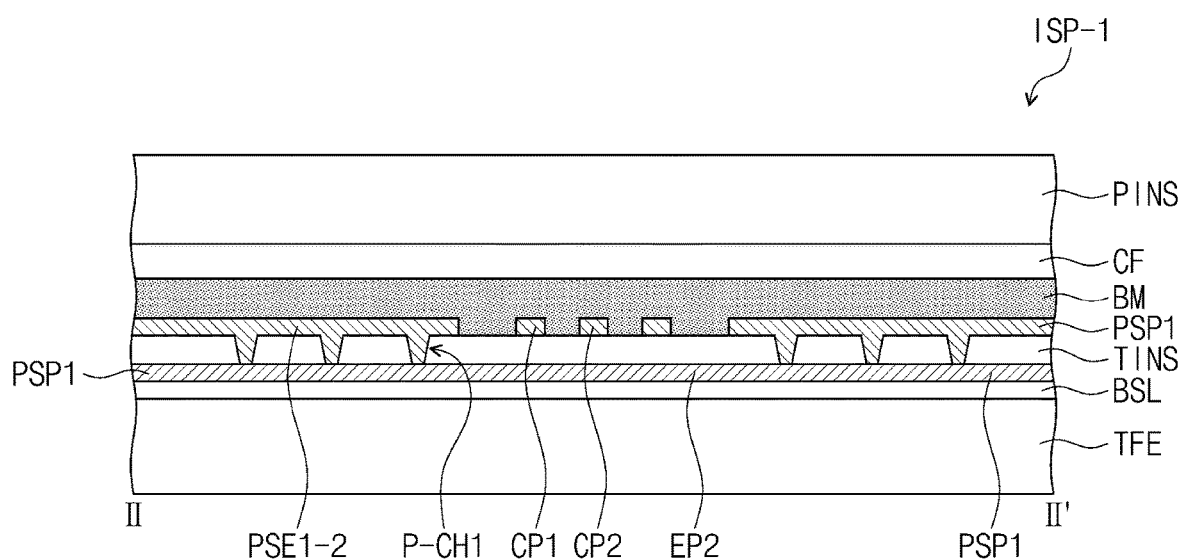
FIGS. 23 to 26 are cross-sectional views illustrating electrodes of an input sensing part according to an embodiment of the inventive concept.

Referring to FIG. 23, a second extension pattern EP2 and first pen sensing parts PSP1 may be disposed on a base layer BSL. An insulating layer TINS may be disposed on the base layer BSL and may cover the second extension pattern EP2 and the first pen sensing parts PSP1.

First and second connection patterns CP1 and CP2 and first-2 pen sensing electrodes PSE1-2 may be disposed on the insulating layer TINS. The first and second connection patterns CP1 and CP2 may be disposed between the first-2 pen sensing electrodes PSE1-2. The first pen sensing parts PSP1 may be electrically connected to the first-2 pen sensing electrodes PSE1-2 through the first contact holes P-CH1 defined in the insulating layer TINS.

A black matrix BM may be disposed on the insulating layer TINS and may cover the first and second connection patterns CP1 and CP2 and the first-2 pen sensing electrodes PSE1-2. A color filter CF and a planarization insulating layer PINS may be sequentially disposed on the black matrix BM.

Figure 24:
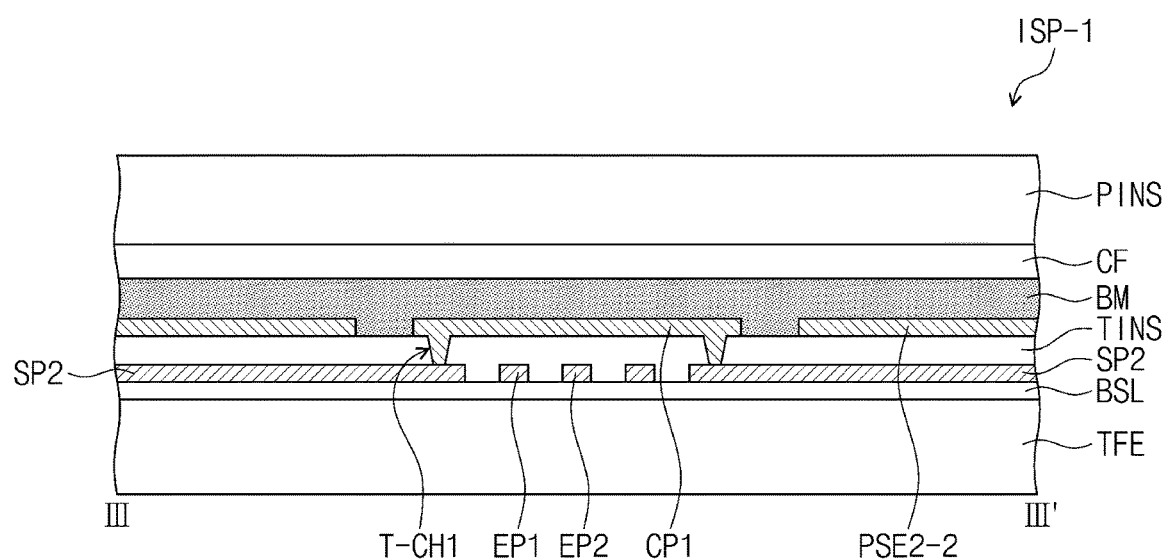

Referring to FIG. 24, the first and second extension patterns EP1 and EP2 and the second sensing parts SP2 may be disposed on the base layer BSL. The first and second extension patterns EP1 and EP2 may be disposed between the second sensing parts SP2.

An insulating layer TINS may be disposed on the base layer BSL and may cover the first and second extension patterns EP1 and EP2 and the second sensing parts SP2. The first connection pattern CP1 and the second-2 pen sensing electrodes PSE2-2 may be disposed on the insulating layer TINS. The first connection pattern CP1 may be disposed between the second-2 pen sensing electrodes PSE2-2. The second sensing parts SP2 may be electrically connected to the first connection pattern CP1 through the first contact holes T-CH1 defined in the insulating layer TINS.

A black matrix BM may be disposed on the insulating layer TINS and may cover the first connection pattern CP1 and the second-2 pen sensing electrodes PSE2-2.

Figure 25:
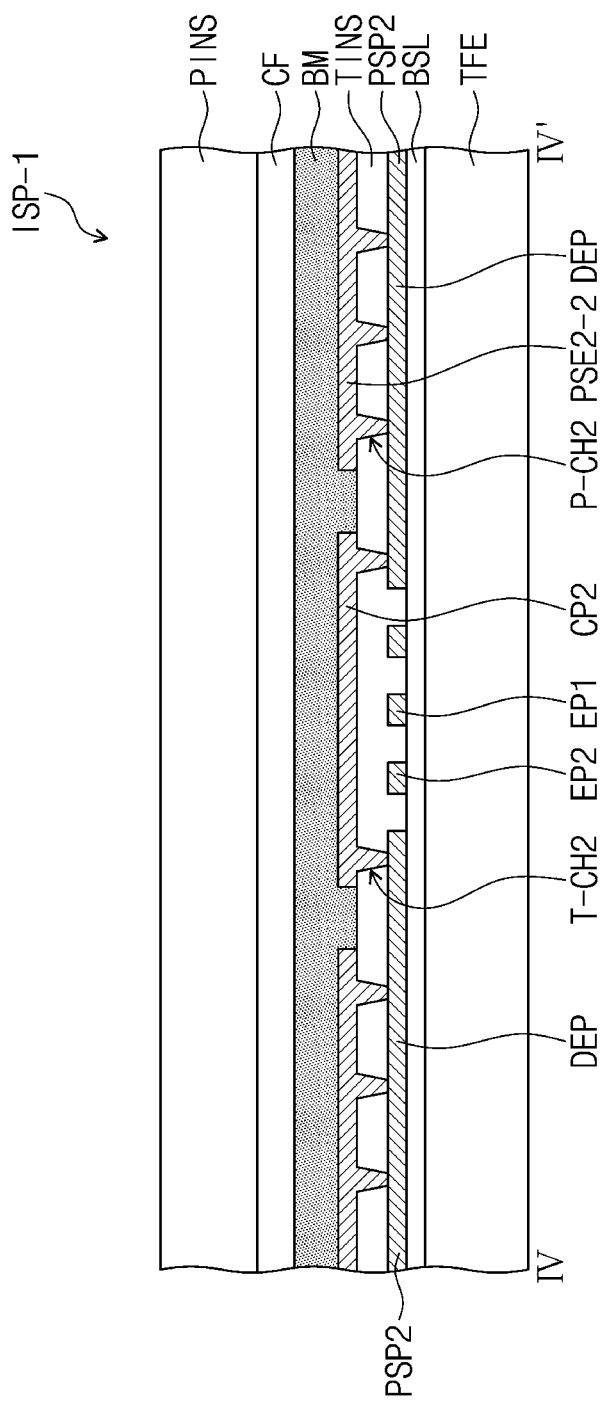

Referring to FIG. 25, the first and second extension patterns EP1 and EP2, second pen sensing parts PSP2, and dummy extensions DEP may be disposed on the base layer BSL. The first and second extension patterns EP1 and EP2 may be disposed between the dummy extensions DEP. An insulating layer TINS may be disposed on the base layer BSL and may cover the first and second extension patterns EP1 and EP2, the second pen sensing parts PSP2, and the dummy extensions DEP.

The second connection pattern CP2 and the second-2 pen sensing electrodes PSE2-2 may be disposed on the insulating layer TINS. The second connection pattern CP2 may be disposed between the second-2 pen sensing electrodes PSE2-2.

The second pen sensing parts PSP2 may be electrically connected to the second connection pattern CP2 through the second contact holes T-CH2 defined in the insulating layer TINS. The second pen sensing parts PSP2 may be electrically connected to the second-2 pen sensing electrodes PSE2-2 through the second contact holes P-CH2 defined in the insulating layer TINS.

A black matrix BM may be disposed on the insulating layer TINS and may cover the second connection pattern CP2 and the second-2 pen sensing electrodes PSE2-2.

Figure 26:
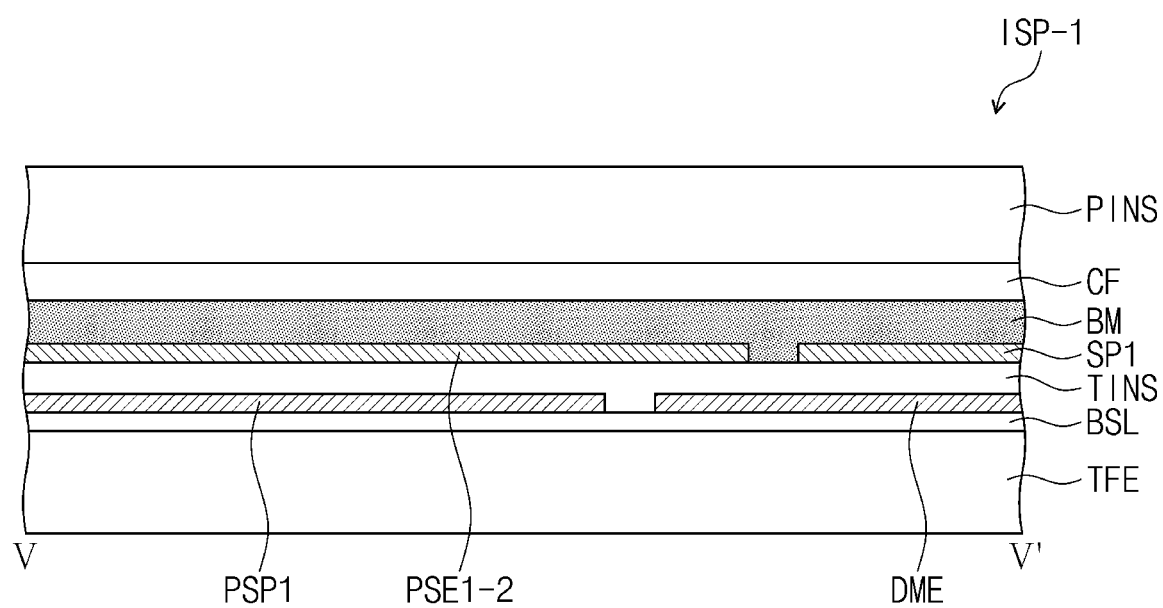

Referring to FIG. 26, the first pen sensing part PSP1 and the first sensing part SP1 may be disposed on the base layer BSL. An insulating layer TINS may be disposed on the first pen sensing part PSP1 and the base layer BSL and may cover the first sensing part SP1.

The first-2 pen sensing electrodes PSE1-2 and the dummy electrode DME may be disposed on the insulating layer TINS. The first-2 pen sensing electrode PSE1-2 may overlap a portion of the first sensing part SP1. A black matrix BM may be disposed on the insulating layer TINS and may cover the first-2 pen sensing electrodes PSE1-2 and the dummy electrode DME.

Referring to FIGS. 23 to 26, unlike the configurations illustrated in FIGS. 13 to 16, the first and second connection patterns CP1 and CP2, the first-2 and second-2 pen sensing electrodes PSE1-2 and PSE2-2, and the dummy electrodes DME of the input sensing part ISP-1 may be disposed above the first and second sensing parts SP1 and SP2, the first and second extension patterns EP1 and EP2, and the first-1 and second-1 pen sensing electrodes PSE1-1 and PSE2-1.

Figure 27:
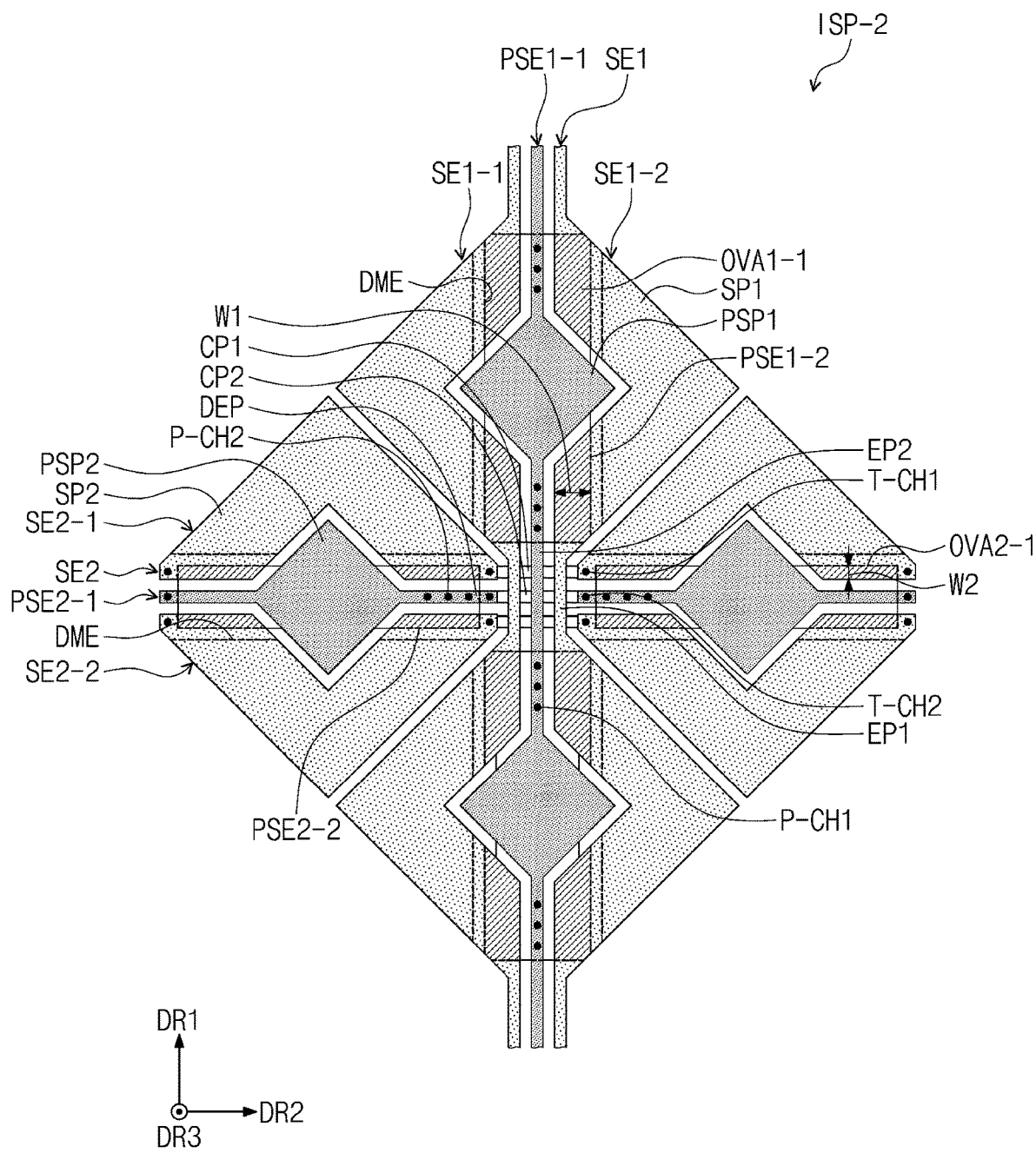
FIG. 27 is a plan view illustrating a configuration of electrodes of an input sensing part according to an embodiment of the inventive concept.

FIG. 27 is a view illustrating a configuration of electrodes of an input sensing part according to an embodiment of the inventive concept.

For example, FIG. 27 illustrates a plan view corresponding to that of FIG. 9.

Hereinafter, the configuration of the input sensing part ISP-2 illustrated in FIG. 27 will be described, focusing on configurations different from those of the input sensing part ISP illustrated in FIG. 9.

Referring to FIG. 27, when viewed in the plan view, the first-2 pen sensing electrodes PSE1-2 of the input sensing part ISP-2 may overlap a portion of the first-1 pen sensing electrode PSE1-1 and a portion of the first sensing electrode SE1. In a plan view, the second-2 pen sensing electrodes PSE2-2 of the input sensing part ISP-2 may overlap portions of the second-1 pen sensing electrode PSE2-1 and portions of the second sensing electrode SE2.

Portions of the first-2 pen sensing electrodes PSE1-2 overlapping the first sensing electrode SE1 may be defined as first overlapping portions OVAL-1. Portions of the second-2 pen sensing electrodes PSE2-2 overlapping the second sensing electrode SE2 may be defined as second overlapping portions OVA2-1.

Each of the first overlapping portions OVAL-1 may have an area that is different from that of each of the second overlapping portions OVA2-1. For example, each of the first overlapping portions OVAL-1 may have an area greater than that of each of the second overlapping portions OVA2-1. For example, each of the first overlapping portions OVA1-1 may have an area greater 1.2 times than that of each of the second overlapping portions OVA2-1.

Each of the first overlapping portions OVA1-1 may extend in the first direction DR1 and may have a first width W1 in the second direction DR2. Each of the second overlapping portions OVA2-1 may extend in the second direction DR2 and may have a second width W2 in the first direction DR1. Since each of the first overlapping portions OVA1-1 has an area greater than that of each of the second overlapping portions OVA2-1, the first width W1 may be greater than the second width W2.

As described above, each of the first sensing electrodes SE1 and the first-1 pen sensing electrodes PSE1-1 may be longer than each of the second sensing electrodes SE2 and the second-1 pen sensing electrodes PSE2-1. Thus, line resistance of the first sensing electrodes SE1 and the first-1 pen sensing electrodes PSE1-1 may be higher. When the line resistance is high, the sensing signal may be reduced.

In an embodiment of the present disclosure, since the area of each of the first overlapping portions OVAL-1 is larger, a capacitance of each of the dummy capacitors provided in the first overlapping portions OVAL-1 may increase. When the capacitance of each of the dummy capacitors increases, the above-described induced current may be better transmitted. Thus, the sensing signal may be prevented from being reduced by the first sensing electrodes SE1 and the first-1 pen sensing electrodes PSE1-1.

Figure 28:
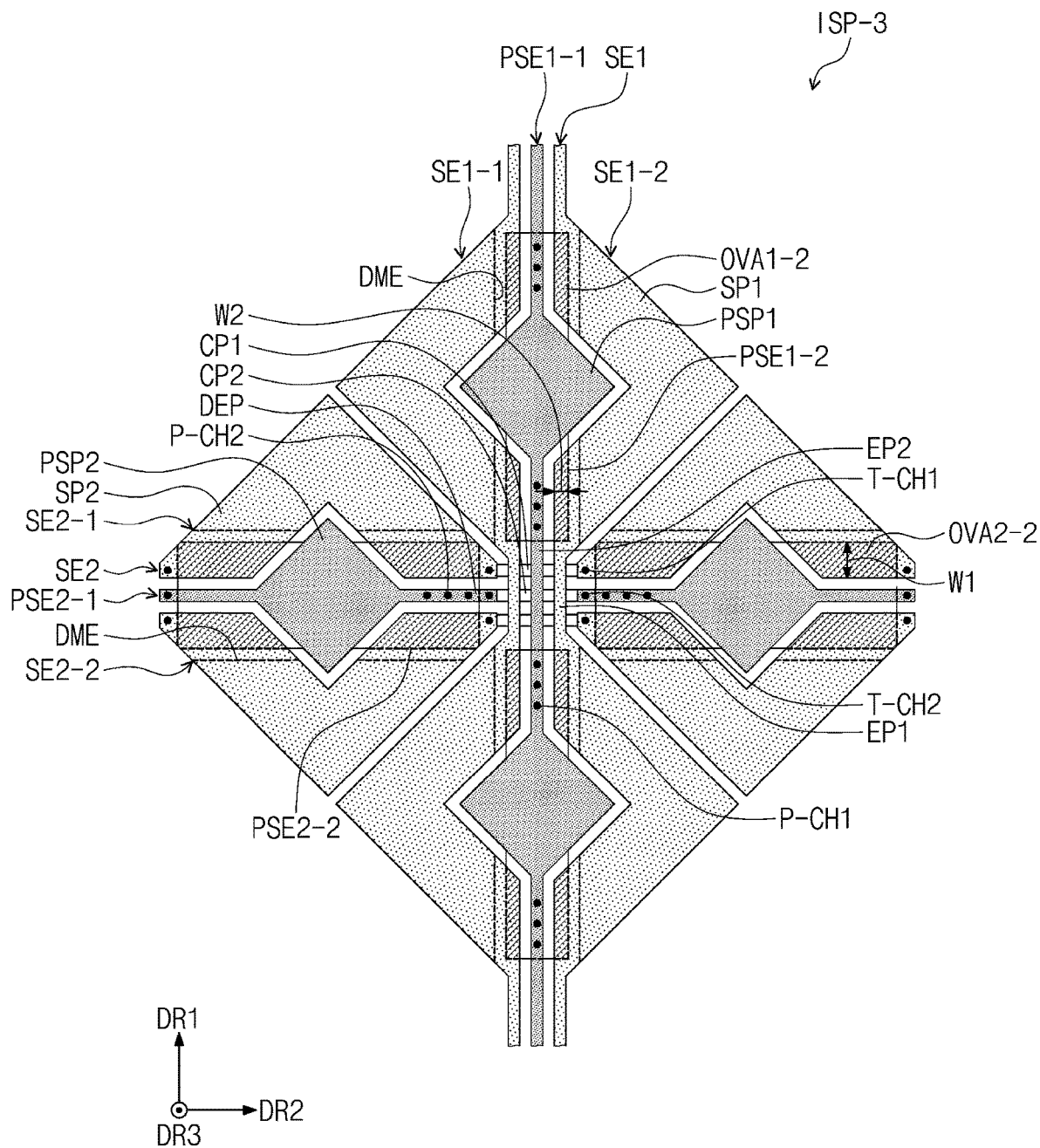
FIG. 28 is a plan view illustrating a configuration of electrodes of an input sensing part according to an embodiment of the inventive concept.

FIG. 28 is a view illustrating a configuration of electrodes of an input sensing part according to an embodiment of the inventive concept.

For example, FIG. 28 illustrates a plan view corresponding to that of FIG. 9.

Hereinafter, a configuration of an input sensing part ISP-3 illustrated in FIG. 28 will be described, focusing on configurations different from those of the input sensing part ISP illustrated in FIG. 9.

Referring to FIG. 28, when viewed in the plan view, a first-2 pen sensing electrodes PSE1-2 of the input sensing part ISP-3 may overlap a portion of the first-1 pen sensing electrode PSE1-1 and a portion of the first sensing electrode SE1. In a plan view, the second-2 pen sensing electrodes PSE2-2 of the input sensing part ISP-2 may overlap portions of a second-1 pen sensing electrode PSE2-1 and portions of a second sensing electrode SE2.

Portions of the first-2 pen sensing electrodes PSE1-2 overlapping the first sensing electrode SE1 may be defined as first overlapping portions OVAL-2. Portions of the second-2 pen sensing electrodes PSE2-2 overlapping the second sensing electrode SE2 may be defined as second overlapping portions OVA2-2.

Each of the first overlapping portions OVAL-1 may have an area that is different from that of each of the second overlapping portions OVA2-1. For example, each of the first overlapping portions OVAL-2 may have an area that is less than that of each of the second overlapping portions OVA2-2. For example, each of the second overlapping portions OVA2-2 may have an area that is greater 1.2 times than that of each of the first overlapping portions OVA1-2.

Each of the first overlapping portions OVAL-2 may extend in the first direction DR1 and may have a second width W2 in the second direction DR2 Each of the second overlapping portions OVA2-2 may extend in the second direction DR2 and may have a first width W1 in the first direction DR1. Since each of the second overlapping portions OVA2-2 have an area greater than that of each of the first overlapping portions OVAL-2, the first width W1 may be greater than the second width W2.

Figure 29:
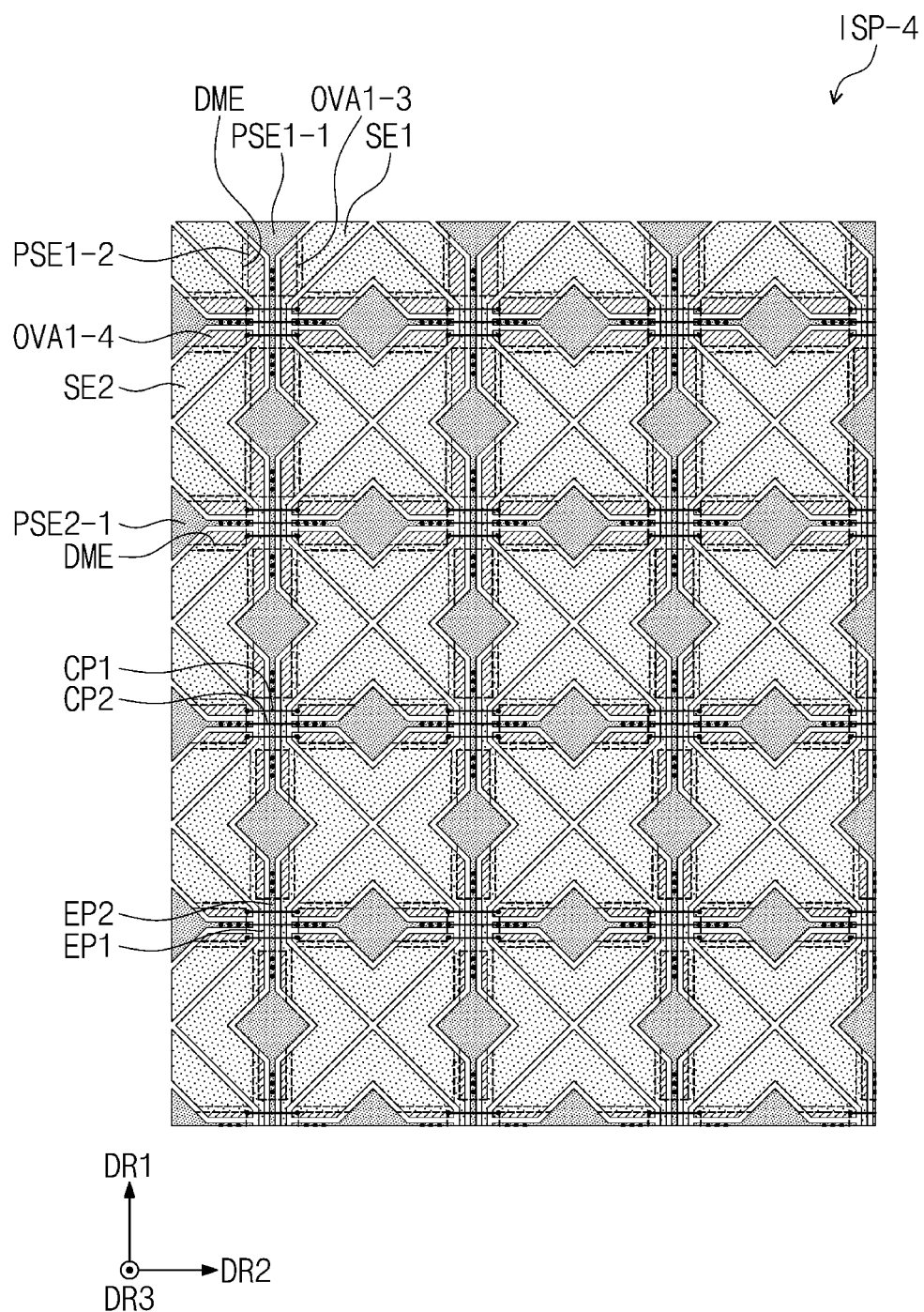
FIG. 29 is a plan view illustrating a configuration of electrodes of an input sensing part according to an embodiment of the inventive concept.

FIG. 29 is a view illustrating a configuration of electrodes of an input sensing part according to an embodiment of the inventive concept.

For example, electrodes disposed on a partial area of an input sensing part ISP-4 are illustrated in FIG. 29. Hereinafter, a configuration of the input sensing part ISP-4 illustrated in FIG. 29 will be described, focusing on configurations different from those of the input sensing part ISP illustrated in FIG. 8.

Referring to FIG. 29, in the input sensing part ISP-4, first sensing electrodes SE1 and second sensing electrodes SE2 may be electrically connected to the above-described sensing circuit SNC (see FIG. 19). The sensing circuit SNC may be adjacent to a lower end of the input sensing part ISP-4.

An area of each of the first overlapping portions OVA1-3 may decrease toward the sensing circuit SNC, for example, closer to the lower end of the input sensing part ISP-4. An area of each of the second overlapping portions OVA2-3 may gradually decrease toward the sensing circuit SNC, for example, closer to the lower end of the input sensing part ISP-4.

Line resistance may increase as a distance from the sensing circuit SNC increases. However, in an embodiment of the present disclosure, an area of each of the first overlapping portions OVA1-3 and an area of each of the second overlapping portions OVA2-3 may gradually increase as the distance from the sensing circuit SNC increases.

A capacitance of the above-described first dummy capacitors DCP1 may be proportional to the area of each of the first overlapping portions OVA1-3, and a capacitance of a second dummy capacitors DCP2 may be proportional to the area of each of the second overlapping portions OVA2-3. As the capacitances of the first and second dummy capacitors DCP1 and DCP2 increase, sensing signals may be better transmitted to increase sensing sensitivity. In an embodiment of the present disclosure, an area of each of the first and second overlapping portions OVA1-3 and OVA2-3 may gradually increase as the distance from the sensing circuit SNC increases to increase the sensing sensitivity.

Figure 30:
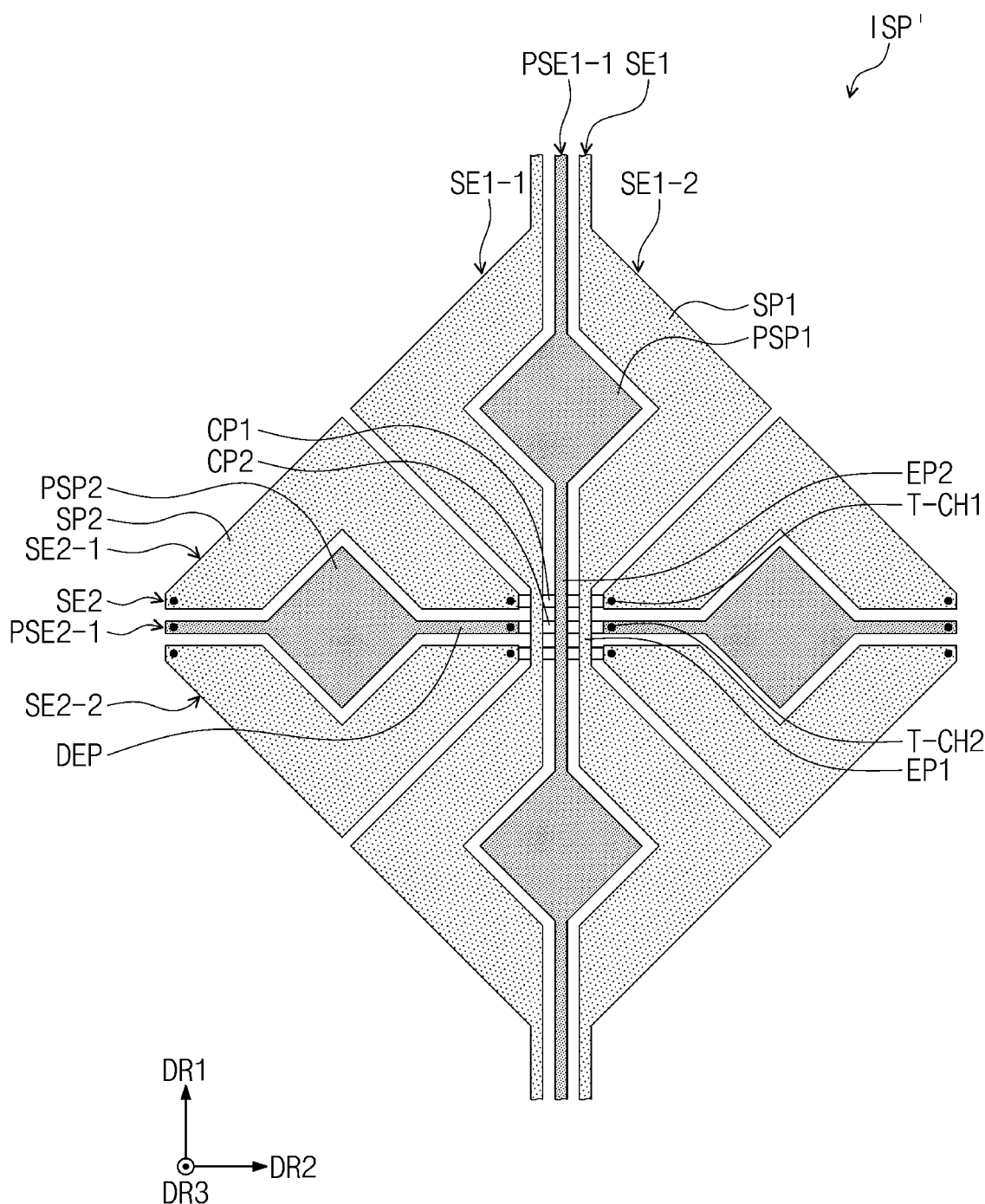
FIG. 30 is a plan view illustrating a configuration of electrodes of an input sensing part according to an embodiment of the inventive concept.

FIG. 30 is a view illustrating a configuration of electrodes of an input sensing part according to an embodiment of the inventive concept.

For example, FIG. 30 illustrates a plan view corresponding to that of FIG. 9.

Hereinafter, a configuration of an input sensing part ISP' illustrated in FIG. 30 will be described, focusing on configurations different from those of the input sensing part ISP illustrated in FIG. 9.

Referring to FIG. 30, the input sensing part ISP' may include first and second sensing electrodes SE1 and SE2 and first-1 and second-1 pen sensing electrodes PSE1-1 and PSE2-1. The first and second sensing electrodes SE1 and SE2 and the first-1 and second-1 pen sensing electrodes PSE1-1 and PSE2-1 may have the same configuration as the first and second sensing electrodes and the first-1 and second-1 pen sensing electrodes PSE1-1 and PSE2-1, which are illustrated in FIG. 9.

However, unlike the input sensing part ISP, the input sensing part ISP' might not include first-2 and second-2 pen sensing electrodes PSE1-2 and PSE2-2 and dummy electrodes DME.

Figure 31:
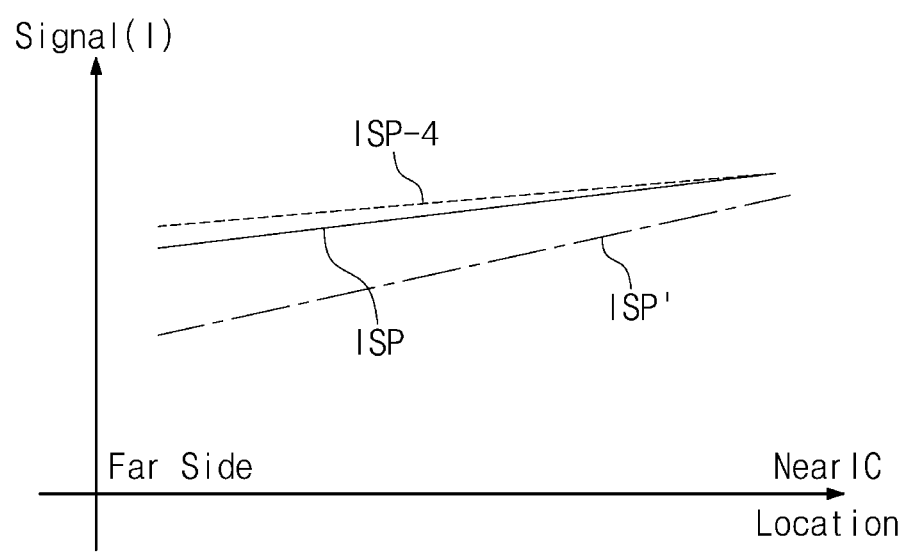
FIG. 31 is a graph illustrating sensing signals of an input sensing part of FIG. 9, an input sensing part of FIG. 29, and an input sensing part of FIG. 30 with respect to distances from a sensing circuit.

FIG. 31 is a graph illustrating sensing signals of an input sensing part of FIG. 9, an input sensing part of FIG. 29, and an input sensing part of FIG. 30 depending on distances from a sensing circuit.

Referring to FIG. 31, a vertical axis represents a magnitude of the sensing signal, and the magnitude of the sensing signal may be defined as a magnitude of induced current. A horizontal axis represents positions of electrodes with respect to a sensing circuit SNC. As moving to a left side, it indicates a side far from the sensing circuit SNC, and as moving to a right side, it indicates a side close to the sensing circuit SNC.

Referring to FIG. 31, in the input sensing part ISP', line resistance may increase as a distance from the sensing circuit SNC increases, and thus, the magnitude of the sensing signal may decrease. Sensing sensitivity of the input sensing part ISP' may decrease as the distance from the sensing circuit SNC increases.

In the input sensing part ISP, first and second dummy capacitors DCP1 and DCP2 may be provided on first and second overlapping portions OVAL and OVA2, and thus, the sensing signal may be further transmitted to the sensing circuit SNC. Therefore, reduction of the sensing signal due to line resistance may be prevented. As a result, the sensing sensitivity of the input sensing part ISP may be increased compared to that of the input sensing part ISP'.

Also, as described with reference to FIG. 21, induced current IC1 may be provided to the first sensing electrode SE1 by more first dummy capacitors DCP1 as the distance from the sensing circuit SNC increases. In this case, uniformity of the sensing signal of the input sensing part ISP may be increased compared to that of the input sensing part ISP'.

In addition, as described in FIG. 29, an area of each of the first and second overlapping portions OVA1-3 and OVA2-3 may gradually increase as the distance from the sensing circuit SNC increases to increase the sensing sensitivity. In this case, uniformity of the sensing signal of the input sensing part ISP-4 may be further increased.

Figure 32:
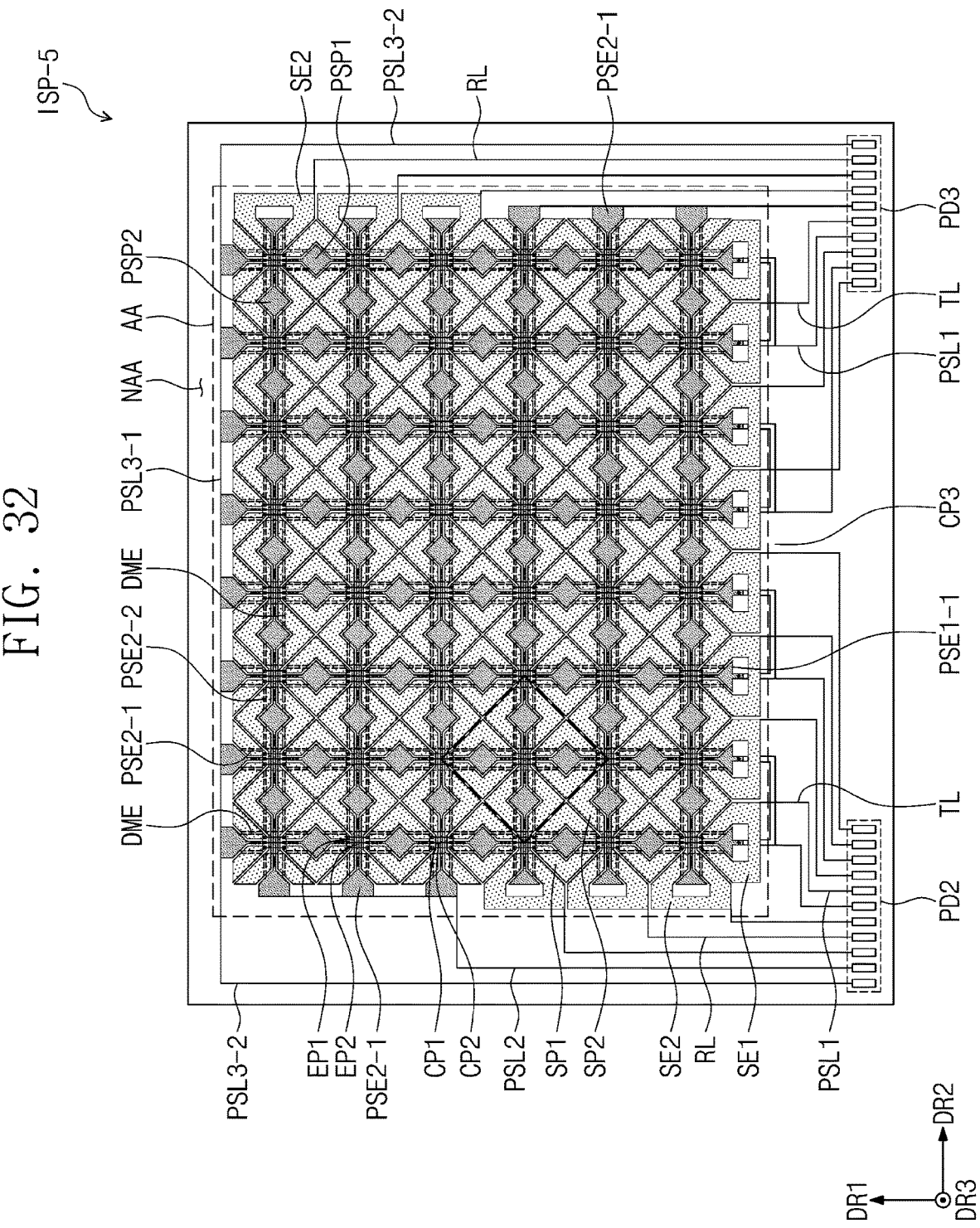
FIG. 32 is a plan view illustrating a configuration of an input sensing part according to an embodiment of the inventive concept.

FIG. 32 is a view illustrating a configuration of an input sensing part according to an embodiment of the inventive concept.

For example, FIG. 32 illustrates a plan view corresponding to that of FIG. 8.

Hereinafter, a configuration of the input sensing part ISP-5 illustrated in FIG. 32 will be described, focusing on configurations different from those of the input sensing part ISP illustrated in FIG. 8.

Referring to FIG. 32, an input sensing part ISP-5 may have a rectangular shape having a pair of long sides extending in the second direction DR2 and a pair of short sides extending in the first direction DR1. The input sensing part ISP illustrated in FIG. 8 may extend longer in the first direction DR1, but the input sensing part ISP-5 illustrated in FIG. 32 may extend longer in the second direction DR2.

The input sensing part ISP-5 may include first sensing electrodes SE1, second sensing electrodes SE2, first-1 pen sensing electrodes PSE1-1, first-2 pen sensing electrodes PSE1-2, second-1 pen sensing electrodes PSE2-1, and second-2 pen sensing electrodes PSE2-2.

Unlike the input sensing part ISP illustrated in FIG. 8, a first sensing electrodes SE1 may include first connection patterns CP1, and the first-1 pen sensing electrodes PSE1-1 may include second sensing electrodes CP2. For example, first sensing parts SP1 may be electrically connected by the first connection patterns CP1, and first pen sensing parts PSP1 may be electrically connected by the second connection patterns CP2.

Unlike the input sensing part ISP illustrated in FIG. 9, the second sensing electrodes SE2 may include first extension patterns EP1, and the second-1 pen sensing electrodes PSE2-1 may include second extension patterns EP2. For example, the first extension patterns EP1 may extend from the second sensing parts SP2, and the second extension patterns EP2 may extend from the second pen sensing parts PSP2.

In the input sensing part ISP-5, the second sensing electrodes SE2 may be longer than the first sensing electrodes SE1, and the second-1 pen sensing electrodes PSE2-1 may be longer than first-1 pen sensing electrodes PSE1-1. Therefore, unlike the input sensing part ISP illustrated in FIG. 9, the first and second extension patterns EP1 and EP2 may be used for the longer second sensing electrodes SE2 and the longer second-1 pen sensing electrodes PSE2-1, and the first and second connection patterns CP1 and CP1 may be used for the shorter first sensing electrodes SE1 and the shorter first-1 pen sensing electrodes PSE1-1.

According to the embodiment of the inventive concept, the first and second capacitors may be formed by the first-1 and first-2 pen sensing electrodes and the first and second sensing parts, and the first and second dummy capacitors may be formed by the second-1 and second-2 pen sensing electrodes, which are electrically connected to the first-1 and first-2 pen sensing electrodes to overlap the first and second sensing parts, and the first and second sensing parts. The sensing signal generated in the first-1 and first-2 pen sensing electrodes may be more easily provided to the sensing circuit by the first and second capacitors and the first and second dummy capacitors to increase the sensing sensitivity for the pen.

In addition, since the user's touch and the pen's touch are performed by the same input sensing part, the two input devices such as the touch panel and the digitizer might not be used to reduce the thickness of the display device.

It will be apparent to those skilled in the art that various modifications and variations can be made in the inventive concept. Thus, it is intended that the inventive concept covers the modifications and variations of this invention provided they come within the scope of the present disclosure.

What is claimed is:

1. An input sensing part, comprising:
   a first sensing electrode;
   a second sensing electrode electrically insulated from the first sensing electrode and crossing the first sensing electrode;
   a first-1 pen sensing electrode disposed adjacent to the first sensing electrode, electrically insulated from the second sensing electrode, and crossing the second sensing electrode;
   a second-1 pen sensing electrode disposed adjacent to the second sensing electrode, electrically insulated from both the first sensing electrode and the first-1 pen sensing electrode, and crossing the first sensing electrode and the first-1 pen sensing electrode; and
   a first-2 pen sensing electrode disposed on a layer that is different from that on which the first sensing electrode and the first-1 pen sensing electrode are disposed, and overlapping at least a portion of the first sensing electrode, in a plan view,
   wherein the first sensing electrode is divided into two parts that are spaced apart from one another with the first-1 pen sensing electrode disposed therebetween, and
   wherein a width of a portion of the first-2 pen sensing electrode overlapping the first sensing electrode is larger than a width of a portion of the first-1 pen sensing electrode disposed on the portion of the first-2 pen sensing electrode.

2. The input sensing part of claim 1, wherein the first-2 pen sensing electrode is electrically connected to the first-1 pen sensing electrode.

3. The input sensing part of claim 2, wherein, in the plan view, the first-2 pen sensing electrode overlaps at least a portion of the first-1 pen sensing electrode.

4. The input sensing part of claim 1, further comprising a second-2 pen sensing electrode disposed on a layer that is different from that on which at least a portion of the second sensing electrode and at least a portion of the second-1 pen sensing electrode are disposed, and overlapping at least a portion of the second sensing electrode, in the plan view.

5. The input sensing part of claim 4, wherein the second-2 pen sensing electrode is electrically connected to the second-1 pen sensing electrode.

6. The input sensing part of claim 5, wherein, in the plan view, the second-2 pen sensing electrode overlaps at least a portion of the second-1 pen sensing electrode.

7. The input sensing part of claim 4, wherein a first overlapping portion of the first-2 pen sensing electrode, which overlap the first sensing electrode, has a same area as a second overlapping portion of the second-2 pen sensing electrode, which overlaps the second sensing electrode.

8. The input sensing part of claim 4, wherein a first overlapping portion of the first-2 pen sensing electrode, which overlap the first sensing electrode, has an area that is different from that of a second overlapping portion of the second-2 pen sensing electrode, which overlaps the second sensing electrode.

9. The input sensing part of claim 8, wherein the first overlapping portion has an area that is greater than that of the second overlapping portion.

10. The input sensing part of claim 8, wherein the first overlapping portion has an area that is less than that of the second overlapping portion.

11. The input sensing part of claim 4, wherein the first-1 and second-1 pen sensing electrodes are disposed on a same layer as the first and second sensing electrodes.

12. The input sensing part of claim 11, wherein the first-2 pen sensing electrode is disposed on a same layer as the second-2 pen sensing electrode.

13. The input sensing part of claim 4, wherein the first sensing electrode comprises a first-1 sensing electrode and a first-2 sensing electrode, which have shapes that are symmetrical to each other,
   wherein the second sensing electrode comprises a second-1 sensing electrode and a second-2 sensing electrode, which have shapes that are symmetrical to each other, and
   wherein the first-1 pen sensing electrode is disposed between the first-1 sensing electrode and the first-2 sensing electrode, and the second-1 pen sensing electrode is disposed between the second-1 sensing electrode and the second-2 sensing electrode.

14. The input sensing part of claim 13, wherein each of the first-1 and first-2 sensing electrodes comprises:
   a plurality of first sensing parts; and
   a plurality of first extension patterns disposed between the first sensing parts and extending from the first sensing parts, and
   wherein each of the second-1 and second-2 sensing electrode comprises:
   a plurality of second sensing parts; and
   a plurality of first connection patterns disposed between the second sensing parts to connect the second sensing parts to each other,
   wherein the first and second sensing parts and the first extension patterns are disposed on the same layer, and the first connection patterns are disposed on a layer that is different from that on which the first and second sensing parts and the first extension patterns are disposed, and
   wherein the first-2 and second-2 pen sensing electrodes are disposed on a same layer as the first and second connection patterns.

15. The input sensing part of claim 14, further comprising a sensing circuit electrically connected to the first and second sensing electrodes, wherein the first-2 pen sensing electrode is provided in plural, and the second-2 pen sensing electrode is provided in plural, wherein the plurality of first-2 pen sensing electrodes overlap at least portions of the first sensing parts, and the plurality of second-2 pen sensing electrodes overlap at least portions of the second sensing parts, and wherein an area of each of the portions of the first-2 pen sensing electrodes, which overlap the first sensing parts, and an area of each of the portions of the second-2 pen sensing electrodes, which overlap the second sensing parts, gradually decrease toward the sensing circuit.

16. The input sensing part of claim 14, wherein the first-1 pen sensing electrode comprises:
a plurality of first-1 pen sensing electrodes; and
a plurality of extension patterns disposed between the first pen sensing parts and extending from the first pen sensing parts, and
wherein the second-1 pen sensing electrodes comprise:
a plurality of second pen sensing parts; and
a plurality of second connection patterns disposed between the second pen sensing parts to connect the second pen sensing parts to each other,
wherein the first and second connection patterns are electrically insulated from the first and second extension patterns and cross the first and second extension patterns,
wherein the first and second pen sensing parts and the second extension patterns are disposed on a same layer as the first and second sensing parts and the first extension pattern, and
wherein the second connection patterns are disposed on a same layer as the first connection patterns.

17. The input sensing part of claim 16, wherein each of the first-2 pen sensing electrode and the second-2 pen sensing electrode is provided in plural,
wherein the plurality of first-2 pen sensing electrodes overlap the first pen sensing parts, respectively, and
wherein the plurality of second-2 pen sensing electrodes overlap the second pen sensing parts, respectively.

18. The input sensing part of claim 1, wherein the first and second sensing electrodes are configured to sense a touch of a user, and
wherein the first-1 and second-1 sensing electrodes are configured to sense a touch of a pen.

19. The input sensing part of claim 1, further comprising a dummy electrode disposed proximate to the first-2 pen sensing electrode and overlapping at least a portion of the first sensing electrode,
wherein the first-2 pen sensing electrode and the dummy electrode have a mesh shape, and
wherein a boundary between the first-2 pen sensing electrode and the dummy electrode has a zigzag pattern shape.

20. An input sensing part, comprising:
a first sensing electrode;
a second sensing electrode electrically insulated from the first sensing electrode and crossing the first sensing electrode;
a first-1 pen sensing electrode adjacent to the first sensing electrode, electrically insulated from the second sensing electrode, and crossing the second sensing electrode;
a second-1 pen sensing electrode adjacent to the second sensing electrode, electrically insulated from both the first sensing electrode and the first-1 pen sensing electrode, and crossing the first sensing electrode and the first-1 pen sensing electrode;
a first-2 pen sensing electrode disposed on a layer that is different from that on which the first sensing electrode and the first-1 pen sensing electrode are disposed, and overlapping at least a portion of the first sensing electrode, in a plan view; and
a second-2 pen sensing electrode disposed on a layer that is different from that on which a portion of the second sensing electrode and a portion of the second-1 pen sensing electrode are disposed, and overlapping at least a portion of the second sensing electrode, in the plan view,
wherein a first overlapping portion of the first-2 pen sensing electrode, which overlap the first sensing electrode, has an area that is different from that of a second overlapping portion of the second-2 pen sensing electrode, which overlaps the second sensing electrode.

21. A display device, comprising:
a display panel; and
an input sensing part disposed on the display panel,
wherein the input sensing part comprises:
a first sensing electrode;
a second sensing electrode electrically insulated from the first sensing electrode and crossing the first sensing electrode;
a first-1 pen sensing electrode adjacent to the first sensing electrode, electrically insulated from the second sensing electrode, and crossing the second sensing electrode;
a second-1 pen sensing electrode adjacent to the second sensing electrode, electrically insulated from the first sensing electrode and the first-1 pen sensing electrode, and crossing the first sensing electrode and the first-1 pen sensing electrode; and
a first-2 pen sensing electrode disposed on a layer that is different from that on which the first sensing electrode and the first-1 pen sensing electrode are disposed, electrically connected to the first-1 pen sensing electrode, and overlapping at least a portion of the first sensing electrode,
wherein the first sensing electrode is divided into two parts that are spaced apart from one another with the first-1 pen sensing electrode disposed therebetween, and
wherein a width of a portion of the first-2 pen sensing electrode overlapping the first sensing electrode is larger than a width of a portion of the first-1 pen sensing electrode disposed on the portion of the first-2 pen sensing electrode.

22. A display device, comprising:
a first sensing electrode extending in a first direction;
a first-1 pen sensing electrode electrically insulated from the first sensing electrode, extending in the first direction, and disposed on a same layer as the first sensing electrode; and
a first-2 pen sensing electrode disposed on a layer that is different from that on which the first sensing electrode and the first-1 pen sensing electrode are disposed and electrically connected to the first-1 pen sensing electrode,
wherein, in a plan view, the first-2 pen sensing electrode overlaps at least a portion of the first sensing electrode,
wherein the first sensing electrode is divided into two parts that are spaced apart from one another with the first-1 pen sensing electrode disposed therebetween, and wherein a width of a portion of the first-2 pen sensing electrode overlapping the first sensing electrode is larger than a width of a portion of the first-1 pen sensing electrode disposed on the portion of the first-2 pen sensing electrode.

23. An electronic device for provide an image, comprising:
- a display device comprising:
- a display panel; and
- an input sensing part disposed on the display panel,
- wherein the input sensing part comprises:
- a first sensing electrode;
- a second sensing electrode electrically insulated from the first sensing electrode and crossing the first sensing electrode;
- a first-1 pen sensing electrode disposed adjacent to the first sensing electrode, electrically insulated from the second sensing electrode, and crossing the second sensing electrode;
- a second-1 pen sensing electrode disposed adjacent to the second sensing electrode, electrically insulated from both the first sensing electrode and the first-1 pen sensing electrode, and crossing the first sensing electrode and the first-1 pen sensing electrode; and
- a first-2 pen sensing electrode disposed on a layer that is different from that on which the first sensing electrode and the first-1 pen sensing electrode are disposed, and overlapping at least a portion of the first sensing electrode, in a plan view,
- wherein the first sensing electrode is divided into two parts that are spaced apart from one another with the first-1 pen sensing electrode disposed therebetween, and
- wherein a width of a portion of the first-2 pen sensing electrode overlapping the first sensing electrode is larger than a width of a portion of the first-1 pen sensing electrode disposed on the portion of the first-2 pen sensing electrode.

* * * * *